(12) United States Patent
Byrne

(10) Patent No.: US 10,218,135 B2
(45) Date of Patent: Feb. 26, 2019

(54) MODULAR ELECTRICAL SYSTEM INCLUDING BACK-TO-BACK RECEPTACLE CONFIGURATIONS AND CAPABLE OF PROVIDING FOUR WIRE CIRCUITRY

(71) Applicant: Norman R. Byrne, Ada, MI (US)

(72) Inventor: Norman R. Byrne, Ada, MI (US)

( * ) Notice: Subject to any disclaimer, the term of this patent is extended or adjusted under 35 U.S.C. 154(b) by 0 days.

(21) Appl. No.: 15/641,422

(22) Filed: Jul. 5, 2017

(65) Prior Publication Data

US 2018/0090893 A1 Mar. 29, 2018

Related U.S. Application Data

(63) Continuation of application No. 15/360,331, filed on Nov. 23, 2016, which is a continuation-in-part of application No. 14/056,166, filed on Oct. 17, 2013, now abandoned, which is a continuation-in-part of application No. 11/747,518, filed on May 11, 2007, now abandoned.

(51) Int. Cl.
| | |
|---|---|
| *H01R 25/00* | (2006.01) |
| *H01R 25/16* | (2006.01) |
| *H02G 3/00* | (2006.01) |
| *H01R 13/642* | (2006.01) |
| *H01R 13/74* | (2006.01) |

(52) U.S. Cl.
CPC ........ *H01R 25/006* (2013.01); *H01R 13/642* (2013.01); *H01R 25/162* (2013.01); *H01R 25/167* (2013.01); *H02G 3/00* (2013.01); *H01R 13/748* (2013.01)

(58) Field of Classification Search
CPC .. H01R 25/006; H01R 25/162; H01R 25/167; H01R 13/642

USPC .......................................................... 439/94
See application file for complete search history.

(56) References Cited

U.S. PATENT DOCUMENTS

| | | | | |
|---|---|---|---|---|
| 1,187,010 | A | | 6/1916 | Rodrigues |
| 2,313,960 | A | | 3/1943 | O'Brien |
| 2,320,332 | A | * | 5/1943 | Morten ................... H01R 13/22 174/74 R |
| 2,540,575 | A | * | 2/1951 | Finizie ................. H01R 13/562 439/161 |
| 4,135,775 | A | * | 1/1979 | Driscoll ..................... E04B 2/82 439/215 |
| 4,382,648 | A | * | 5/1983 | Propst ................... E04B 2/7425 439/209 |
| 4,551,577 | A | * | 11/1985 | Byrne ..................... A47B 21/06 174/500 |
| 4,952,164 | A | * | 8/1990 | Weber ................... H01R 25/006 439/215 |
| 4,959,021 | A | * | 9/1990 | Byrne ..................... H01R 35/02 439/1 |

(Continued)

*Primary Examiner* — Alexander Gilman
(74) *Attorney, Agent, or Firm* — Gardner, Linn, Burkhart & Ondersma LLP

(57) ABSTRACT

An electrical system comprises a four-wire integral receptacle junction block assembly (530) having a first male end connector set (536) and a second male end connector set (538). The assembly (530) also includes a first duplex receptacle set (540) and a second duplex receptacle set (541). The connector sets (534, 536) are connected to a series of buss bars (570) comprising two hot buss bars (586, 616), a neutral buss bar (620), and a ground buss bar (598). The buss bars (570) can be configured so as to selectively apply incoming power to the duplex receptacle sets (540, 541) from either of two circuits.

18 Claims, 64 Drawing Sheets

(56) References Cited

U.S. PATENT DOCUMENTS

| | | | | |
|---|---|---|---|---|
| 5,013,252 A * | 5/1991 | Nienhuis | ............... | E04B 2/7425 |
| | | | | 439/211 |
| 5,073,120 A | 12/1991 | Lincoln | | |
| 5,096,431 A * | 3/1992 | Byrne | ................... | H01R 35/02 |
| | | | | 439/171 |
| 5,096,433 A * | 3/1992 | Boundy | ................ | H02G 3/288 |
| | | | | 439/215 |
| 5,096,434 A * | 3/1992 | Byrne | ................... | H02G 3/288 |
| | | | | 439/215 |
| 5,164,544 A * | 11/1992 | Snodgrass | ........... | H01R 25/164 |
| | | | | 174/495 |
| 5,178,555 A * | 1/1993 | Kilpatrick | ............ | H01R 25/164 |
| | | | | 248/222.41 |
| 5,203,713 A * | 4/1993 | French | ................ | H01R 25/006 |
| | | | | 439/211 |
| 5,259,787 A * | 11/1993 | Byrne | ................. | H01R 9/2608 |
| | | | | 439/532 |
| 5,582,522 A * | 12/1996 | Johnson | ............... | H01R 13/514 |
| | | | | 439/214 |
| 6,540,536 B1 * | 4/2003 | Young | ..................... | H02G 3/00 |
| | | | | 439/215 |
| 6,540,549 B2 * | 4/2003 | Rupert | .................. | H01R 13/64 |
| | | | | 439/215 |
| 6,575,777 B2 * | 6/2003 | Henriott | ............... | H01R 25/162 |
| | | | | 439/215 |
| 7,008,249 B2 * | 3/2006 | McCoy | ................ | H01R 25/165 |
| | | | | 439/171 |
| 7,144,264 B2 * | 12/2006 | Kochanski | ............ | H01R 25/16 |
| | | | | 439/215 |
| 7,387,520 B2 * | 6/2008 | Gosling | ............... | H01R 25/164 |
| | | | | 439/215 |
| 7,614,896 B2 * | 11/2009 | Johnson | ................... | H02G 3/00 |
| | | | | 439/120 |

\* cited by examiner

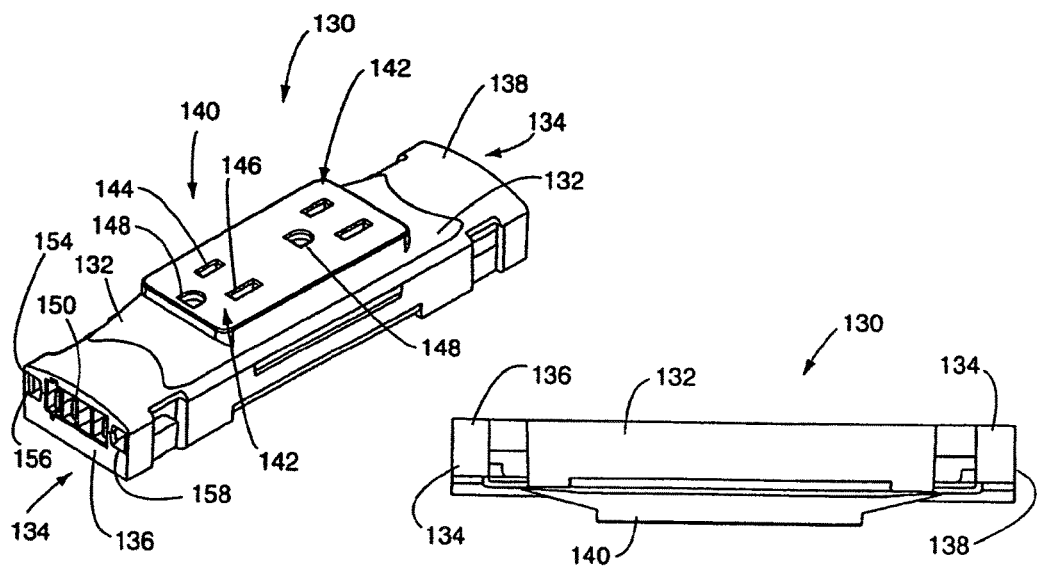
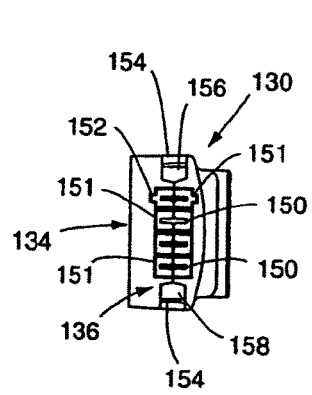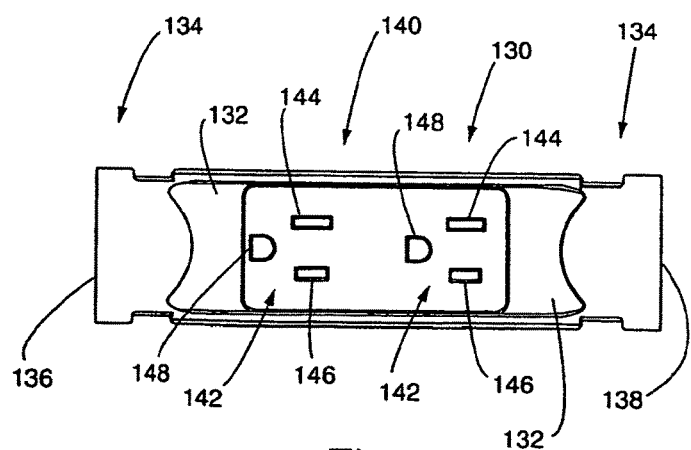
Fig. 2  Fig. 3
Fig. 4  Fig. 5

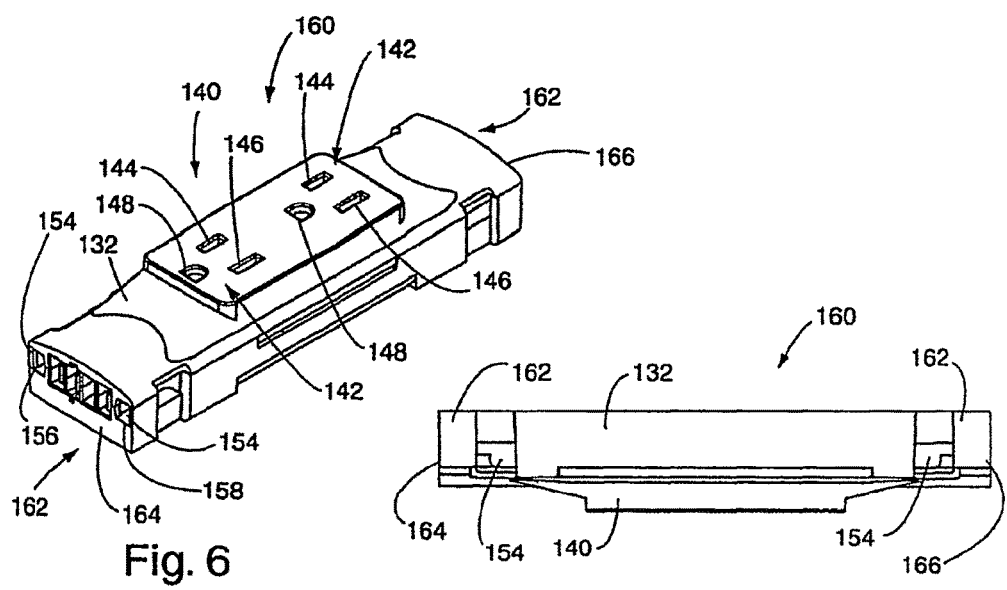
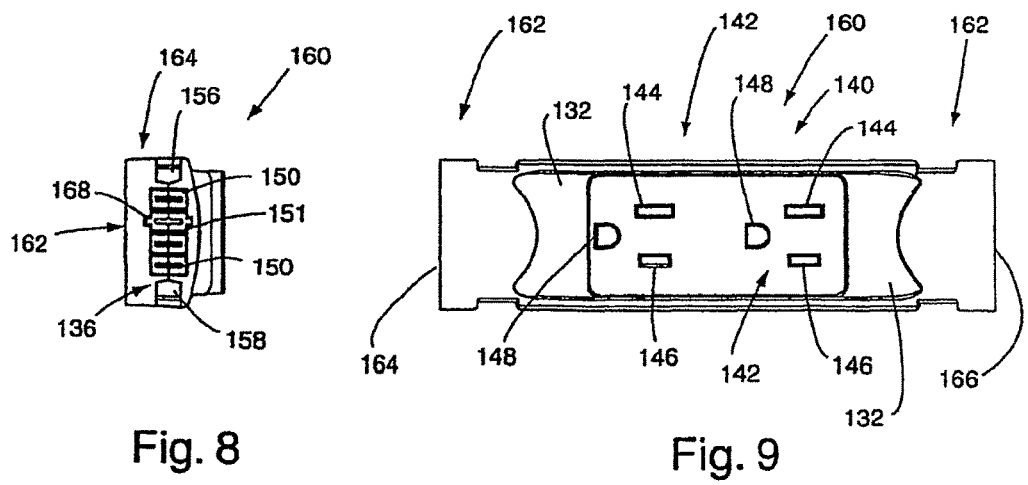

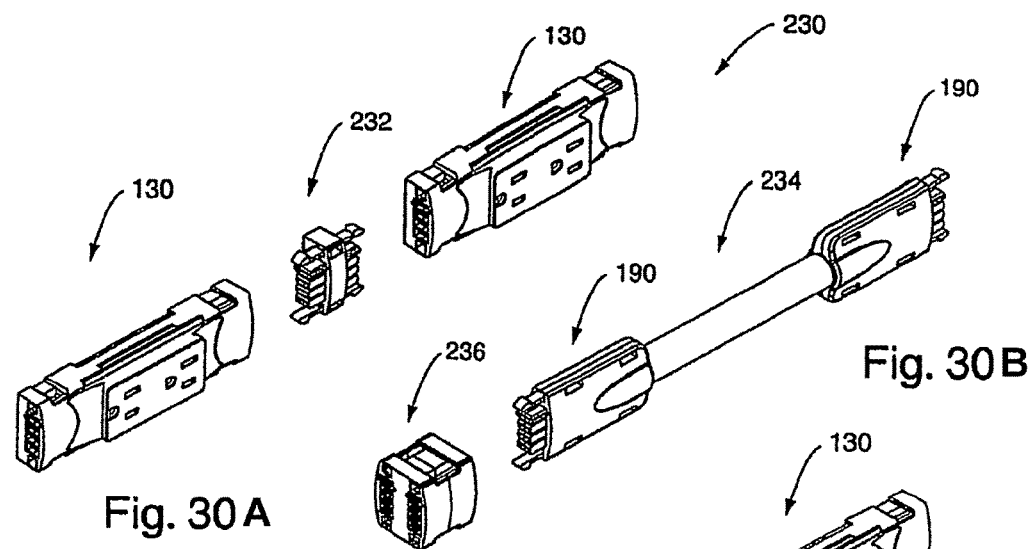
Fig. 30 A
Fig. 30 B
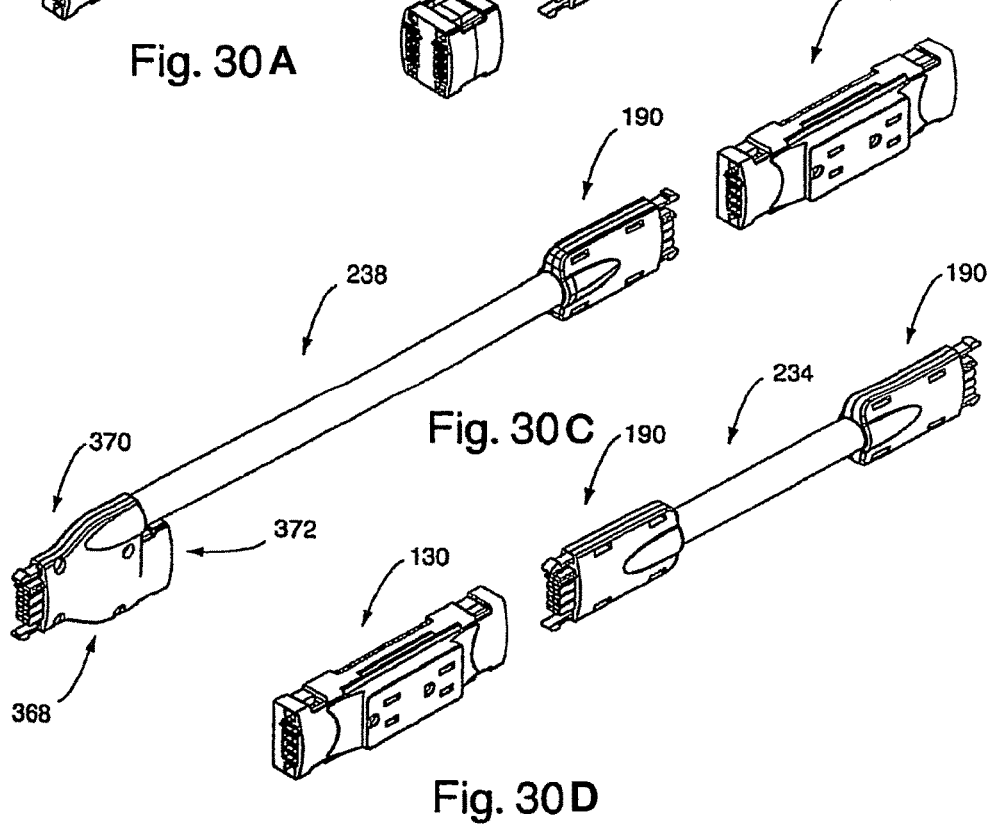
Fig. 30 C
Fig. 30 D

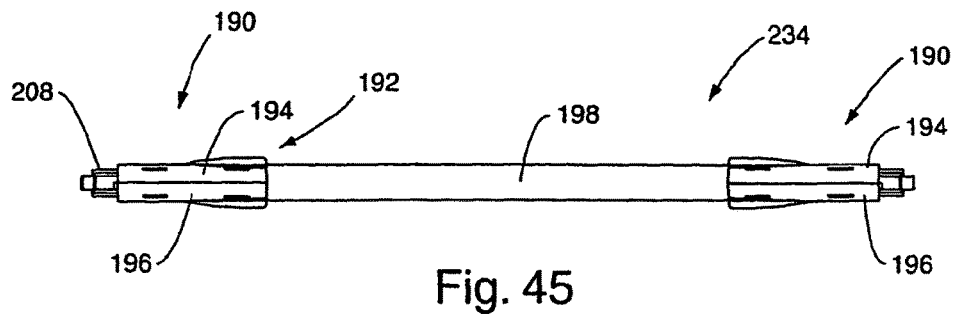
Fig. 45
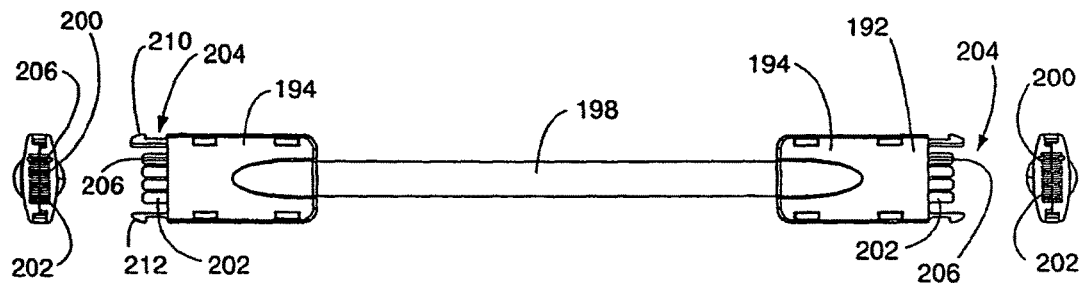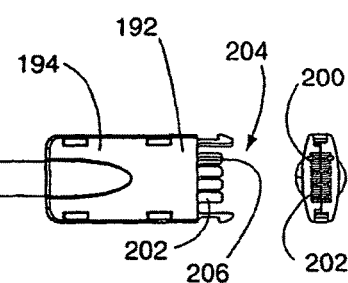
Fig. 47　　　Fig. 46　　　Fig. 48
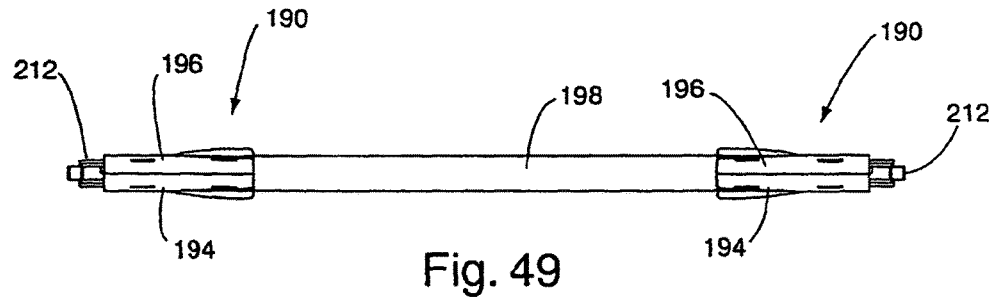
Fig. 49
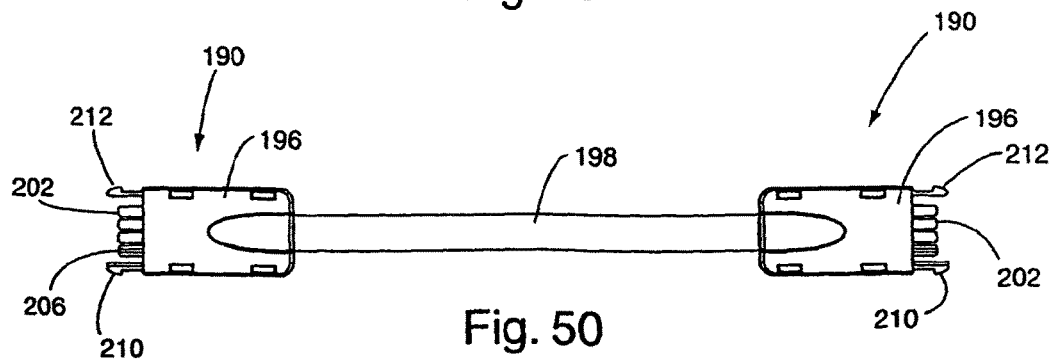
Fig. 50

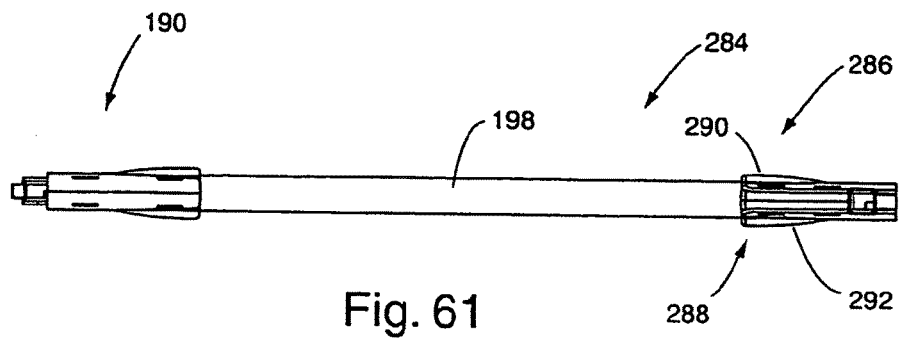
Fig. 61
 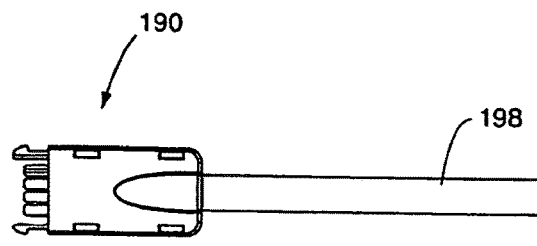 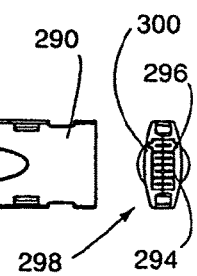
Fig. 63  Fig. 62  Fig. 64
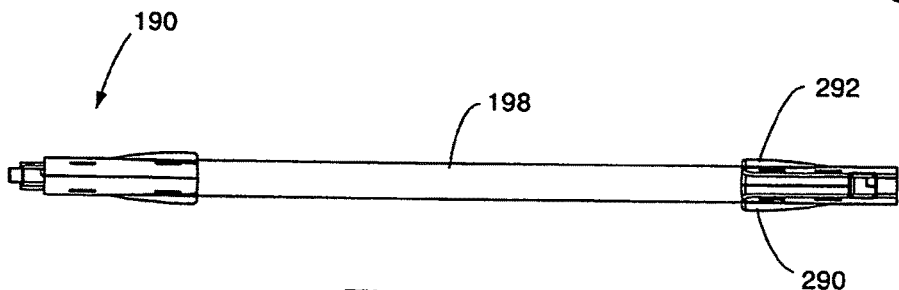
Fig. 65
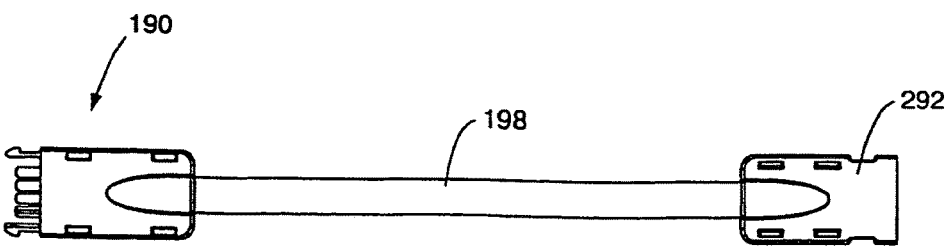
Fig. 66

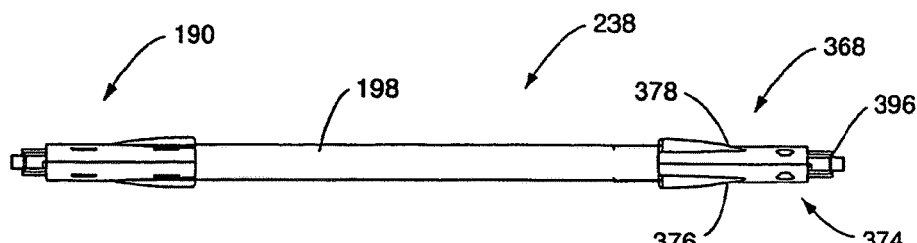
Fig. 102
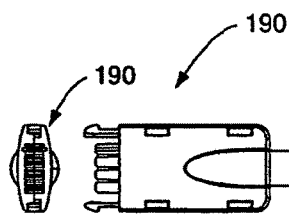 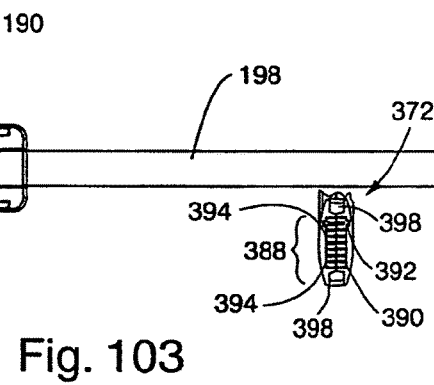 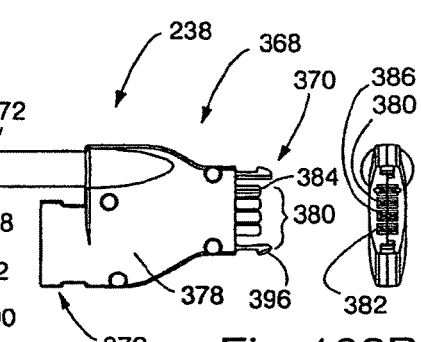
Fig. 103A    Fig. 103    Fig. 103B
Fig. 103C
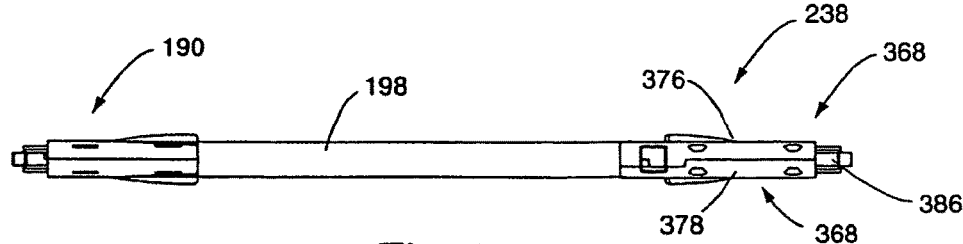
Fig. 104
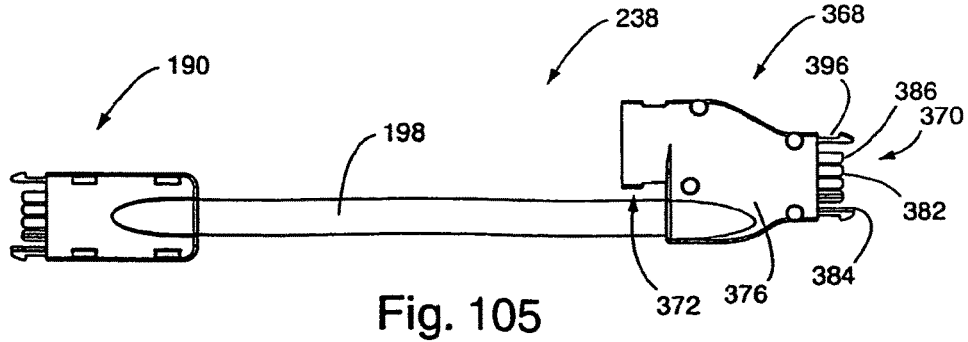
Fig. 105

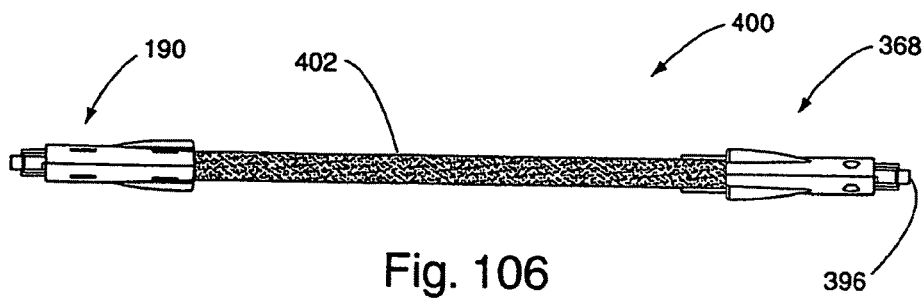
Fig. 106
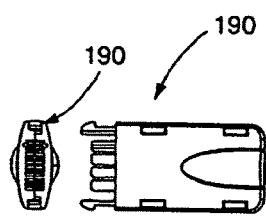  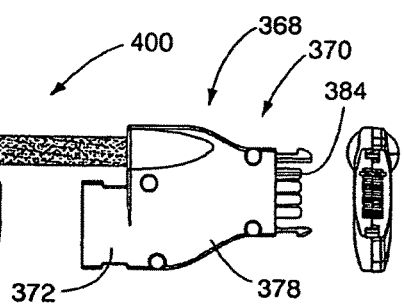
Fig. 107A  Fig. 107
Fig. 107C  Fig. 107B
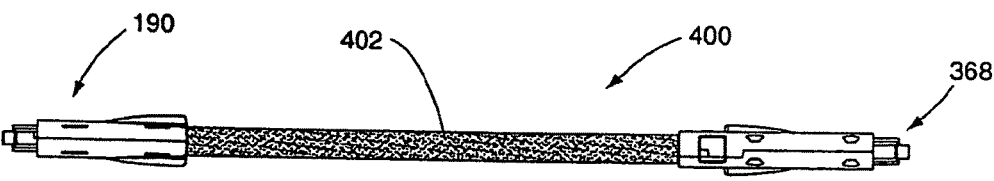
Fig. 108
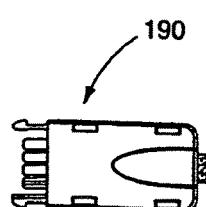
Fig. 109

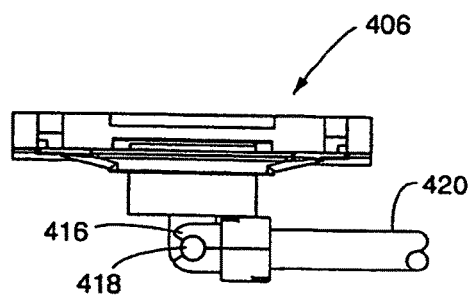
Fig. 118
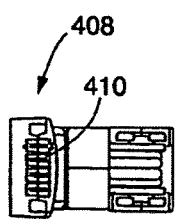 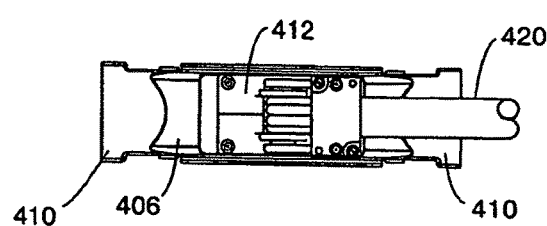 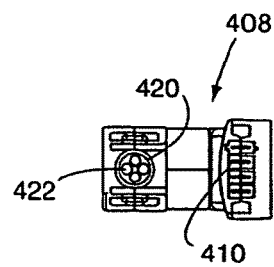
Fig. 120  Fig. 119  Fig. 121
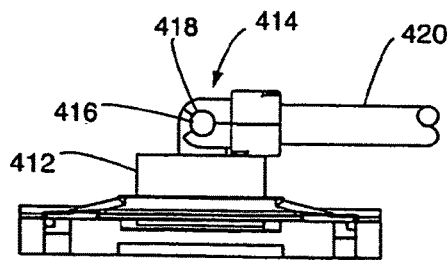
Fig. 122
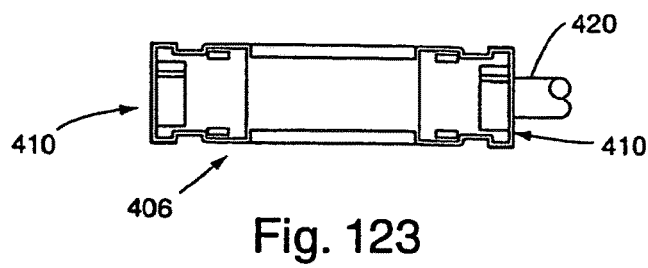
Fig. 123

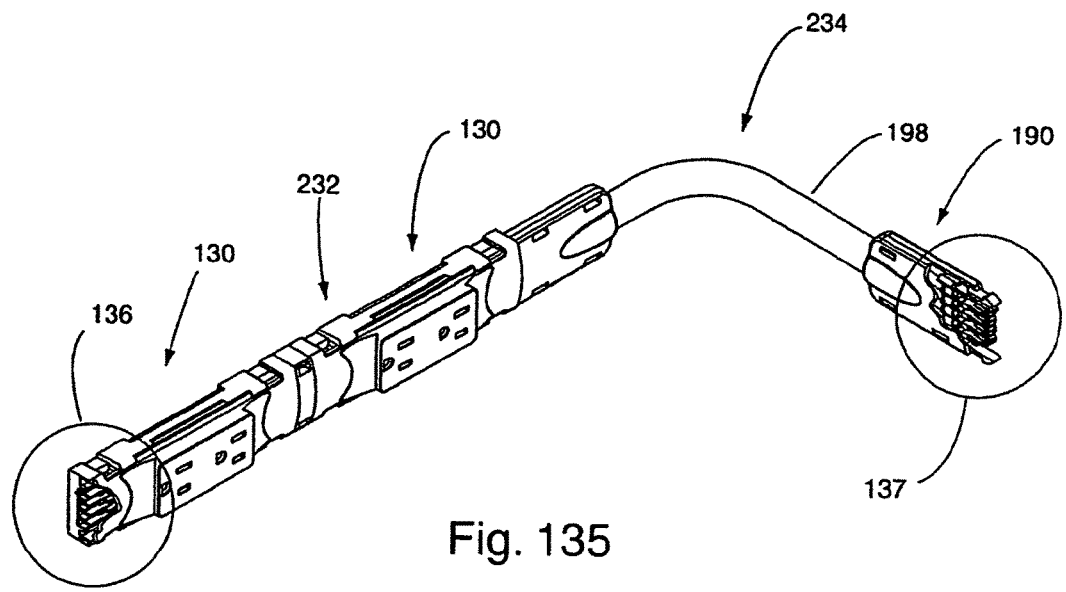
Fig. 135
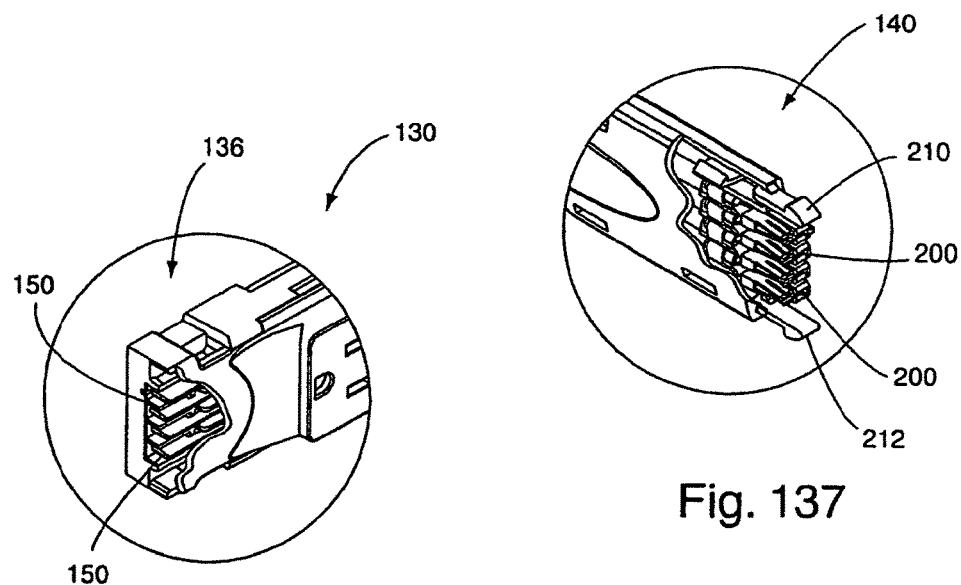
Fig. 136
Fig. 137

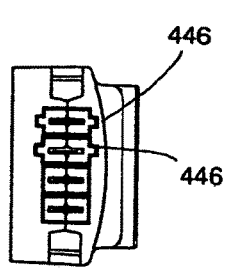 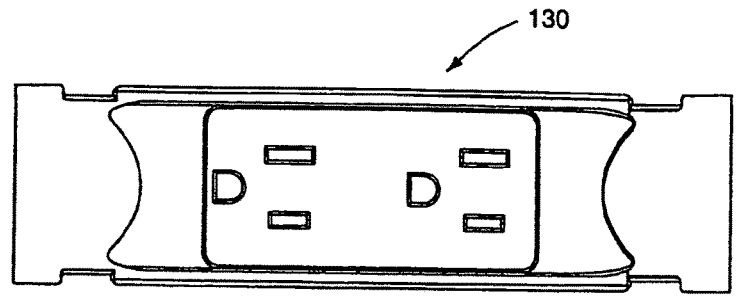
Fig. 138A Fig. 138
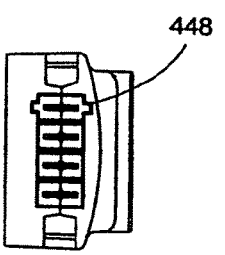 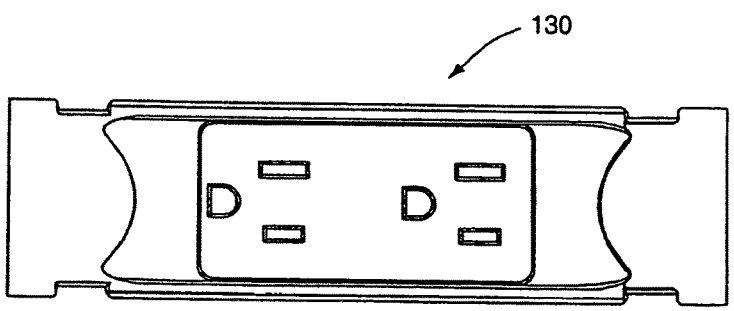
Fig. 140 Fig. 139
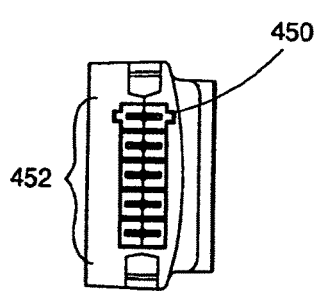 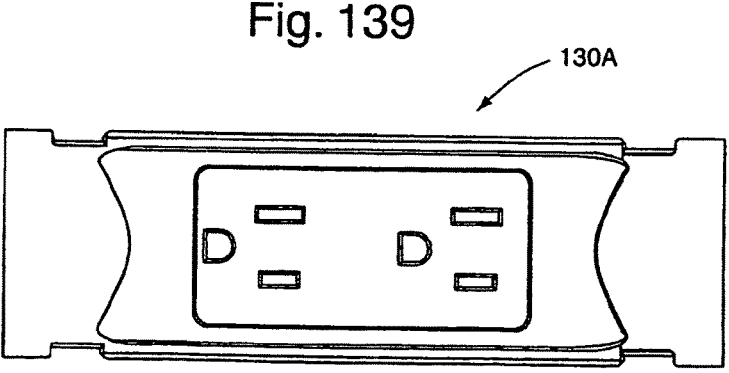
Fig. 142 Fig. 141

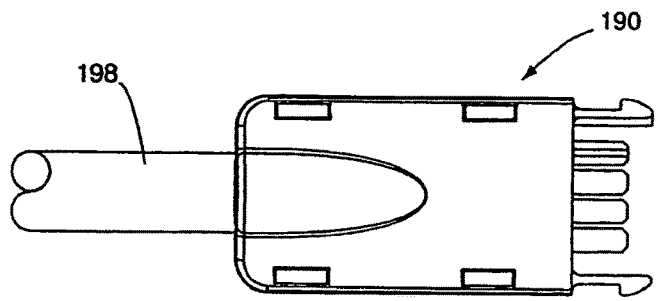
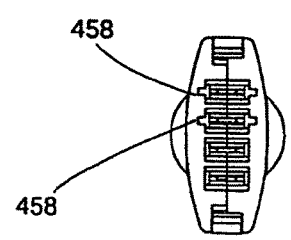
Fig. 154A
Fig. 154
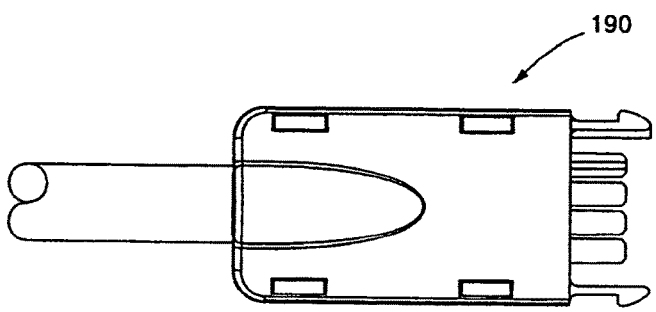
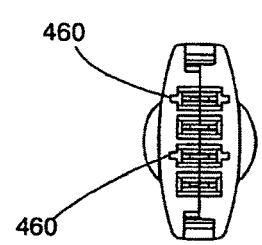
Fig. 155A
Fig. 155
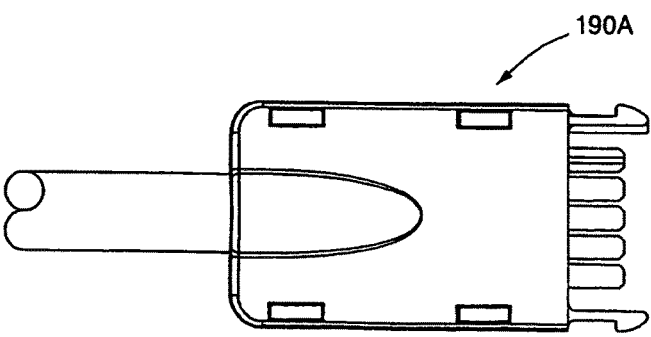
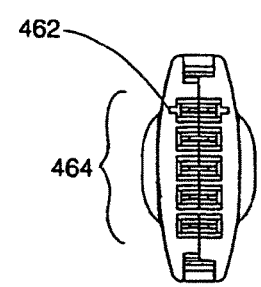
Fig. 156A
Fig. 156

MODULAR ELECTRICAL SYSTEM INCLUDING BACK-TO-BACK RECEPTACLE CONFIGURATIONS AND CAPABLE OF PROVIDING FOUR WIRE CIRCUITRY

CROSS-REFERENCE TO RELATED APPLICATIONS

This application is a continuation of U.S. patent application Ser. No. 15/360,331 filed Nov. 23, 2016, a continuation in part of Ser. No. 14/056,166 filed Oct. 17, 2013, and a continuation in part of Ser. No. 11/747,518, filed May 11, 2007, titled MODULAR ELECTRICAL SYSTEM INCLUDING BACK-TO-BACK RECEPTACLE CONFIGURATIONS AND CAPABLE OF PROVIDING FOUR WIRE CIRCUITRY.

STATEMENT REGARDING FEDERALLY SPONSORED RESEARCH OR DEVELOPMENT

Not applicable.

REFERENCE TO MICROFISHE APPENDIX

Not applicable.

BACKGROUND OF THE INVENTION

Field of the Invention

The invention relates to electrical power and communications distribution systems and, more particularly, to systems employing modular components with back-to-back circuit configurations and capable of providing for four wire circuit configurations with receptacles.

Background Art

Known interior wall systems typically employ pre-fabricated modular units. These units are often joined together in various configurations, so as to divide a workplace into smaller offices or work areas. Generally, such modular wall panels may be equipped with means for receiving general building power and, possibly, general communications. Such building power may, for example, be conventional AC power received either under floor or from relatively permanent walls or the like. In various types of environments comprising electrical equipment, or wherein electrical apparatus are otherwise employed, interconnections of electrical components to incoming utility power are typically provided by means of cables or wires. For example, in office systems compromising modular furniture components, it is often necessary to provide electrical interconnections between incoming power supplies and various types of electrical devices typically used in an office environment, such as electric typewriters, lamps, etc. Computer-related devices, such as video display terminals and similar peripherals, are also now commonly employed in various office and industrial environments.

One advantage inherent in modular office systems is the capability to rearrange furniture components as necessitated by changes in space requirements, resulting from changes in the number of personnel and other business-related considerations. However, these modular systems must not only allow for change in furniture configurations, but also must provide for convenient interconnection of electrical devices to utility power, regardless of the spacial configuration of the modular systems and resultant variable distances between electrical devices.

In providing the interconnection of electrical apparatus and power inputs, it is necessary to include an arrangement for feeding the incoming utility power to the power outlets. In stationary structures, such as conventional industrial buildings and the like, a substantial amount of room would normally exist behind stationary walls and other areas in which to provide the requisite cabling for interconnecting incoming utility power to electrical receptacles mounted in the walls. Such systems, however, can be designed so as to remain stationary throughout their lifetime, without requiring general changes in the office or industrial environment areas.

In addition to receiving electrical power from the general incoming building power supply, modular office systems typically require communications connections for office equipment such as telephones, internet communications and the like. The problems associated with providing distribution of communications essentially correspond to the same problems existing with respect to distribution of conventional electrical power.

In this regard, it is known to provide modular wall panels with areas characterized as raceways. Often, these raceways are located along bottom edges of modular panels. The raceways are adapted to house electrical cabling and electrical junction blocks. The cabling and junction blocks are utilized to provide electrical outlets and electrical power connections to adjacent panels. However, it is also apparent that to the extent reference is made herein to providing electrical outlets and electrical power connections for adjacent panels, the same issues exist with respect to providing communications among panels.

Still further, it is known that the raceway of one modular wall unit may be provided with a male connector at one end, and a female connector at another end. Pairs of junction blocks, each provided with electrical outlets, made to be disposed at spaced-apart positions along the raceway. Conduits may be extended between the junction blocks and between the connectors in the junction blocks. In this manner, electrical interconnection is provided between the units.

The modular panels of a space-divider may be configured, such that adjacent panels are in a straight line, or at various angular positions relative to each other. It is common to configure intersecting walls in such a fashion that three or four modular wall panels may intersect at right angles. Each of the panels typically requires electrical outlets, and may require outlets on both sides of the panels. In any event, electrical power has to be provided to all of the panels, and often only one of the panels at the multiple panel junction is connected to a power supply source. Under such circumstances, the interconnecting wiring becomes a significant problem. That is, special modifications may have to be made to power systems of wall panels to be used in such a configuration. Because interchangeability of wall panels is highly desirable, custom modifications are preferably avoided. Still further, modifications of wall panels on site at the installation facility is complex and may be relatively expensive.

In addition to the foregoing issues, problems can arise with respect to the use of junction blocks and the amount of room which may exist within a raceway. That is, raceways require sufficient room so as to provide for junction blocks, electrical outlet receptacle blocks, and cabling extending between junction blocks and between adjacent panels.

One example of a prior art system is illustrated in Propst's, et al., U.S. Pat. No. 4,382,648 issued May 10, 1983. In the Propst, et al. system, mating connectors of opposing panels are engaged when the panels are aligned in a straight line. When the panels are positioned in an intersecting relationship, specially manufactured couplers are utilized. One type of special coupler is used when the panels are positioned at right angles. Another type is used with adjoining panels arranged at angles other than right angles. Consequently, costly inventory of couplers must be maintained. The Propst, et al. system uses a double set of connectors comprising a male and female connector for each conductor to be interconnected. When a single one of these prior art panels intersects two adjacent panels, one of the specially manufactured couplers connects the female terminals to one of the adjacent panels, and another of the couplers connects the male terminals to the adjacent panel.

A further system is disclosed in Driscoll, U.S. Pat. No. 4,135,775, issued Jan. 23, 1979. In the Driscoll system, each panel is provided with an electrical outlet box in its raceway. Panels of different widths are provided with a pair of female connectors. Outlet boxes of adjacent panels are interconnected by means of flexible cables having male connectors at both ends. When three or four panels are adjoined in an intersecting arrangement, two cables may be connected the pair of female connectors at one end of an outlet box. In this manner, connection of two adjacent panels is facilitated.

With respect to both of the foregoing systems, and other than in the special intersecting relationship, one half of the double set of terminals of these systems is superfluous. There is a distinct disadvantage in modern day systems, where several independent electrical circuits are needed in a wall panel system, with each requiring separate connectors. Space for such circuits and their connectors is very limited in the raceway areas of modern, thin-line wall panels.

Other systems also exist with respect to electrical connectors, junction boxes, and the like. For example, Rodrigues, U.S. Pat. No. 1,187,010 issued Jun. 13, 1916, discloses a detachable and interchangeable electrical switch plug adapted for use in connection with various electrically heated appliances. A clamping device is positioned in a fixed, but detachable relationship to one end of the plug. Means are provided to enclose and prevent sharp flexure of the cord comprising a flexible enclosing tube gripped under tension by the other end of the clamping device. The plug and the clamping device may be simultaneously removed from the socket.

Finizie, U.S. Pat. No. 2,540,575, issued Feb. 6, 1951, discloses a cord guide member for utensil plugs. The concept is to reduce wear on the cord and the connector plug, and to provide a connection which will withstand heavy pulling strains without injury. Strain relief is also provided. A sectional body is equipped anteriorally adjacent one end of the body with terminals. The other end of the body contains an anterior chamber or socket. A pivotable cord-guiding member having a pivot member is movably mounted in the socket. A wedge-shaped strain relief insert is received within a wedge-shaped recess in the pivot member. A cord extends into the pivot member and includes wires passing from the cord toward the terminals. The incoming portions of the wires are moved around the insert and firmly wedged within the recess.

Byrne, U.S. Pat. No. 4,551,577, issued Nov. 5, 1985, describes a retractable power center. The power center provides for conveniently located electrical power source receptacles adapted to be mounted on a work surface. In one embodiment, the power center includes a rectangular housing received within a slot in a work surface. A clamping arrangement is utilized to secure the housing to the work surface. A lower extrusion is connected to the lower portion of the housing. A movable power carriage mounts the receptacles and a catch assembly releasably maintains a carriage in a closed and retracted position. In response to manual activation, the catch assembly is released and springs tensioned between the carriage and the extrusion exert forces so as to extend the carriage upward into an extended, open position. In the open position, the user can energize the desired electrical devices from the receptacles, and then lower the carriage into the retracted position.

Byrne, U.S. Pat. No. 4,959,021, issued Sep. 25, 1990, discloses a pivotable power feed connector having a pivotal connector adapted to be connected to a flexible conduit or cable. The cable has a series of conductors extending there through. The connector is pivotably connected to a block assembly through which the conductors extend. The block assembly, in turn, is connectable to a contact block, with the conductors conductively connected to a set of prong terminals extending outwardly from the block. A cover is secured over the block so as to prevent the prong terminals from being exposed during assembly and disassembly.

The cover automatically exposes the prong terminals as the power feed connector is moved into engagement with a receptacle in a modular office panel. The connector allows the conduit or cable to be swiveled to an arc of approximately 180 degrees to any desired position. The connector is also manually removable from interconnection with the block assembly. Such removal allows the conduit or cable to be pulled back from the conductors and cut to a desired length. The connector includes a power feed cover which can be utilized in part to maintain the connector in either of two spatial configurations relative to the block assembly.

Nienhuis, et al., U.S. Pat. No. 5,013,252, issued May 7, 1991, discloses an electrified wall panel system having a power distribution server located within a wall panel unit. The server includes four receptacle module ports oriented in an h-shaped configuration. A first receptacle port is located on the first side of the wall panel unit and opens toward a first end of the unit. A second receptacle unit is also located on the first side of the wall panel unit, and opens toward a second end of the wall panel unit. A third receptacle port and a second sided wall panel unit opens toward the first end of the wall panel unit, while correspondingly, a fourth receptacle port on the second side of the wall panel unit opens toward the second end of the wall panel unit. First and second harnesses are each electrically connected at first ends thereof to the power distribution server. They extend to opposite ends of the wall paneled unit and include connector ports on the second ends thereof for providing electrical interconnection of adjacent wall panel units. The Nienhuis, et al. patent also discloses a system with a wall panel connector interchangeably usable with the interconnection of two, three or four units. The connector includes a hook member for connecting together adjacent vertical members of frames of adjacent wall panel units at a lower portion thereof. A draw naught for connecting together adjacent vertical members of frames of adjacent wall panel units and an odd proportion thereof is provided by vertical displacement thereof.

Lincoln, et al., U.S. Pat. No. 5,073,120, issued Dec. 17, 1991, discloses a power distribution assembly having a bussing distribution connector. The connector includes a series of bus terminals positioned within an electrically insulative housing. A series of electrical terminals are positioned in the housing for distributing more than one electrical circuit. At least one ground terminal, one neutral terminal, and three hot terminals are provided. A grounding shell partially surrounds the bus connector and includes a grounding tab grounding the one ground terminal to the metallic grounding shell. In another embodiment, two bus connectors are interconnected together, so as to provide for an increased number of output ports.

Byrne, U.S. Pat. No. 5,096,431, issued Mar. 17, 1992, discloses an outlet receptacle with rearrangeable terminals. The receptacle is provided with input terminals to selected positions, for engagement with terminals of an electrical junction block. The block includes a series of terminals representing a plurality of different electrical circuits. The receptacle block has neutral, ground and positive flexible positive conductor bars electrically connected to neutral, ground and positive electrical terminals. Input terminals of the block are formed integral with the flexible conductor bars and levers are provided for moving the terminal ends of the conductor bars to physically different positions. In one configuration, the receptacle block housing is provided with openings at opposing ends, and the flexible conductor bars have terminal ends controlled by levers at both ends of the outlet receptacle block. In another configuration, the block has output terminals in a front wall, and the input terminals of the receptacle block are formed as ends of the flexible bars and extend at an approximately 90 degree angle to the bars. They further send through openings in the back wall of the outlet receptacle for engagement with terminals of a junction block. Levers are provided in the back wall of the receptacle block for positioning the terminal ends in alignment with different terminals of the junction block, and windowed openings in the front wall expose indices on the levers identifying selected circuits.

Byrne, U.S. Pat. No. 5,096,434, issued Mar. 17, 1992, discloses an electrical interconnection assembly for use in wall panels of a space divider wall system. The system includes junction blocks having several receptacle connectors, so as to provide a plurality of electrical outlets on both sides of a wall panel. The junction block is connected by means of conduits extending from both ends of the junction block to oppositely directed connector blocks for connection to adjoining panels. The assembly of the junction block and connector blocks allows electrical power to be supplied to one end of the panel and conducted to and through the junction block to other panels. The receptacle connectors on the junction block each have one type of terminal configuration, e.g., a female electrical terminal configuration. One of the connector blocks is provided with the identical terminal configuration. The other connector block is provided with a matching terminal configuration, e.g., a male electrical terminal configuration. When two wall panels are joined at their respective edges, the male connector block may be readily connected to the female connector block in the adjacent panel. When two panels are joined to a third panel, all at one point, the arrangement of this invention allows the male connector block to be connected to the female connector block of one of the other two panels, and the male connector of the other of the two panels may be connected to one of the receptacle connectors of the junction block on either of the other two panels, in this manner establishing a three way interconnection arrangement. In a similar fashion, a fourth, or other additional panels may be added to the junction and plug into receptacle outlets of other panels in order to provide an arrangement of panels that is totally interconnected, electrically.

Snodgrass, et al., U.S. Pat. No. 5,164,544, issued Nov. 17, 1992, describes an electrified space dividing panel having a panel member, raceway, modular, or electric system disposed in a raceway and raceway covers for gaining access to the system. The system includes a single terminal block having end and side sockets, with first and second electrical receptacles being respectively removeably engaged with the end socket and the side sockets, such that the first and second electrical receptacles are disposed in horizontally spaced, side-by-side relation and project outwardly for predetermined light dimensions through receptacle openings in one of the raceway covers. The raceway can include a web having an opening which cooperates with a support ear on the first receptacle during engagement of the first receptacle with an end socket, so as to provide additional lateral support for the electrical receptacle when a plug is removed there from.

Kilpatrick, et al., U.S. Pat. No. 5,178,555, discloses a kit which includes a junction box for installation along a raceway. The kit includes a mounting bracket having a first adjustable mounting mechanism for locating the bracket along the raceway. This provides an initial adjustment, and a second adjustable mounting mechanism is provided for securing the junction box to the mounting bracket. This adjustably locates the junction box along the mounting bracket, and provides a second or final adjustment to accurately locate the junction box between two pre-measured lengths of cable.

Byrne, U.S. Pat. No. 5,259,787, issued Nov. 9, 1993, discloses an electrical junction block mounting assembly, which may be utilized for mounting the junction block within a raceway. The assembly includes a cantilever beam formed on an outer wall of the junction block. This beam is provided with a transversely extending channel for engagement with a support structure. The beam is attached to the junction block by means of a resilient hinge section, and is provided with a first arm section extending between the hinge section and the channel, and a second arm section extending beyond the channel. The first arm section has a sloping surface sloping away from the outer channel between the hinge section of the panel. The second armed section has a sloping surface sloping toward the wall beyond the channel. The surfaces will contact a mounting rail or similar structure during installation of the junction block. In this manner, the hinged cantilever beam is deflected until the rail is in alignment with the channel for engagement with the structural support member.

Another issue which exists with respect to raceway systems has to do with size, when the number of circuits provided by 8, 12 or 14 wire electrical configurations is unnecessary. For example, a system can be provided through the use of four wires, where the four wires can provide for two separate electrical circuits. In such an instance, each circuit consists of a hot, common and ground wire. The two separate circuits utilize two separate hot wires. However, the two circuits also use the same ground wire and the same common or neutral wire. With these types of configurations, it would be preferable for the electrical holding components to be of a size which would be appropriate for four wire circuitry.

A further issue which can arise relates to physical size somewhat independent of the issue of the number of circuits. That is, some furniture designs utilize relatively narrow panels and desk systems. Concurrently, these narrow panels and desk systems have relatively small raceways. It will be advantageous to provide for a modular electrical system of a size which readily fits within the small raceways.

Still further, one disadvantage of known modular electrical systems relates to the substantial large volume of individual components. In this regard, it would be advantageous to be able to combine certain known electrical components into one physical element. For example, it is relatively common for electrical receptacles to be separate components which are electrically interconnected to junction blocks. To reduce the number of parts required for panels and desk assemblies, it would be advantageous for the junction blocks and the receptacles to be mechanically formed as one piece.

Relatively inherent difficulties with a number of known modular electrical systems relates to the ease of assembly and installation. It is sometimes a "trade off" with known systems to facilitate assembly and installation, while still providing for relatively secure latching or other connection mechanisms between electrical components. In this regard, it would be advantageous to provide for a system which facilitates assembly and installation, while maintaining a positive latching mechanism structure.

Still further, one difficulty which arises with respect to connectors utilized with modular interval systems relates to ensuring for correct polarization and circuitry configurations. In this regard, it would be advantageous to include male and female connector configurations which are keyed so as to provide for correct polarization and circuitry. Correspondingly, for different types of circuit configurations, it would be advantageous to provide for the keying to be modified.

BRIEF DESCRIPTION OF THE DRAWINGS

The invention will now be described with reference to the drawings, in which:

FIG. 2 is a perspective view of a four-wire receptacle junction block with keying, in accordance with the invention;

FIG. 3 is an upside-down view of the four-wire receptacle junction block illustrated in FIG. 2;

FIG. 4 is a left, side elevation view of the four-wire female receptacle junction block illustrated in FIG. 2;

FIG. 5 is a front, elevation view of the four-wire female receptacle junction block illustrated in FIG. 2;

FIG. 6 is a perspective view of a four-wire female receptacle junction block in accordance with the invention, similar to the junction block shown in FIG. 2, but with an alternative keying arrangement;

FIG. 7 is an upside-down view of the four-wire female receptacle junction block illustrated in FIG. 6;

FIG. 8 is a left-side elevation view of the four-wire female receptacle junction block illustrated in FIG. 6;

FIG. 9 is a front, elevation view of the four-wire female receptacle junction block illustrated in FIG. 6;

FIG. 30A illustrates a set of four-wire receptacle junction blocks having male/male end connectors;

FIG. 30B illustrates a two-way connector having female/female terminals;

FIG. 30C illustrates a four-way connector assembly having male/male end connectors on each of the opposing ends of the connector assembly;

FIG. 30D illustrates a three-way jumper assembly having a pair of female end connectors and a male end connector;

FIG. 45 is a planned view of a two-way jumper assembly for use with the modular electrical system in accordance with the invention;

FIG. 46 is a front, elevation view of the jumper assembly shown in FIG. 45;

FIG. 47 is a left-end elevation view of the jumper assembly shown in FIG. 45;

FIG. 48 is a right-end view of the jumper assembly shown in FIG. 45;

FIG. 49 is an underside view of the jumper assembly shown in FIG. 45;

FIG. 50 is a rear, elevation view of the jumper assembly shown in FIG. 45;

FIG. 61 is a planned view of a two-way jumper assembly in accordance with the invention, showing the jumper assembly with a female end connector block and a male end connector block;

FIG. 62 is a front, elevation view of the jumper assembly shown on FIG. 61;

FIG. 63 is a left-end, elevation view of the jumper assembly shown on FIG. 61;

FIG. 64 is a right-end, elevation view of the jumper assembly shown on FIG. 61;

FIG. 65 is an underside view of the jumper assembly shown on FIG. 61;

FIG. 66 is a rear, elevation view of the jumper assembly shown on FIG. 61;

FIG. 102 is a plan view of a three way jumper assembly in accordance with the invention;

FIG. 103 is a front, elevation view of the three way jumper assembly shown in FIG. 102;

FIG. 103A is a left-end, elevation view of one end of the three way jumper assembly shown in FIG. 102;

FIG. 103B is a right-end, elevation view of the three way jumper assembly shown in FIG. 103;

FIG. 103C is an end, elevation view of the male connector block of the three way jumper assembly shown in FIG. 102;

FIG. 104 is an underside view of the three way jumper assembly shown in FIG. 102;

FIG. 105 is a rear, elevation view of the three way jumper assembly shown in FIG. 102;

FIG. 106 is a plan view of a further embodiment of a three way jumper assembly in accordance with the invention, showing the connector cable with a wire mesh configuration;

FIG. 107 is a front, elevation view of the three way jumper assembly shown in FIG. 106;

FIG. 107A is a left-end, elevation view of one of the end connector blocks of the three way jumper assembly shown in FIG. 106;

FIG. 107B is a right-end, elevation view of the three way jumper assembly shown in FIG. 106;

FIG. 107C is an end view of the male connector block of the three way jumper assembly shown in FIG. 106;

FIG. 108 is an underside view of the three way jumper assembly shown in FIG. 106;

FIG. 109 is a rear, elevation view of the three way jumper assembly shown in FIG. 106;

FIG. 110 is a perspective view of the three way jumper assembly shown in FIG. 102;

FIG. 111 is a perspective view of the three way jumper assembly shown in FIG. 106;

FIG. 112 is a reverse perspective view of the three way jumper assembly shown in FIG. 102;

FIG. 113 is a partial, sectional view showing the internal components of the male/female end connector block of the three way jumpers shown in FIG. 102;

FIG. 114 is a sectional view of the four wire female end connector block of the three way jumper assembly shown in FIG. 102;

FIG. 115 is a perspective and partially exploded view showing the relative positioning of the three way jumper assembly shown in FIG. 102 and one of the two way jumper assemblies, with one of the female end connector blocks of the two way jumper assembly being positioned so as to electrically interconnect to the male connector block of the three way jumper assembly;

FIG. 116 is a perspective view similar to FIG. 115, but showing the two way female jumper assembly connected to the three way jumper assembly;

FIG. 117 is a perspective and partially exploded view of the wire mesh three way jumper assembly shown in FIG. 106, and further showing internal components of the male/female end connector block and the female end connector block of the three way jumper assembly;

FIG. 118 is a plan view of a power end connector which may be utilized with the modular electrical system in accordance with the invention;

FIG. 119 is a front, elevation view of the power end connector shown in FIG. 118;

Figure 124:
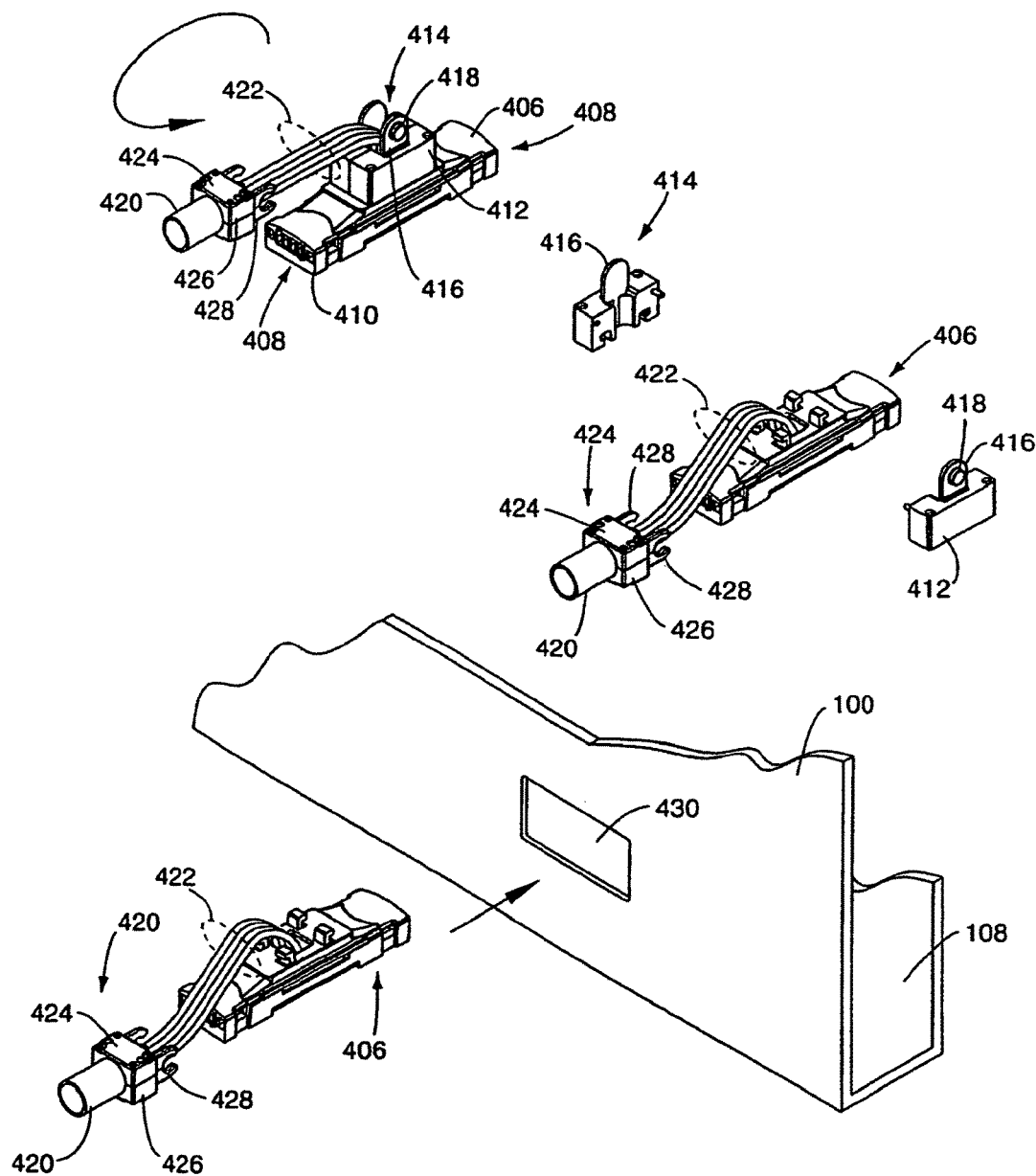
Figure 125:
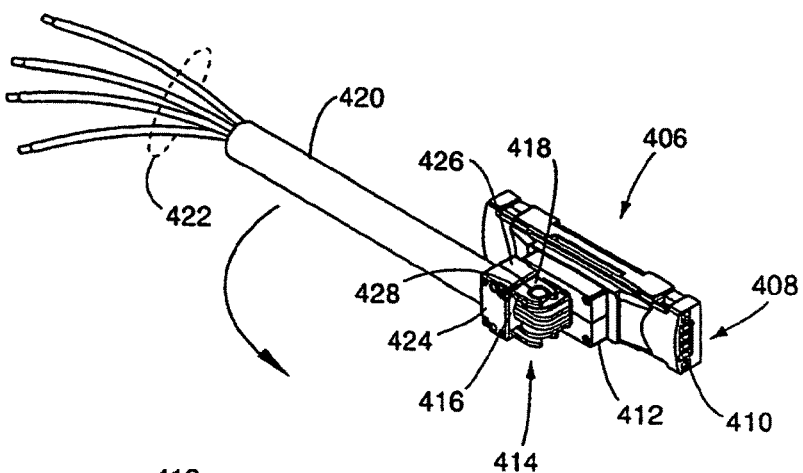
Figure 126:
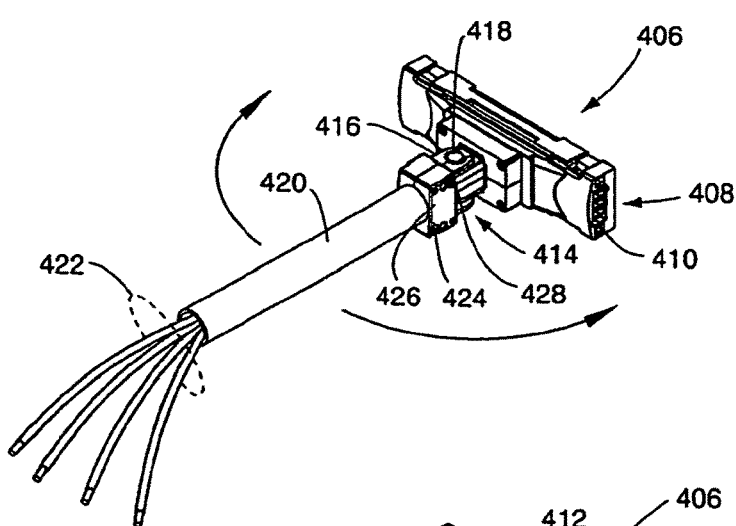
Figure 127:
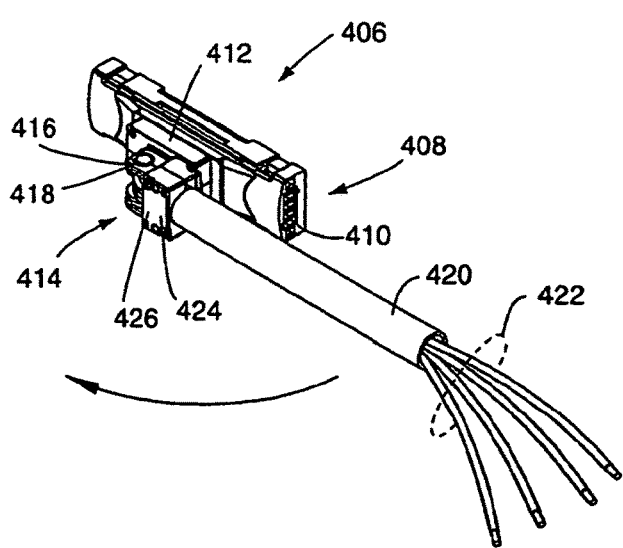
Figure 128:
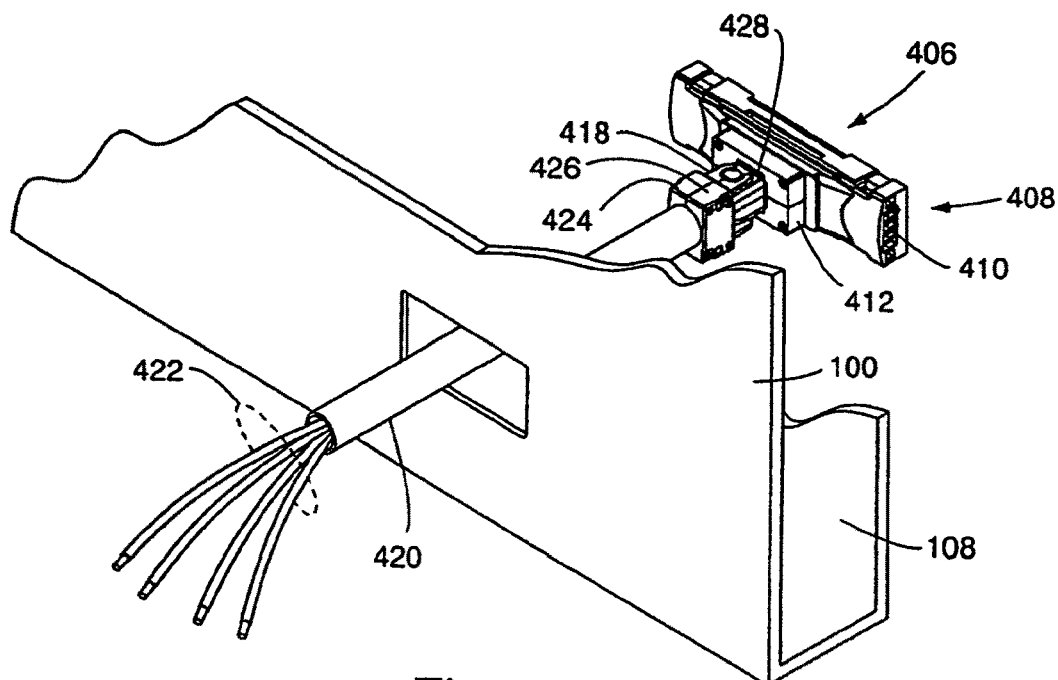
Figure 129:
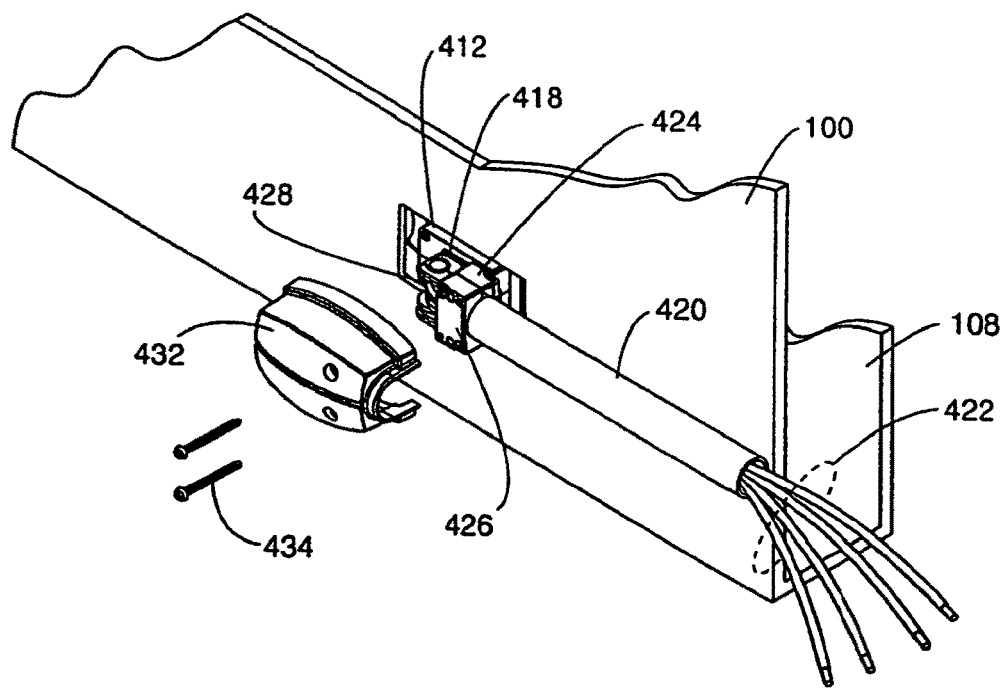
Figure 130:
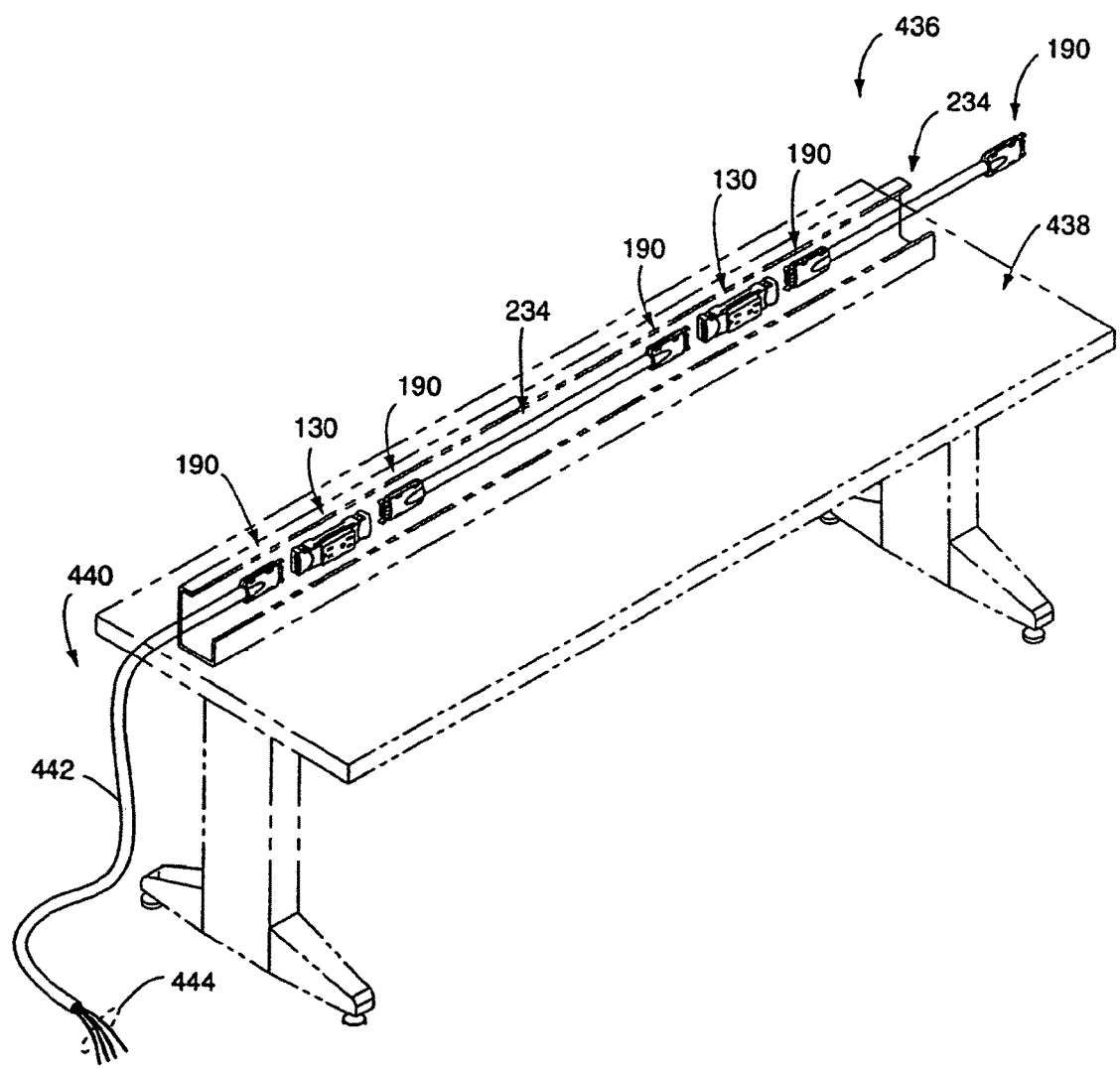
Figure 131:
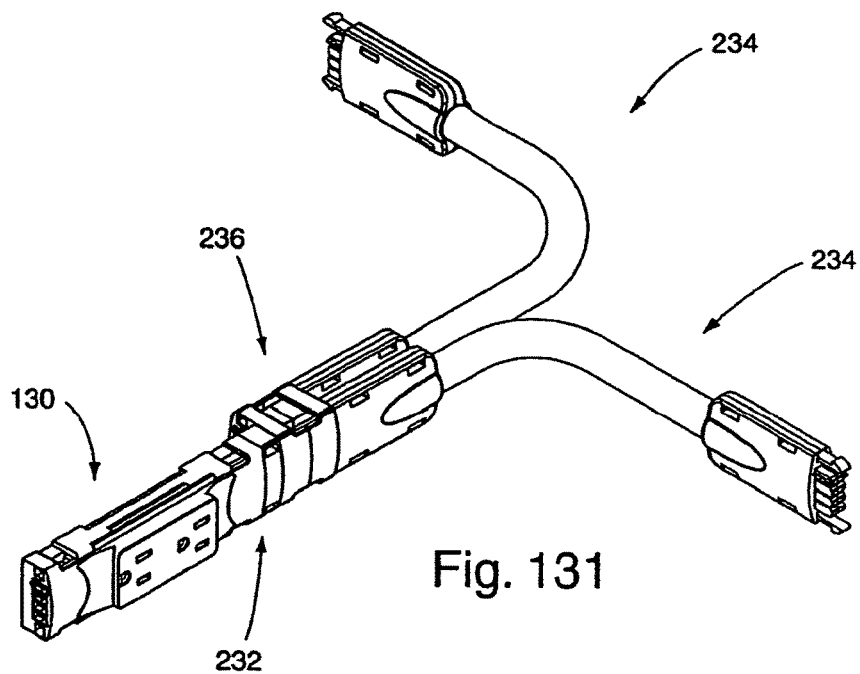
Figure 132:
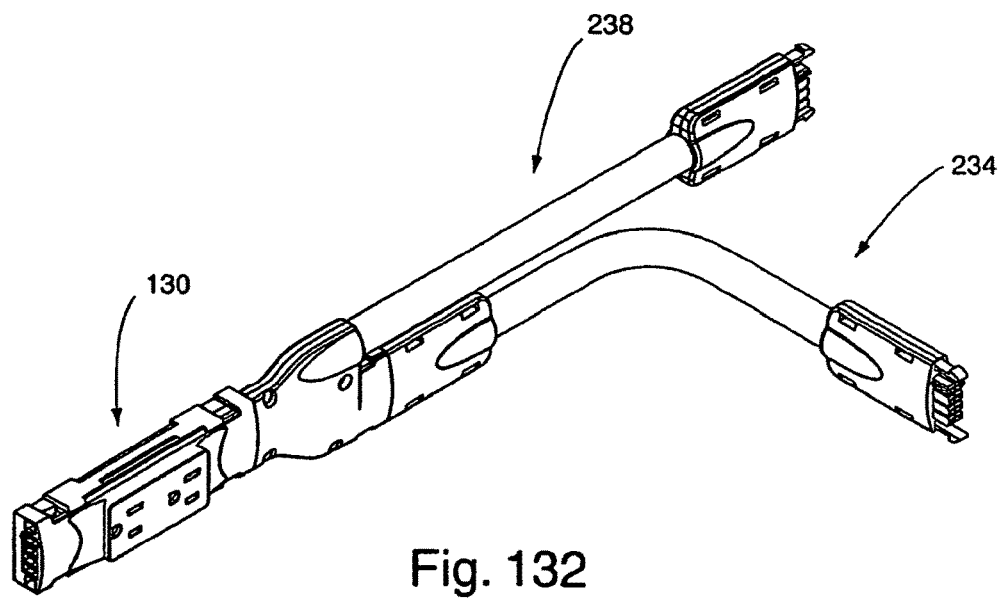
Figure 133:
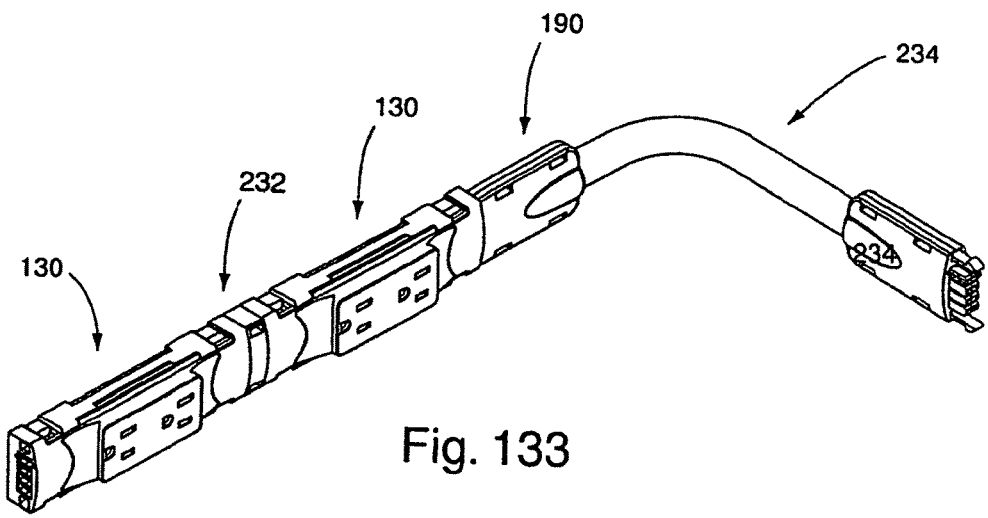
Figure 134:
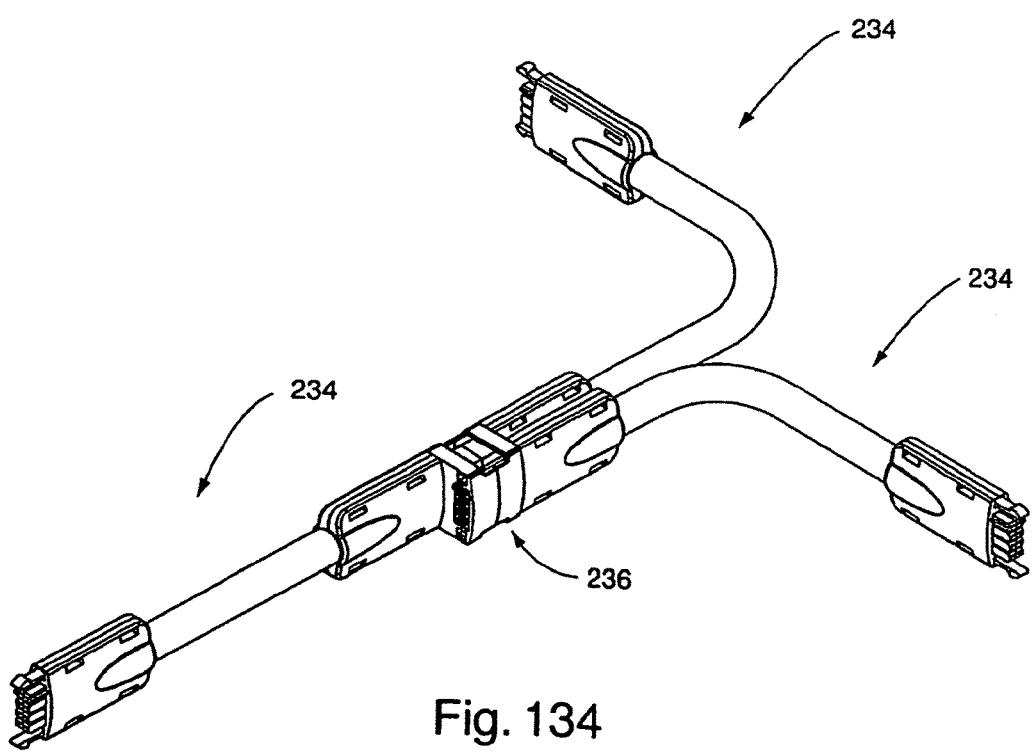
Figure 143:
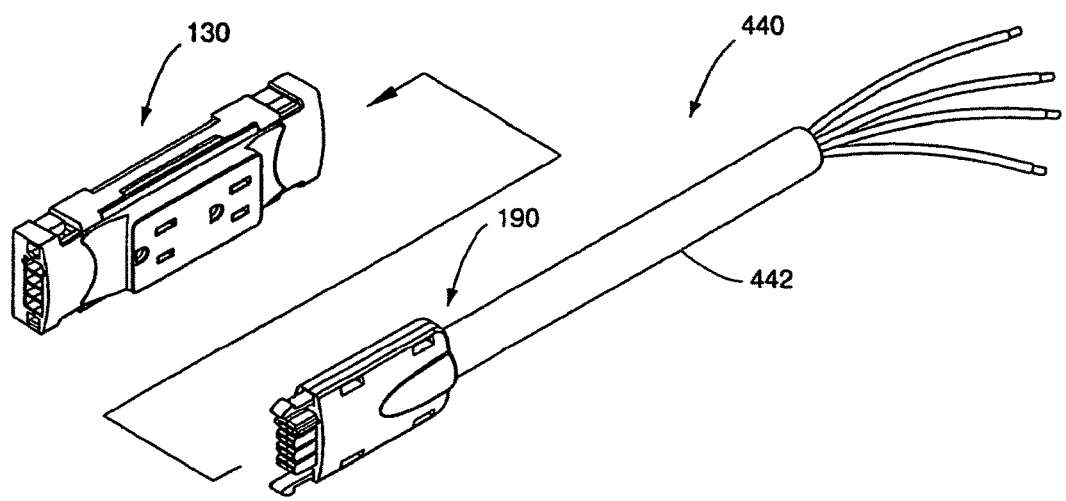
Figure 144:
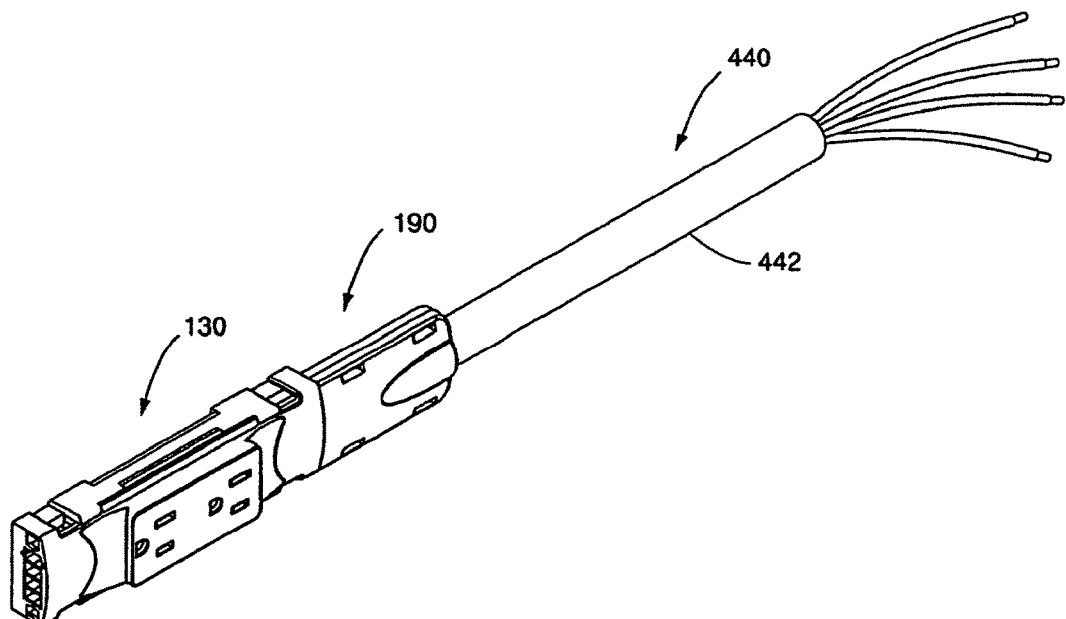
Figure 145:
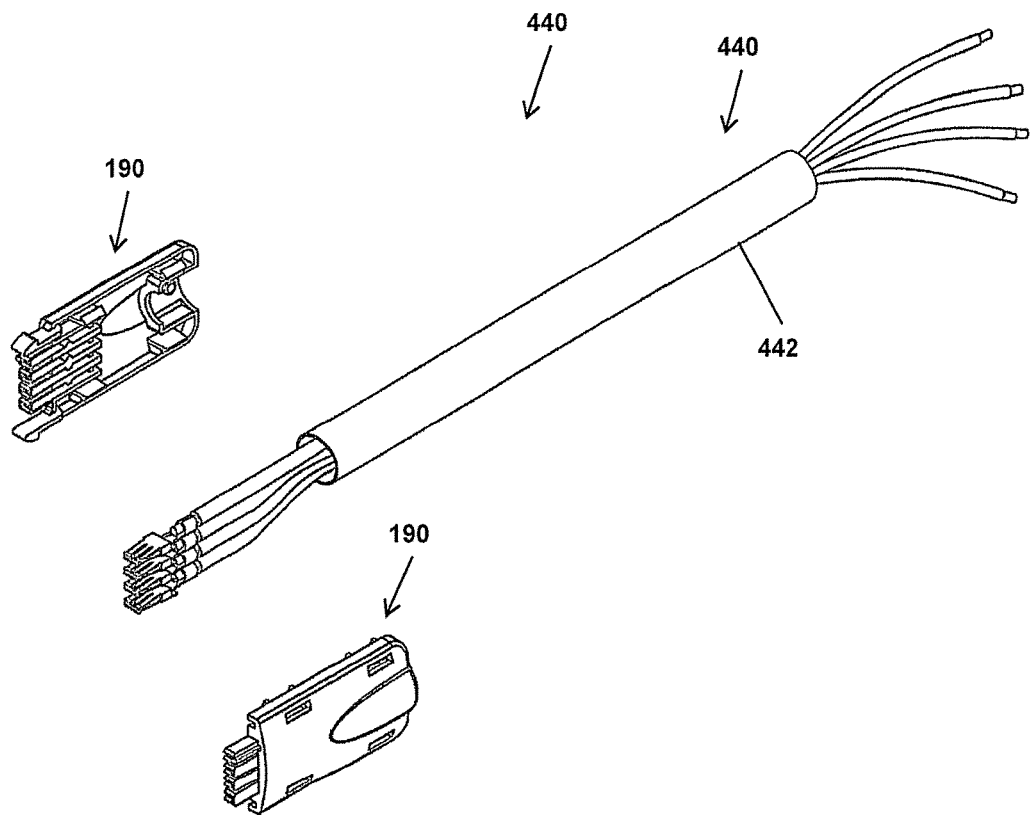
Figure 146:
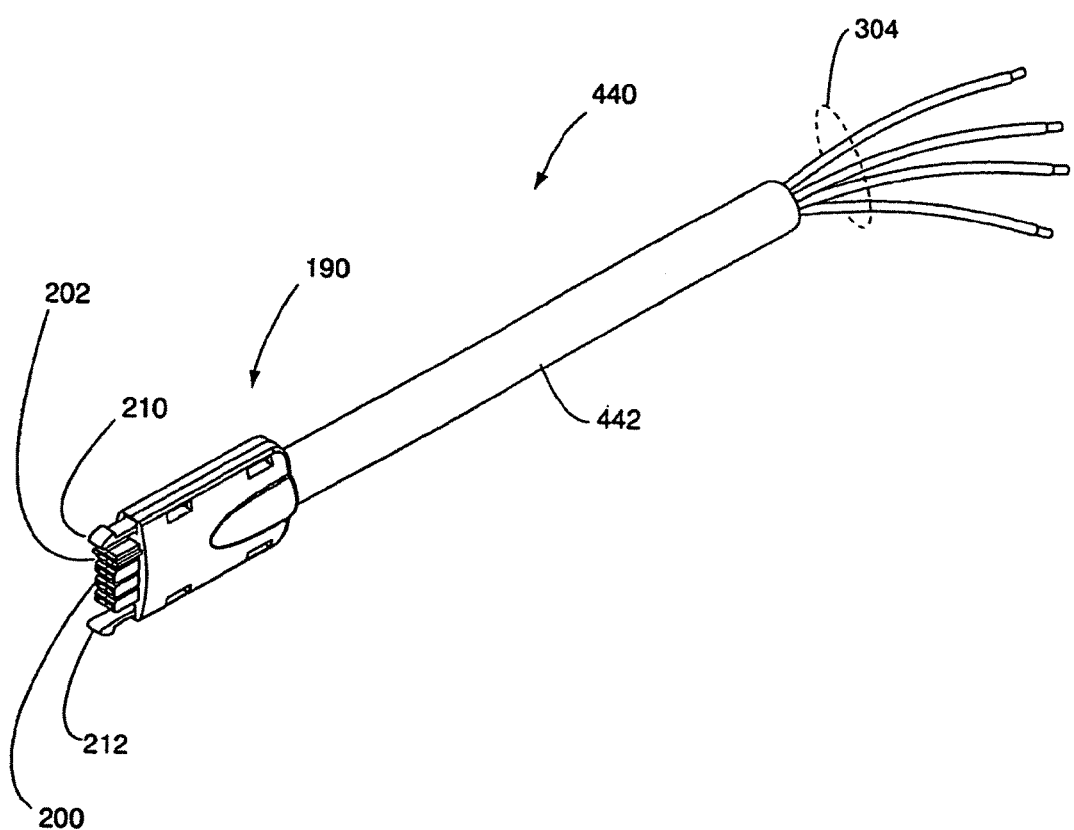
Figure 147:
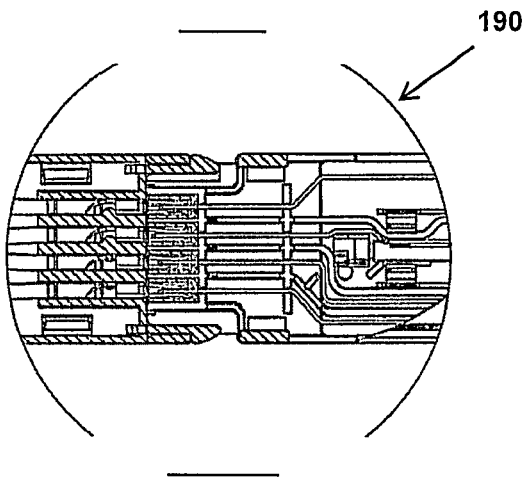
Figure 148:
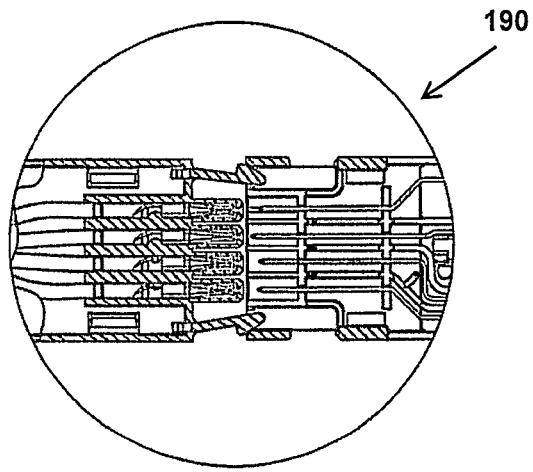
Figure 149:
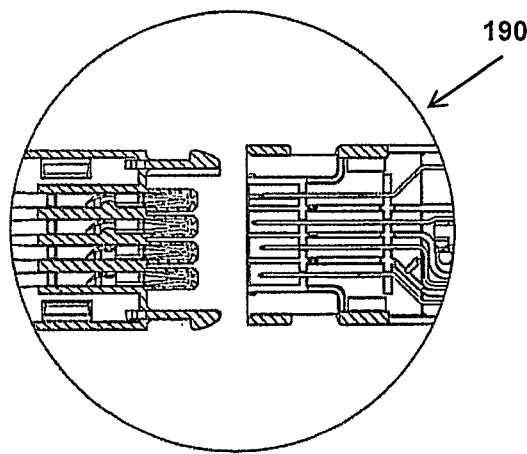
Figure 150:
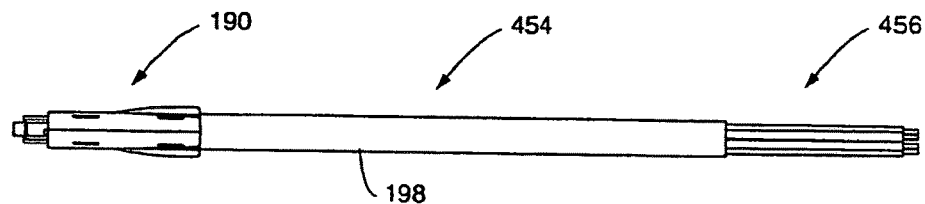
Figures 151, 151A:
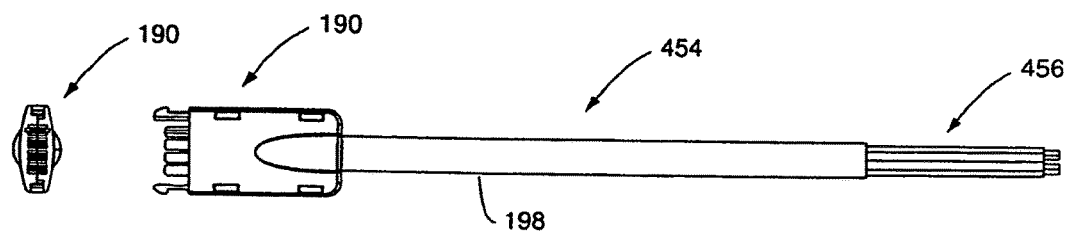
Figure 152:
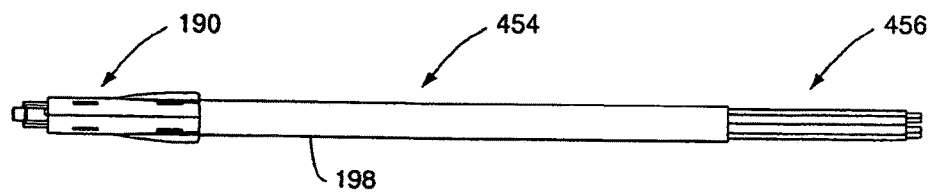
Figure 153:
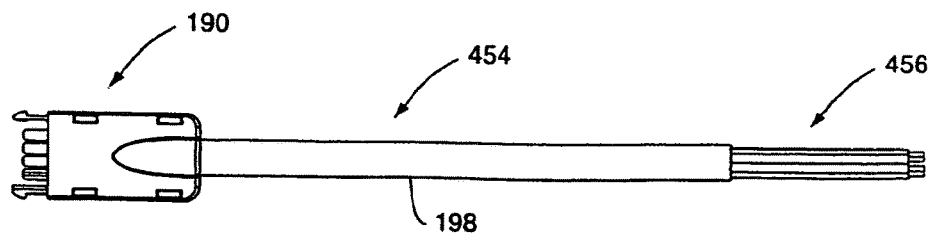
Figure 157:
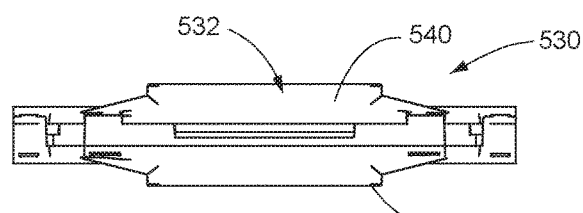
Figure 159:
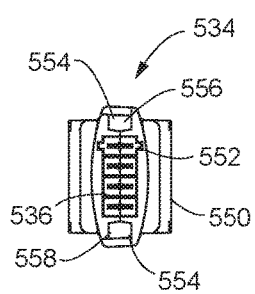
Figure 158:
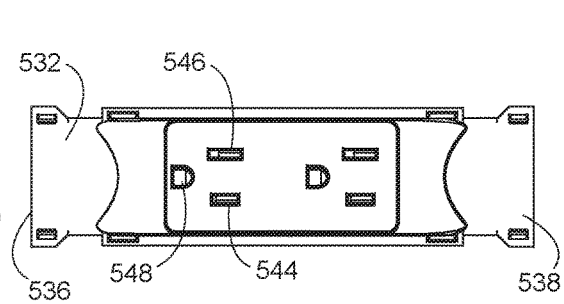
Figure 160:
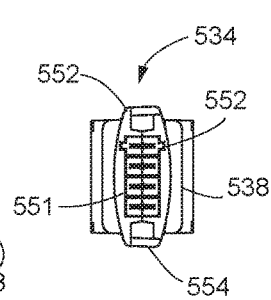
Figure 161:
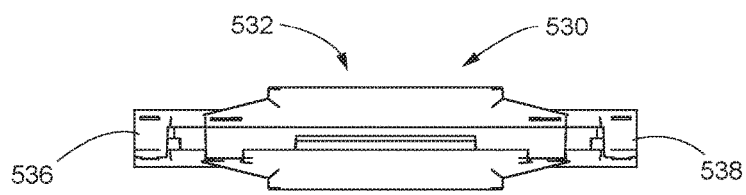
Figure 162:
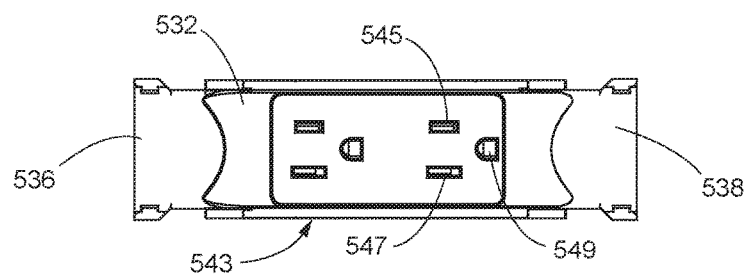
Figure 163:
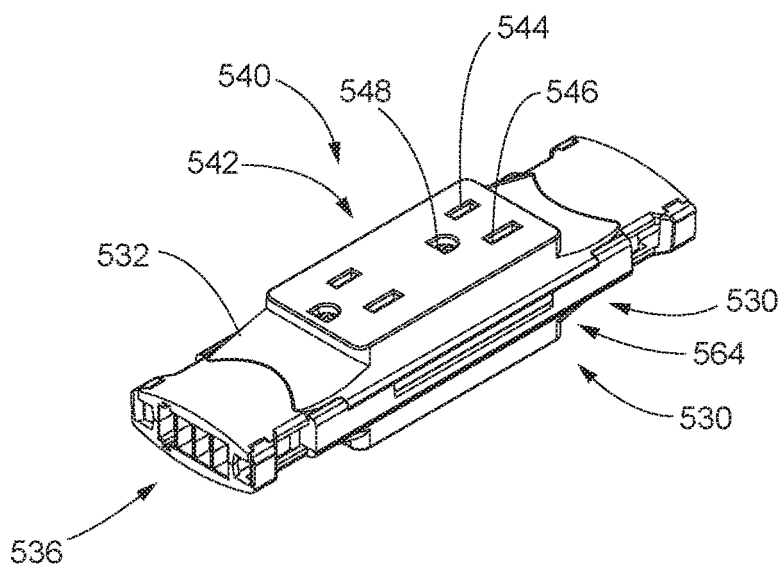
Figure 164:
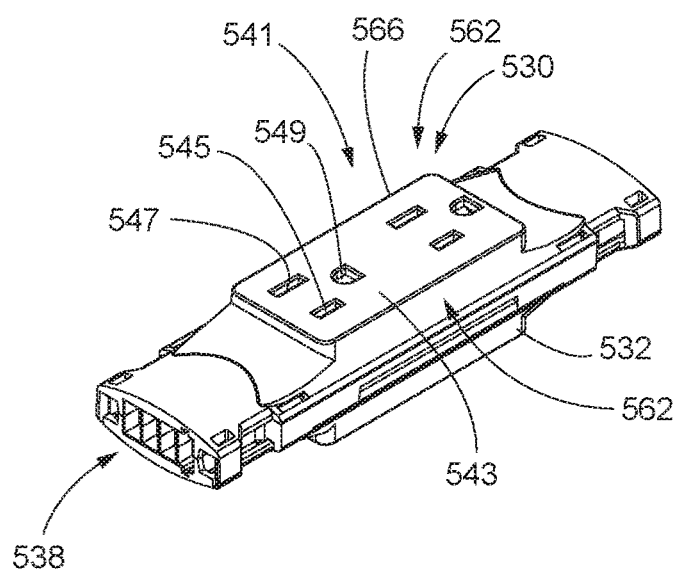
Figure 165:
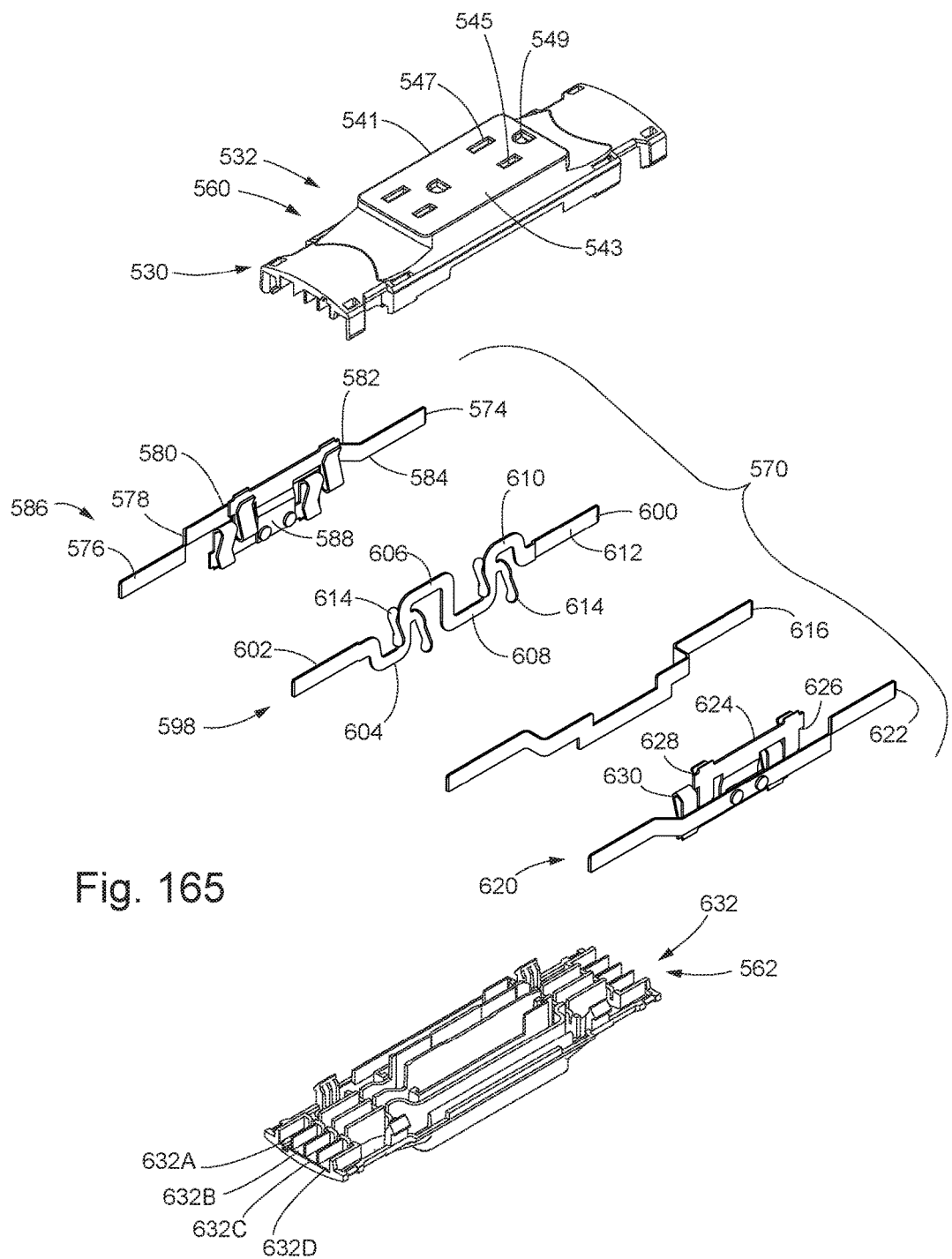
Figure 166:
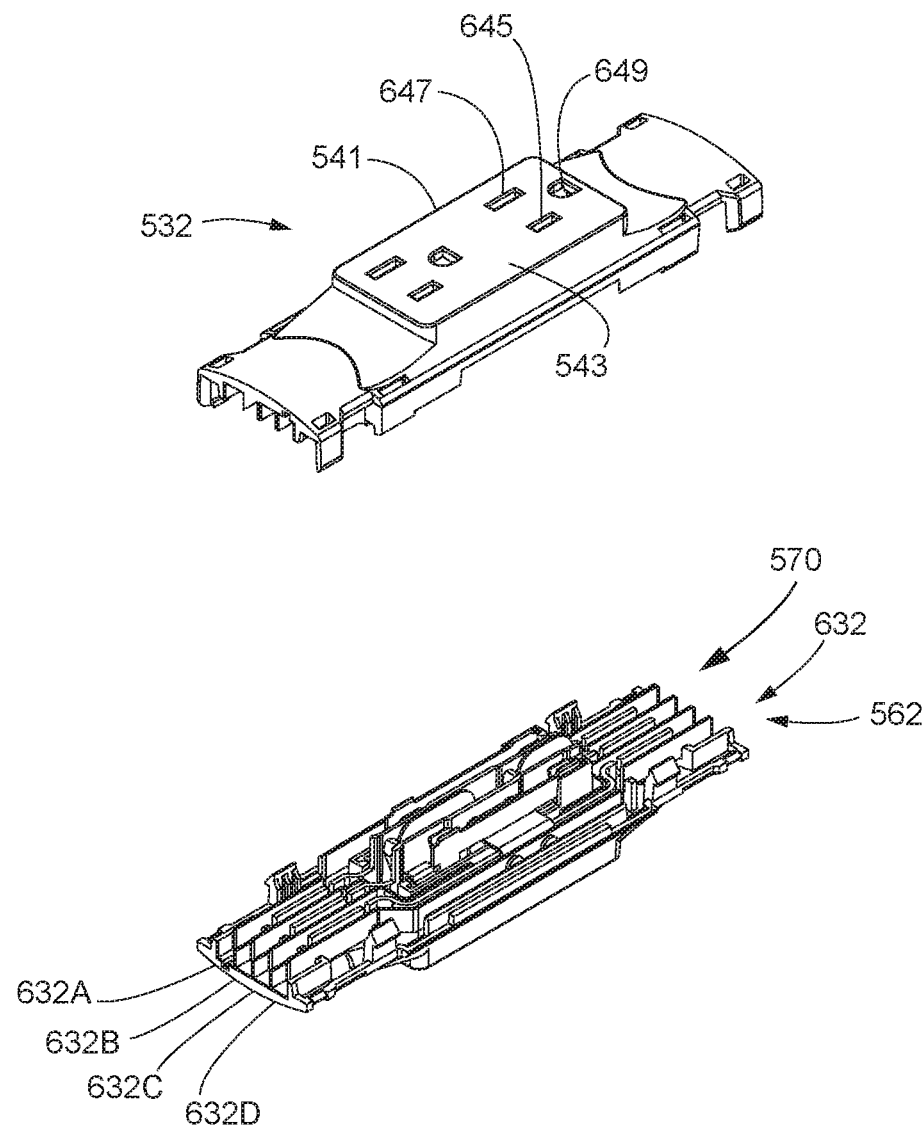
Figure 167:
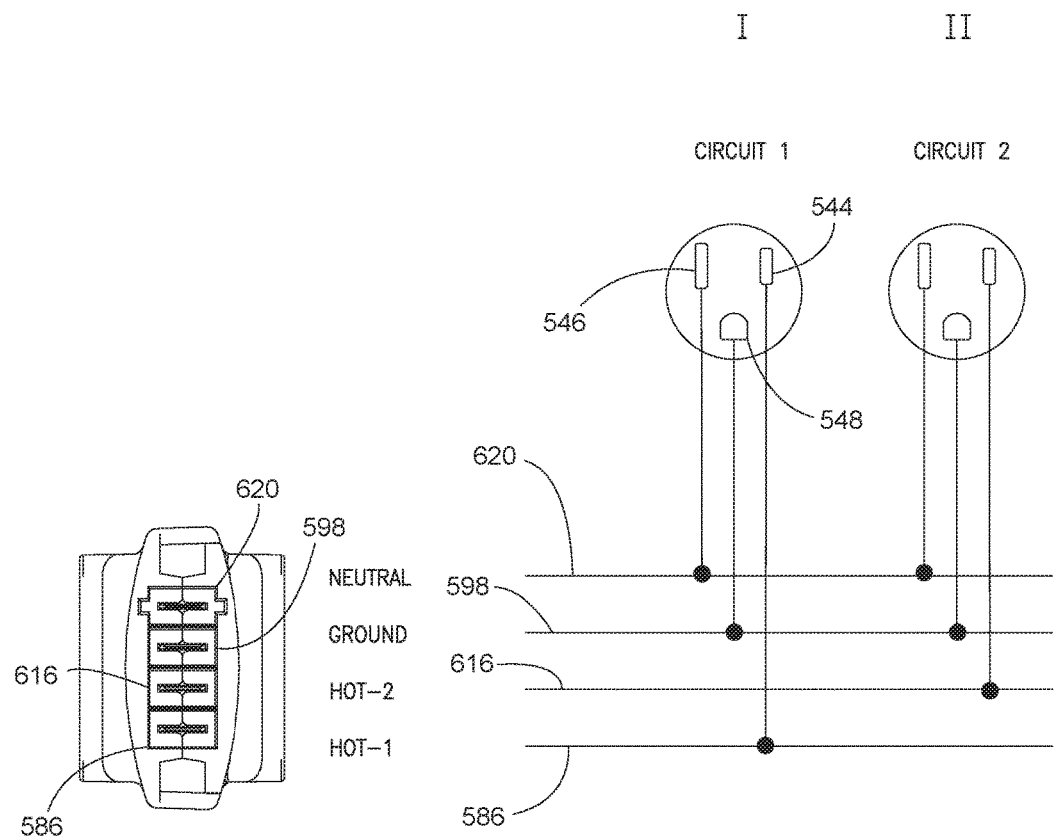
Figure 168:
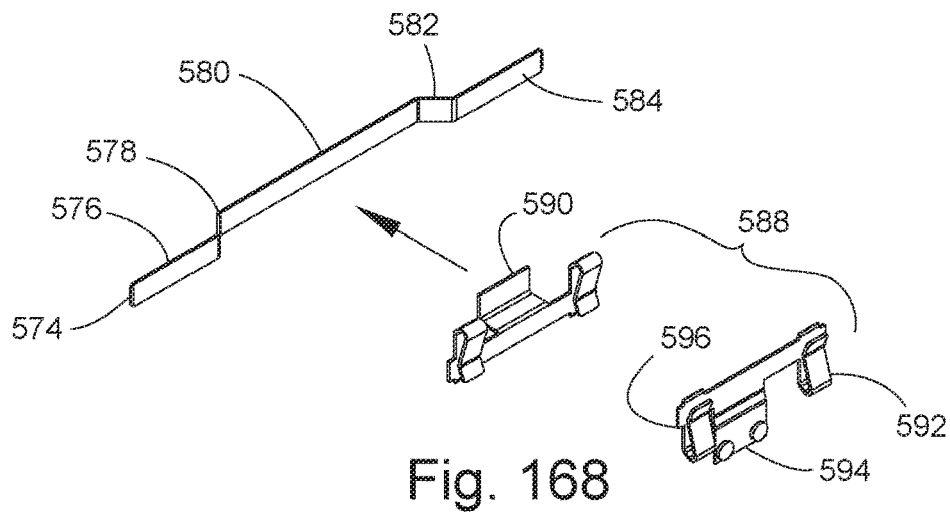
Figure 169:
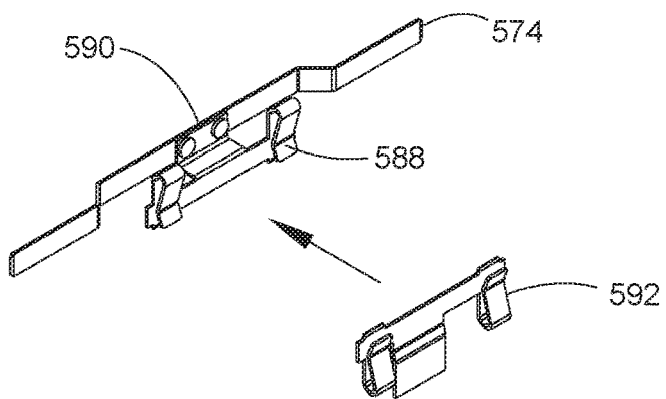
Figure 170:
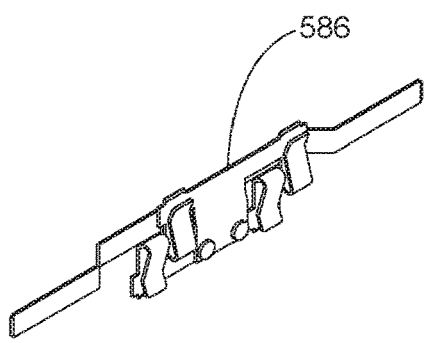

FIG. 120 is a left-end, elevation view of the power end connector shown in FIG. 118;

FIG. 121 is a right-end, elevation view of the power end connector shown in FIG. 118;

FIG. 122 is an underside view of the power end connector shown in FIG. 118;

FIG. 123 is a rear, elevation view of the power end connector shown in FIG. 118;

FIG. 124 is a perspective, partially exploded and partially diagrammatic view showing different positions of the power end connector as it may be inserted into a raceway for the modular electrical system;

FIG. 125 is a perspective view of the power end connector shown in FIG. 118, and showing the incoming power cable in a first position relative to the end connector;

FIG. 126 is a perspective view similar to FIG. 125, but showing the power cable in a position rotated 90° relative to the position shown in FIG. 125;

FIG. 127 is a perspective view similar to FIG. 125, but showing the power cable rotates 180° relative to the position of the cable shown in FIG. 125;

FIG. 128 is a perspective view showing one position of the power end connector as it is positioned within a raceway for the modular electrical system;

FIG. 129 shows what may be characterized as a final, stationary position of the power end connector shown in FIG. 118, with a cover being initially connected to the end connector;

FIG. 130 is a perspective view showing an alternative embodiment of a modular electrical system in accordance with the invention, as the same may be positioned on the top of a work surface;

FIG. 131 is a perspective view showing connections among a receptacle junction block, a female two way connector, a male four way connector and a pair of two way female jumper assemblies;

FIG. 132 is a perspective view similar to FIG. 131, but showing the interconnection of a receptacle junction block, three way jumper assembly and a two way female jumper assembly;

FIG. 133 is similar to FIG. 131, but shows the interconnection of a receptacle junction block, two way connector, second receptacle junction block and a two way female jumper assembly;

FIG. 134 is a perspective view similar to FIG. 131, but showing the interconnection of a two way female jumper assembly, four way connector and an additional pair of two way female jumper assemblies;

FIG. 135 is a perspective view substantially corresponding to the interconnection arrangement shown in FIG. 133, but showing connector blocks in a partially cut out configuration;

FIG. 136 is an enlarged, perspective view of an end male connector of a male receptacle junction block;

FIG. 137 is a perspective and enlarged view showing a cut out portion of one of the female end connector blocks of the female two way connector illustrated in FIG. 135;

FIG. 138 is a front, elevation view of a receptacle junction block in accordance with the invention;

FIG. 138A is a left-end, elevation view of the receptacle junction block shown in FIG. 138, and showing a first keying arrangement;

FIG. 139 is a front, elevation view of a further receptacle junction block in accordance with the invention;

FIG. 140 is a left-end, elevation view showing somewhat of an alternative keying arrangement;

FIG. 141 is a front, elevation view of another embodiment of a receptacle junction block in accordance with the invention;

FIG. 142 is a left-end, elevation view of the receptacle junction block shown in FIG. 141, and illustrating the concept that the receptacle junction block shown in FIG. 141 utilizes a five wire system, instead of a four wire system;

FIG. 143 is a partially exploded and perspective view showing a receptacle junction block in accordance with the invention, and further showing a jumper assembly having a female end connector block and an open end through which the four wires of the jumper assembly extend, for various types of alternative connection arrangements;

FIG. 144 is a perspective view similar to FIG. 143, but showing the two way jumper assembly connected to the receptacle junction block;

FIG. 145 is a partially exploded and perspective view of the jumper assembly shown in FIG. 143, and showing the internal components of the female end connector block;

FIG. 146 is a perspective view of the jumper assembly shown in FIG. 145, in a fully assembled state;

FIG. 147 is a sectional view showing the coupling of a receptacle junction block and a female end connector block, with the electrical components having a five wire configuration instead of a two wire configuration;

FIG. 148 is a sectional view similar to FIG. 147, but showing the respective components in an intermediate state during electrical interconnection;

FIG. 149 is a sectional view similar to FIG. 147, but showing an initial position for initiating electrical interconnection between the respective components;

FIG. 150 is a plan view of the jumper assembly illustrated in FIG. 143;

FIG. 151 is a front, elevation view of the jumper assembly shown in FIG. 150;

FIG. 151A is a left-end, elevation view of the jumper assembly shown in FIG. 150;

FIG. 152 is an underside view of the jumper assembly shown in FIG. 150;

FIG. 153 is a rear, elevation view of the jumper assembly shown in FIG. 150;

FIG. 154 is a right-end, elevation view of a two way female jumper assembly, showing a particular keying arrangement for the female terminals;

FIG. 154A is a front, elevation view of the jumper assembly shown in FIG. 154;

FIG. 155 is a right-end view of an alternative configuration of a two way female jumper assembly in accordance with the invention, showing a particular keying arrangement;

FIG. 155A is a front, elevation view of the jumper assembly shown in FIG. 155;

FIG. 156 is a right-end, elevation view of a two way female jumper assembly in accordance with the invention, showing a particular keying configuration and further showing a five wire system;

FIG. 156A is a front, elevation view of the five wire female jumper assembly shown in FIG. 156;

FIG. 157 is a plan view of an integral junction block assembly in accordance with the invention;

FIG. 158 is a front, elevation view of the integral receptacle junction block assembly illustrated in FIG. 157;

FIG. 159 is a left-side elevation view of the integral receptacle junction block assembly shown in FIG. 157;

FIG. 160 is a right-side elevation view of the integral receptacle junction block assembly shown in FIG. 157;

FIG. 161 is an underside view of the integral receptacle junction block assembly shown in FIG. 157;

FIG. 162 is an elevation view of the receptacle junction block assembly shown in FIG. 157, with FIG. 162 showing the side of the junction block assembly opposing the side shown in FIG. 158;

FIG. 163 is a left-side front perspective view of the integral receptacle junction block assembly shown in FIG. 157;

FIG. 164 is a right-side rear perspective view of the rear portion of the integral receptacle junction box assembly shown in FIG. 157;

FIG. 165 is an exploded view of the integral receptacle junction block assembly shown in FIG. 157, and illustrating a front central housing, back central housing and a central housing which supports a series of buss bars;

FIG. 166 is a partially exploded view of the integral receptacle junction block assembly shown in FIG. 157, and further showing the buss bars inserted into the junction block housing;

FIG. 167 is a partially schematic and partial block diagram illustrating the electrical connections between the wires and buss bars associated with the integral receptacle junction block assembly, and specifically showing connections which form two separate circuits using common neutral and ground wires, with separate hot wires;

FIG. 168 is an exploded view of a buss bar assembly having an elongated buss bar, with first and second ground terminals, with one of the ground terminals being connected to the ground terminals of the outlet receptacles position on one side of the junction block assembly, and the other ground connector being connected to the ground terminals associated with the outlet receptacles on the opposing side of the junction block assembly;

FIG. 169 is a partially exploded view similar to FIG. 168, but showing one of the ground connectors being connected to the elongated buss bar; and FIG. 170 is a perspective view of the fully assembled buss bar and ground connectors as illustrated in FIGS. 168 and 169, with both ground connectors being conductively connected to the elongated buss bar.

DETAILED DESCRIPTION OF THE INVENTION

The principles of the invention are disclosed, by way of example, within modular electrical systems which provide for various configurations of receptacle configurations and the capability of providing four wire circuitry, for purposes of facilitating use within environments having relatively narrow raceway systems. These inventive principles will be described with respect to systems illustrated in FIGS. 1-156A. First, some general concepts associated with modular electrical systems in accordance with the invention will be described, and thereafter detailed descriptions are included with respect to the individual types of components which may be utilized in systems in accordance with the invention. Following this description, various types of configurations of interconnection of electrical components in accordance with the invention will be described.

Figure 1:
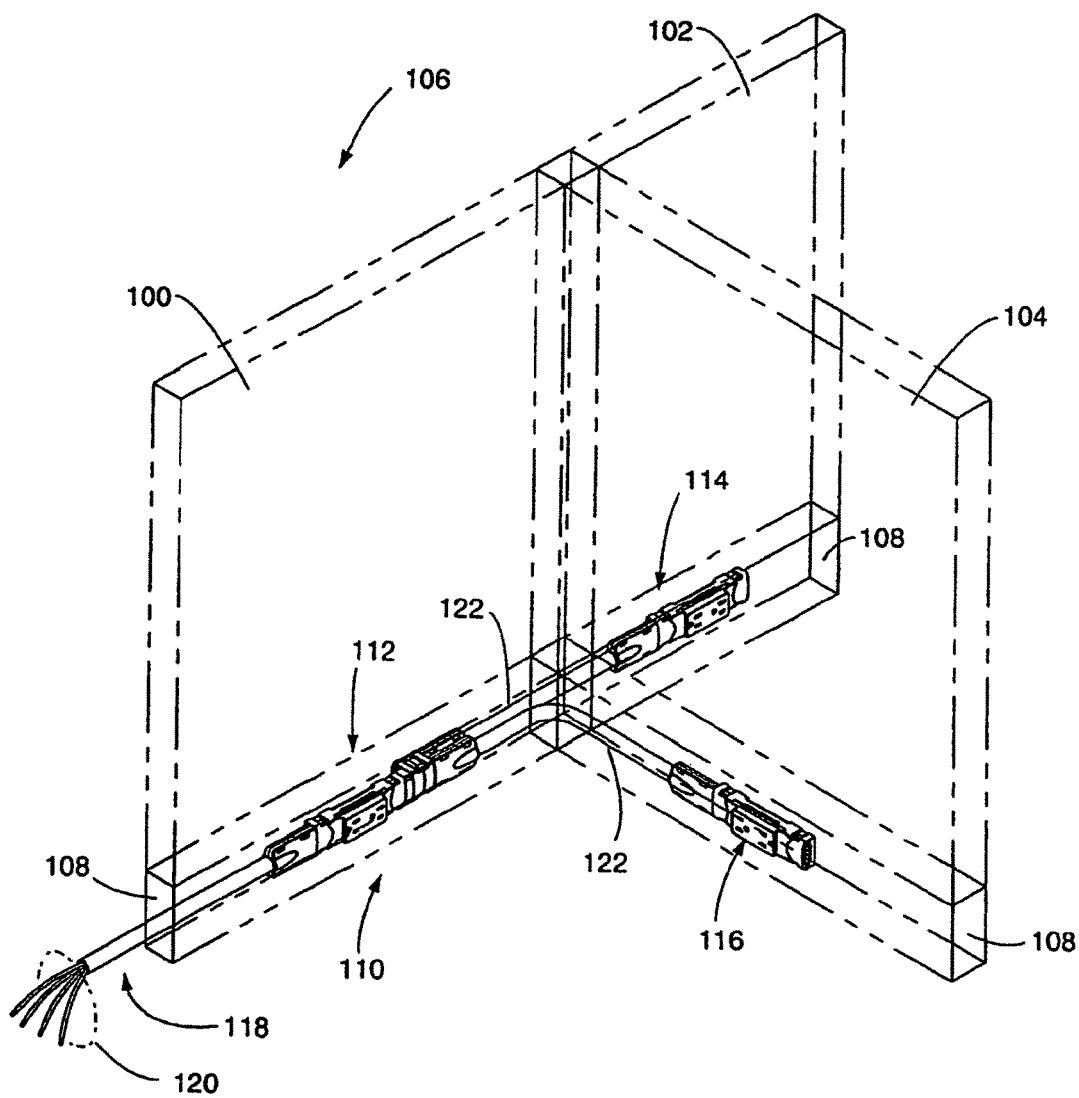
FIG. 1 is a fragmentary, perspective view of a plurality of adjacent wall panels and electrical connection assemblies arranged in the panels, with the electrical connection assemblies being part of a modular electrical system in accordance with the invention.
Figures 10, 11:
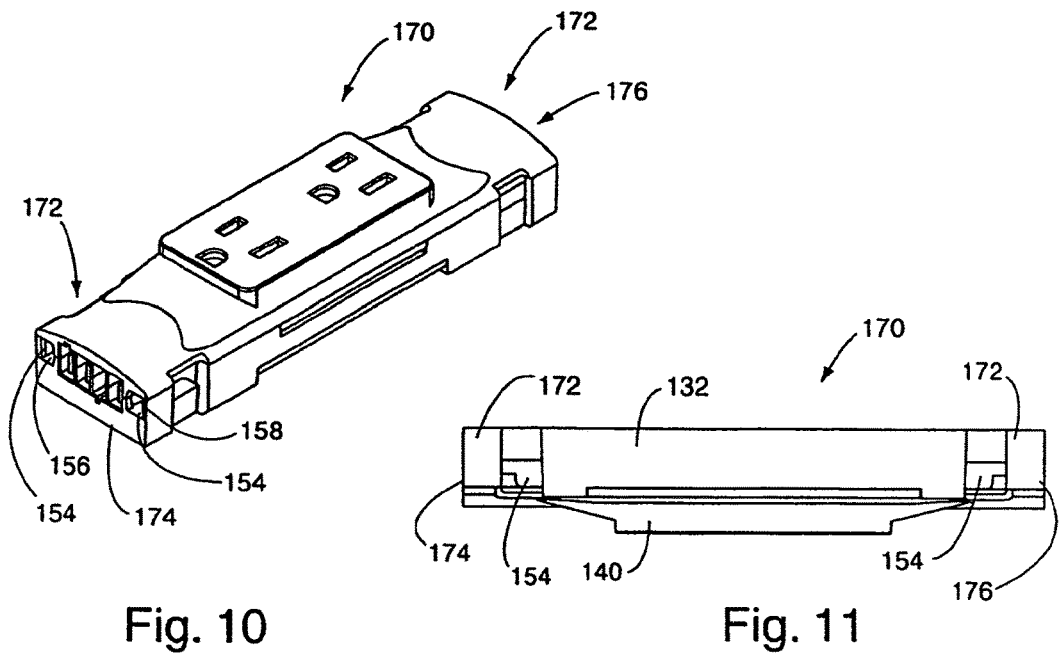
FIG. 10 is a perspective view of a four-wire female receptacle junction block in accordance with the invention, similar to the junction block of FIG. 2, but with a still further alternative keying arrangement.
FIG. 11 is an upside-down view of the four-wire female receptacle junction block illustrated in FIG. 10.

To provide for one example background of where modular electrical systems in accordance with the invention may be utilized, FIG. 1 illustrates a fragmentary, perspective view of a series of adjacent modular wall panels 100, 102 and 104 of a rearrangeable wall system 106. In this case, wall panels 100 and 102 are aligned with each other, and wall panel 104 is perpendicular to panels 100, 102. Each of the wall panels includes a raceway area 108 formed along the lower edges of the wall panels 100, 102 and 104. For purposes of description, raceway covers, which would be customarily used, have been omitted from the drawing in FIG. 1 so as to better show the electrical components. The electrical components which are shown in FIG. 1 within the raceways 108 can be characterized in their entirety as a modular electrical system 110 in accordance with the invention. It should be understood immediately that electrical systems in accordance with the invention do not consist of only a single specific configuration of electrical components. Instead, part of the invention resides in the capability of forming a substantial number of electrical component configurations in a relatively easy manner, for purposes of providing desired power distribution. Again for purposes of description, the modular electrical system 110 shown in FIG. 1 is illustrated as including a first component set 112 within the raceway 108 of wall panel 100, and second component set 114 within the raceway 108 of wall panel 102 and a third component set 116 within the raceway 108 of wall panel 104. These electrical component sets 112, 114 and 116 are utilized for purposes of distributing power for facilitating use of power throughout the environment comprising the rearrangeable wall system 106. In this particular case, FIG. 1 illustrates incoming power as being received only through a single power cable, namely, incoming power cable 118. Incoming power cable 118 may be connected to a source of suitable electrical power for purposes of energizing various types of application devices which may be connected to the electrical system 110.

In part, the modular electrical system 110 in accordance with the invention may be particularly suitable for use in a four wire electrical system. A four wire system may be suitable for providing electrical power where no more than two separate circuits may be required. In particular, certain concepts of the modular electrical system 100 in accordance with the invention are specifically directed to physical and electrical configurations which facilitate the use of the electrical system 100 raceways 108 which may be relatively narrow or otherwise relatively small. In such an instance, electrical components designed for use with 8, 10 or even 14 wires may be substantially too bulky for use within raceways 108. Also, such systems are inherently more expensive and essentially comprise a waste of money and materials if two circuits (using a common neutral and a common ground) may be sufficient for needs of the users. In such a four wire system, the four wire configuration typically would consist of two hot wires, a neutral wire and a ground wire. Electrical connections may be made to one of the two hot wires, depending upon which particular circuit would be used.

Returning again to FIG. 1, the incoming power cable 118 is utilized to supply incoming power through the four wire set 120 partially shown in FIG. 1. Although omitted from FIG. 1, the four wire set 120 would be connected to a source of appropriate incoming electrical power, with the power being provided on a four wire basis. As further shown in FIG. 1, the incoming power cable 118 is connected into the first component set 112. For purposes of efficiency in the description, the individual electrical components of the component set 112 will not be described at this point in the disclosure. Instead, these components will be made apparent from description in subsequent paragraphs herein with respect to the individual components and the means for interconnection therebetween. At this time, it may be stated that the power from the incoming power cable 118 is distributed as necessary within the first component set 112. Through connecting cables 122 (which will again be described in greater detail in subsequent paragraphs herein), the power coming from the incoming power cable 118 and the first component set 112 is distributed to the second components set 114 in the wall panel 102 and the third component set 116 in the wall panel 104. Again, as will be described in subsequent paragraphs herein, each of the connecting cables 122 may be in the form of a two way female jumper assembly.

Example embodiments of separate components which may be utilized with the modular electrical system 110 (or other electrical systems in accordance with the invention) will now be described. As will be apparent from the description and the illustrations of the drawings, the systems 100 which utilize four wire configurations are advantageous in view of their smaller size. Such systems are capable of fitting into narrower wall panels, and also with desk systems having relatively small raceways. Still further, as will also be apparent from subsequent description herein, certain components of the electrical systems in accordance with the invention utilize a "one piece" junction block and receptacle. That is, in the field, it is unnecessary to separately and physically connect a receptacle block to a junction block. Accordingly, fewer parts are required for installation of electrical systems within panel or desk assemblies.

In this regard, and particularly with respect to the use of a four wire configuration, the four wires will still provide for the use of two separate circuits. Still further, and again in accordance with subsequent description, the configurations of electrical systems in accordance with the invention facilitate assembly and installation, with what could be characterized as positive latching mechanisms. In addition, for facilitating installation, and ensuring proper installation, male and female connectors utilized within the electrical systems in accordance with the invention may be keyed for purposes of correct polarization and circuitry. Still further, the keying configurations can be changed for different circuitry.

Turning again to the drawings, the first electrical component in accordance with the invention which will be described herein is characterized as a four wire receptacle junction block 130, including a keying configuration. The receptacle junction block 130 is illustrated in particular in FIGS. 2-15. For purposes of reducing the volume of description, the four wire receptacle junction block 130 with keying will be described herein as the "receptacle junction block 130." However, it should be emphasized that without departing from the spirit and scope of certain concepts of the invention, the junction block 130 and other electrical components of modular electrical systems in accordance with the invention may utilize other numbers of wires, such as five, eight, fourteen and the like. Also, when describing the receptacle junction block 130 and its interconnections to other components of the electrical system 110, it will be assumed that the connector sets (subsequently described herein) at opposing ends of the receptacle junction block 130 will consist of male blade terminals, and may be referred to herein as male connector sets or male connector blocks. However, it should again be emphasized that without departing from a number of concepts of the invention, the receptacle junction blocks 130 could be developed and assembled with female connector sets at opposing ends of the block 130. In fact, with all electrical components of the systems described herein in accordance with the invention, it should be remembered that female connector sets may be substituted for male connector sets, and vice versa. Also, and as earlier stated, a number of concepts of the invention are not limited to the use of four wires and/or two separate circuits. Instead, the connector configurations initially described herein, with respect to the use of four wire configurations, essentially comprise what the inventor believes may be preferred embodiments for electrical systems in accordance with the invention.

Turning again to FIGS. 2-15, the primary purpose of the four wire receptacle junction block 130 is to provide a means for supplying power to one or more electrical outlet receptacles which are formed as integral components of the receptacle junction block 130. The receptacle junction block 130 also provides a means for supplying power to the electrical outlet receptacles through one of two selective circuits (assuming four wire circuitry). In addition, the receptacle junction block 130 provides a means for passing incoming power past the integrally coupled electrical outlet receptacles and facilitating distribution of the power to other components of the modular electrical system.

FIG. 2 illustrates a perspective view of the receptacle junction block 130 in accordance with the invention. The receptacle junction block 130 includes opposing male end connectors with an integrally molded duplex receptacle. The junction block 130 is adapted to utilize four wires, thereby providing two separate circuits with a common neutral and a common ground. With reference first to fix 2-5, the receptacle junction block 130 includes a central housing 132 having like somewhat of a box-like configuration. Integrally molded to opposing ends of the central housing 132 are a pair of male end connector sets 134. The connector sets 134, as show in FIG. 2, comprise a first male end connector set 136 and a second opposing male end connector set 138. As described herein, each of the male end connector sets includes connectors housing for male blade terminals. Extending outwardly from one side of the central housing 132 and integrally molded therewith is a duplex receptacle set 140. The receptacle set 140 includes a pair of electrical outlet receptacles 142. Each of the outlet receptacles 142 is adapted for use with a grounded circuit, and includes three outlets. Specifically, each outlet receptacle 142 includes a hot terminal outlet 144, neutral terminal outlet 146 and ground terminal outlet 148, the outlets being conventional in nature.

As shown particularly in FIGS. 2 and 4, the first male end connector set 136 includes a series of four male blade terminals 150 extending into the male end connector set 136. These same male blade terminals 150 will also appear extending through the second opposing male end connector set 138. As particularly shown in FIG. 4, the first male end connector set 136 includes a keyed connector 152 located at the top of individual connectors 151. Although not shown on the drawings, a corresponding keyed connector 152 will also exist within a set of connectors 151 associated with the second opposing male end connector set 138. The keyed connectors 152, in accordance with the invention, provide for a means for ensuring proper polarization and circuitry connection among individual components of the modular electrical system 110 in accordance with the invention.

With further reference to FIGS. 2 and 4, the first male end connector set 136 includes a pair of tab slots 154 located at the top and bottom portions of the end of the connector set 136. The tab slots 154 comprise a first tab slot 156 and a second tab slot 158. As will be described in subsequent paragraphs herein, the tab slots 156, 158 are utilized to mechanically and releasably secure the receptacle junction block 132 other electrical components of the modular electrical system 110. Similar tab slots 154, although not shown in the drawings, will also exist on the second opposing male end connector set 138.

As previously described herein, the four-wire receptacle junction block 130 includes a keyed connector 152 shown at the top of the connectors 151 in FIG. 4. A receptacle junction block substantially similar to the receptacle junction block 130, but having a difference keying arrangement is illustrated in FIGS. 6-9 as the four-wire receptacle junction block 160. With reference to these drawings, the four-wire receptacle junction block 160, like the receptacle junction block 130, includes a central housing 132 and duplex receptacle set 140. The duplex receptacle set 140 includes a pair of electrical outlet receptacles 142, each having a hot terminal outlet 144, neutral terminal outlet 146 and ground terminal outlet 148. The receptacle junction block 160 also includes male end connector sets 162, substantially corresponding to the male end connector sets 134 of junction block 130. The connector sets 162 include a first male end connector set 164 primarily shown in FIG. 8, and a second opposing male end connector set 166. With reference to the first male end connector set 162, the connector set 162 includes a series of four connectors 151, each adaptor to receive one of a set of male blade terminals 150. As further shown in FIG. 8, the connector 151 which is second from the top of the connectors 151 shown in FIG. 8 is a keyed connector identified as keyed connector 168. Accordingly, the keyed connector 168 in FIG. 8 for junction block 160 is in a different position than the keyed connector 152 of the junction block shown in FIG. 4. Also similar to the receptacle junction block 130, the receptacle junction block 160 includes a pair of tab slots 154 located on the first male end connector set 164 and a corresponding set of tab slots 154 (not shown) on the second opposing male end connector set 166. Each pair of tab slots 154 includes a first tab slot 156 and a second tab slot 158.

Figures 12, 13:
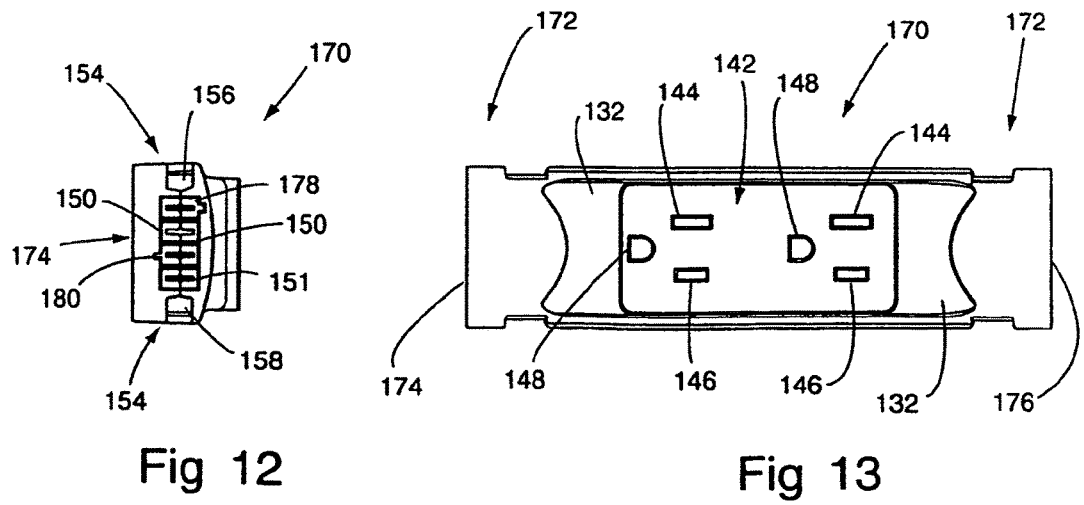
FIG. 12 is a left-side elevation view of the four-wire female receptacle junction block illustrated in FIG. 10.
FIG. 13 is a front, elevation view of the four-wire female receptacle junction block illustrated in FIG.

A still further embodiment of a four-wire receptacle junction block in accordance with the invention is illustrated as receptacle junction block 170 in FIGS. 10-13. The receptacle junction block 170 is substantially similar to receptacle junction blocks 130 and 160, but with an alternative keying arrangement. With reference to FIGS. 9-13, the four-wire receptacle junction block 170, as with the receptacle junction block 130, includes a central housing 132 and a duplex receptacle set 140. The duplex receptacle set 140 includes a pair of electrical outlet receptacles 142, with each receptacle 142 including a hot terminal outlet 144, neutral terminal outlet 146 and ground terminal outlet 148. The receptacle junction block 170 includes a pair of opposing male end connector sets 172, with the connector sets 172 comprising a first male end connector set 174 (primarily shown in FIG. 12) and a second, opposing male end connector set 176. As with receptacle junction blocks 130, 160, the receptacle junction block 170 includes, with each male end connector set, a set of connectors 151 through which a set of four male blade terminals 150 are received. Correspondingly, each of the connector sets 174, 176 includes a pair of tab slots 154 comprising a first tab slot 156 and a second tab slot 158. In a manner somewhat different from the receptacle junction blocks 130, 160, the receptacle junction block 170 includes a pair of keyed connectors from the set of four connectors 151. Specifically, as shown in FIG. 12, the key connectors include a first keyed connector 178 at the top of the connector set 174 and a second keyed connector 180 located as the third from the top connector 151 of the first male end connector set 174.

The concept of utilizing various alternative configurations of key connectors can be substantially advantageous for a number of reasons. First, as will be described in subsequent paragraphs herein, the receptacle junction blocks in accordance with certain aspects of the invention can be initially assembled so as to be adapted for use with a first one of the two circuits provided by the four-wire circuit configuration or, alternatively, a second one of the two separate circuits provided by the four-wire configuration. If desired, a manufacturer may utilize a particular keying arrangement as corresponding to a specific selected circuit configuration. For example, the keyed connector set 136 shown in FIG. 4 for the receptacle junction block 130 may be used solely for situations where it is desired to utilize the first circuit of the two available circuit configurations resulting from the four-wire configuration. Correspondingly, the alternative keying arrangement provided by the male end connector sets 172 shown in FIG. 12 for the four-wire receptacle junction block 170 may be solely utilized only when it is desired to select the second available circuit from the four-wire configuration. Still further, the keyed configurations also provide for safety features. That is, with the use of corresponding keyed connector configurations on other electrical components of the modular electrical systems in accordance with the invention as described in subsequent paragraphs herein, proper polarization and proper circuit connections can be ensured. That is, with the keyed configurations, it would not be possible to accidentally connect a receptacle junction block in a "reverse" configuration relative to other electrical components of the modular electrical system, in a manner such that the male blade terminals 150 associated with the hot, neutral and ground incoming power wires are not mis-connected. Of course, it will be apparent to those skilled in the art that various other types of keying configurations for the connectors can be utilized, without departing from the novel concepts of the invention.

Figure 14:
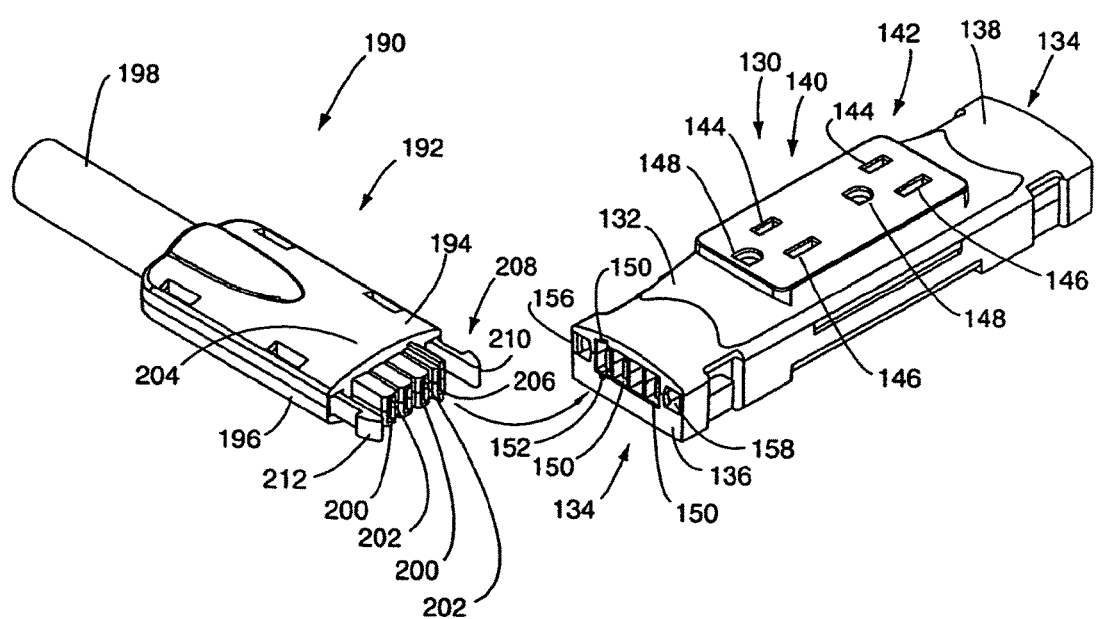
FIG. 14 is a perspective and partially exploded view, illustrating the relative positioning of the four-wire female receptacle junction block illustrated in FIG. 2 as it is being electrically connected to a male connector block of a separate element of the modular electrical system.

FIG. 14 is a perspective and partially exploded view showing an initial position for electrically and physically connecting a four-wire and two-way female jumper cable connector block 190 to the receptacle junction block 130. The connector block 190 will be described in greater detail in subsequent paragraphs herein. At this time, it is sufficient to describe the connector block 190 as including a housing 192 comprising a front housing cover 194 and rear housing cover 196. A cable 198 extends outwardly from the connector block 190, and may include a set of four wires (not shown) carrying the two separate circuits. As will be described in subsequent paragraphs herein, the four wires (not shown) within the cable 198 can be connected within the connector block 190 to a set of four female terminals 200. Each of the female terminals 200 is individually received within an individual connector 202. Four of the connectors 202 form a female end connector set 204. As shown in FIG. 14, the connectors 202 of the female end connector set 204 include a keyed connector 206 located as shown in FIG. 14. The keyed connector 206 is also even better shown with respect to its relative position in FIG. 15. When the cable assembly connector block 190 is brought into close proximity with the receptacle junction block 130, it is apparent from FIGS. 14 and 15 that the keyed connector 206, which matches the keying of the keyed connector 150, will mate with the keyed connector 150 so that the male blade terminal 151 within the keyed connector 150 will become electrically connected to the female terminal 200 within the keyed connector 206. The other connectors 151 of the receptacle junction block 190 will mate with the corresponding other three connectors 202 of the connector block 190. In this manner, an appropriate electrical circuit connection can be made.

Figure 15:
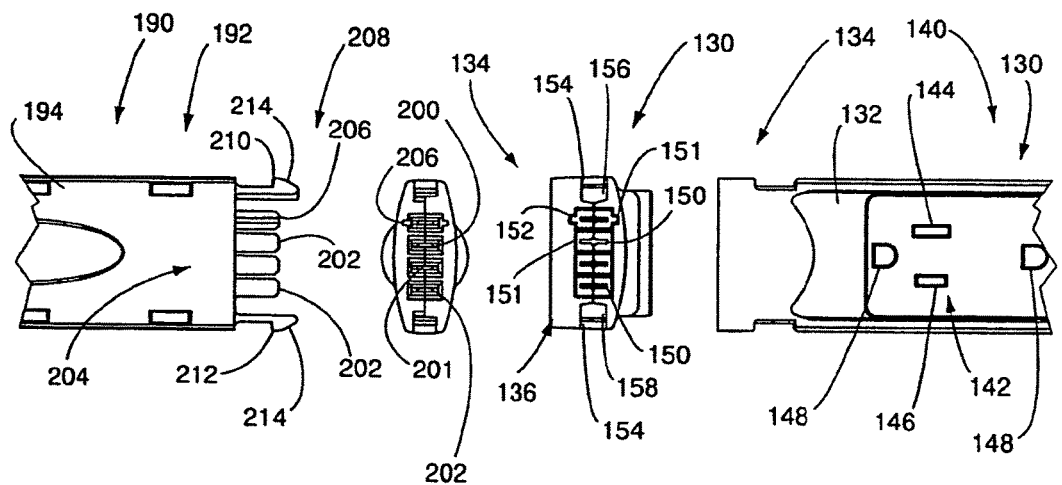
FIG. 15 is a combination illustration showing a side view and end view of the male connector block illustrated in FIG. 14, and a side-view and end-view of the four-wire female receptacle junction block also illustrated in FIG. 14.

For purposes of physically and releasably securing the connector block 190 to the receptacle junction block 130, the connector block 190 includes a pair of resilient connector tabs 208, shown in both FIGS. 14 and 15. The resilient connector tabs 208 include a first connector tab 210 and a second connector tab 212. Each of the resilient connector tabs 208 can be made of a rubber-like material so as to be resilient in nature. As shown particularly in FIG. 15, each of the connector tabs 208 includes a ramped surface 214 located at ends of the tabs 208. It is relatively apparent from FIGS. 14 and 15, the first resilient connector tab 210 is adapted to be received within the first tab slot 156 of the first male end connector set 136 of the receptacle junction block 130. Correspondingly, the second resilient connector tab 212 is adapted to be received within the second tab slot 158 of the receptacle junction block 130. The resilient tabs 208 are adapted to essentially be "snap fitted" into the tab slots 154. A more detailed description of this physical interconnection using the connector tabs 208 and tab slots 154 will be described in subsequent paragraphs herein. Also, the 208, four-wire female jumper cable assembly connector block 190 will be described in greater detail in subsequent paragraphs herein. FIGS. 14 and 15 have been included within the disclosure and described herein primarily for providing an initial understanding of the electrical and physical interconnection of the receptacle junction blocks to cable assembly connector blocks in accordance with the invention.

Figures 16, 17:
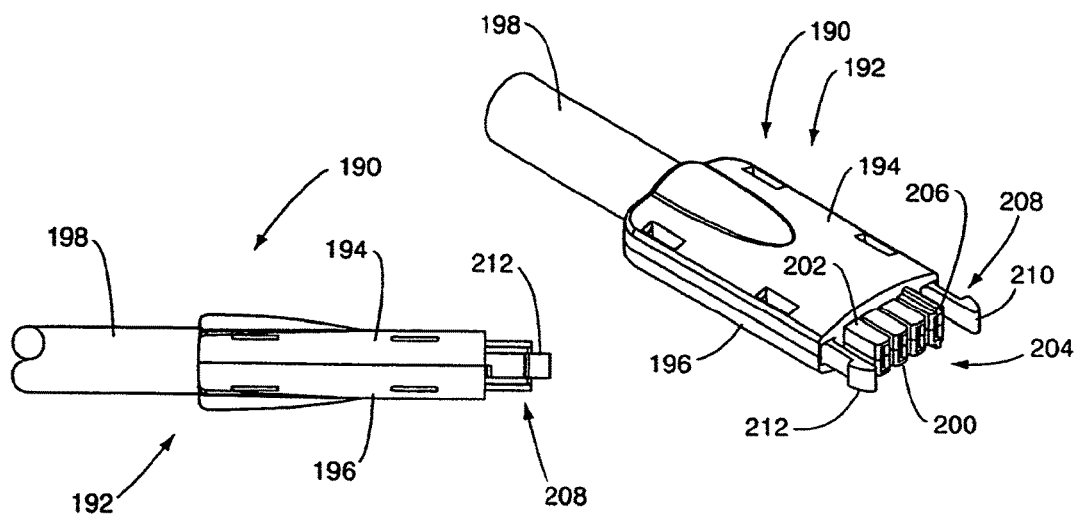
FIG. 16 is a planned view of a four-wire male blade connector having a keying configuration in accordance with the invention.
FIG. 17 is a perspective view of the four-wire male blade connector block illustrated in FIG. 16.
Figures 18, 19:
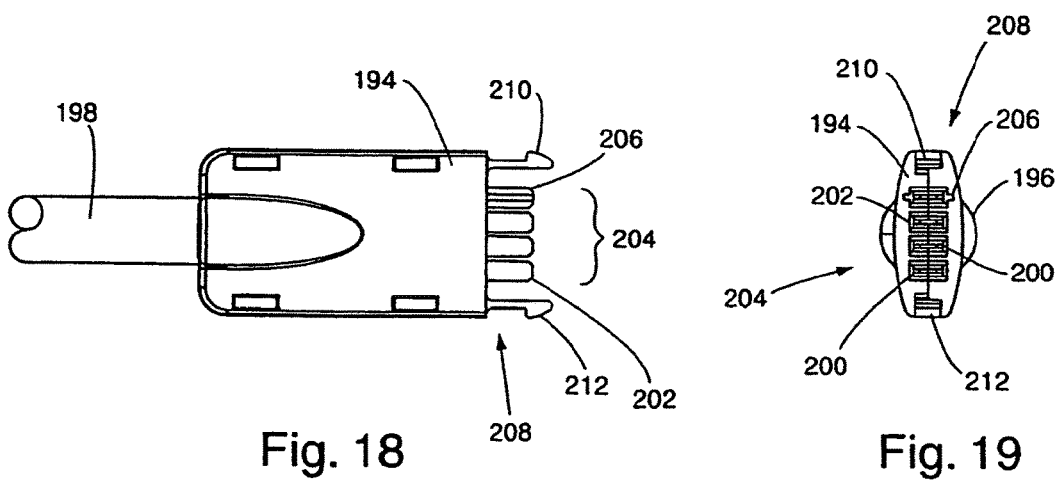
FIG. 18 is a front, elevation view of the four-wire male blade connector block illustrated in FIG. 16.
FIG. 19 is a right-side elevation view of the four-wire male blade connector block illustrated in FIG. 16, showing a particular keying arrangement.
Figures 20, 21:
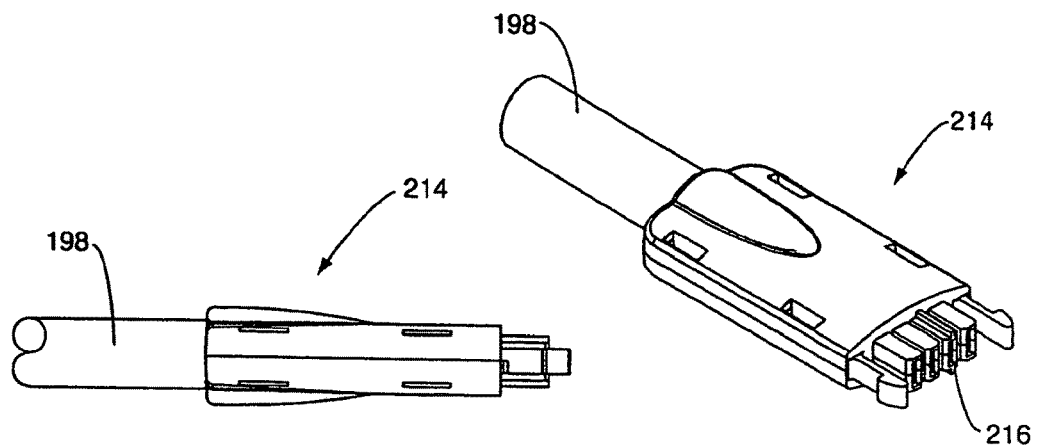
FIG. 20 is a planned view of an alternative four-wire male blade connector block similar to FIG. 16, but having a different keying arrangement.
FIG. 21 is a perspective view of the four-wire male blade connector block illustrated in FIG. 16.
Figures 22, 23:
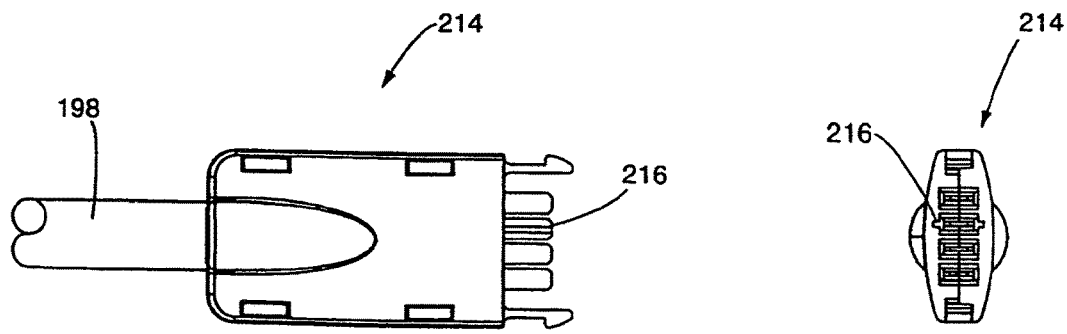
FIG. 22 is a front, elevation view of the four-wire male blade connector block illustrated in FIG. 20.
FIG. 23 is a right-side elevation view of the four-wire male blade connector block illustrated in FIG. 20, and showing the alternative keying arrangement.
Figures 24, 25:
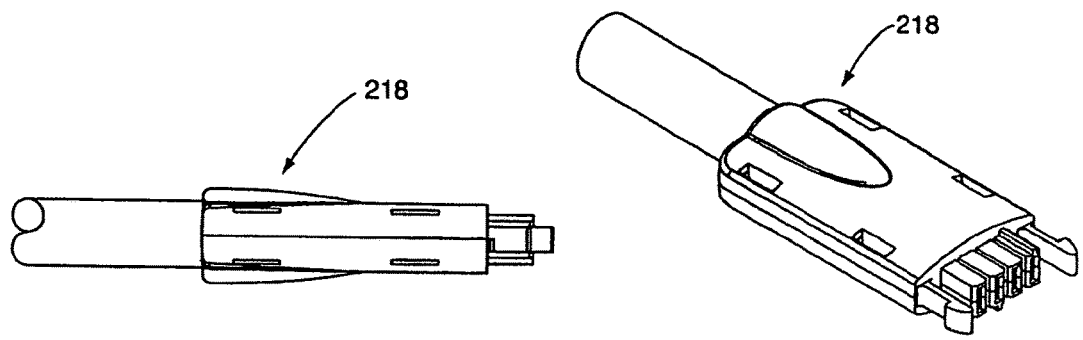
FIG. 24 is a planned view of a still further embodiment of a four-wire male blade connector block in accordance with the invention with a still further alternative keying arrangement.
FIG. 25 is a perspective view of the four-wire male blade connector block illustrated in FIG. 24.
Figures 26, 27:
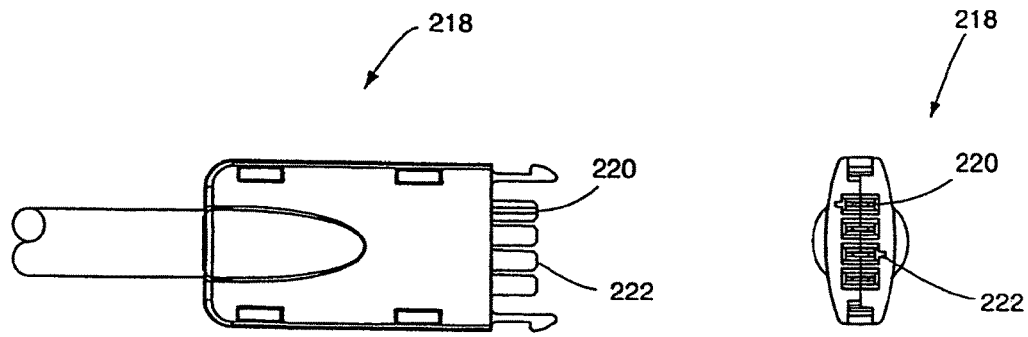
FIG. 26 is a front, elevation view of the four-wire male blade connector block illustrated in FIG. 24.
FIG. 27 is a right-side elevation view of the four-wire male blade connector block illustrated in FIG. 24, and showing the alternative keying arrangement.

The prior description and the previously described drawings refer to the two-way, four-wire female jumper cable assembly connector block 190. As also previously described herein, the connector block 190 includes the capability of providing for a keying configuration with respect to its connectors. The junction block 190 and certain alternative embodiments (with respect to the keying arrangements) will now be described with respect to FIGS. 16-29. More specifically, the cable assembly connector block 190 previously briefly described herein is shown in greater detail in FIGS. 16-19. Although shown in greater detail, each of the elements of the connector block 190 were previously described herein with respect to FIGS. 14 and 15. That is, the connector block 190 includes a housing 192, comprising a front housing cover 194 and rear housing cover 196. The connector block 190 is connected in any suitable manner to a cable 198. The cable 198 includes a series of four wires (not shown) which extend through the cable 198 and into the connector block 190. The four wires (not shown) are each individually connected to a separate one of four female terminals 200. The female terminals 200 extend into corresponding and individual connectors 202. The four connectors 202 form a female end connector set 204. As shown particularly in FIGS. 17, 18 and 19, one of the connectors 202 of the connector set 204 is in the form of a keyed connector 206. In the particular embodiment of connector block 190, the keyed connector 206 is at the top of the female end connector set 204 as viewed in FIG. 19.

As also previously described herein, the connector block 190 includes a pair of resilient connector tabs 208. The resilient connector tabs 208 comprise a first connector tab 210 and a second connector tab 212. The capability of using the resilient connector tabs 208 to releasably secure the connector block 190 to a receptacle junction block was previously described herein with respect to FIGS. 14 and 5.

An alternative embodiment of a two-way, four-wire female jumper cable assembly connector block is illustrated in FIGS. 20-23 as assembly connector block 214. The assembly connector block 214 is substantially identical to the assembly connector block 190 previously described herein with respect to FIGS. 16-19. However, instead of having a keyed connector 206 located at the top of the female end connector set 204, the assembly connector block 214 has a keyed connector 216 as one of the connectors 202 of the female end connector set 204. As particularly shown in FIGS. 21, 22 and 23, the keyed connector 216 is located immediately below and adjacent the upper connector 202 of the female end connector set 204.

Except for the use of the keyed connector 216 in place of the keyed connector 206, elements of connector block 214 correspond to elements of connector block 190. That is, the connector block 214 includes a housing 192 with a front housing cover 194 and rear housing cover 196. A cable 198 extends into the connector block 214 and connects to a series of female terminals 200. The female terminals 200 extend outwardly into the connectors 202 which form the female end connector set 204. Also identical to the connector block 290, the connector block 214 includes a pair of resilient connector tabs 208, comprising a first connector tab 210 and a second connector tab 212.

As previously described herein, the connector block 190 includes a keyed connector 206 which was positioned and adapted to appropriately mate with the receptacle junction block 130 having a corresponding keyed connector 152. In a similar manner, the connector block 214, as apparent from the prior description, will appropriately mate with a receptacle junction block having a keyed connector sized and position so as to mate with the keyed connection 216 of the connector block 214.

A third alternative embodiment of a connector block in accordance with the invention is illustrated in FIGS. 24-27 and identified as two-way, four-wire female jumper cable assembly connector block 218. As with the previously described connector block 214, the connector block 218 is substantially identical to the connector block 190 described in FIGS. 16-16. However, in stead of only including a single keyed connector 206 (as with the connector block 190), the connector block 218 includes a pair of keyed connectors. Specifically, the connector set 204 includes a first keyed connector 220 shown in FIG. 27 as located at the top of the four connectors 202 of the connector set 204. In addition, instead of having only a single keyed connector, the connector block 218 also include a second keyed connector 222. As illustrated primarily in FIG. 27, the second keyed connector 222 is located adjacent the lower most connector 202 in the female end connector set 204. Accordingly, the connector block 214 is adapted to mate with a receptacle junction block (or other elements of the modular electrical system which will be described in subsequent paragraphs herein) having a corresponding pair of mating keyed connectors.

With the exception of the paired keyed connectors 220 and 222, and as earlier mentioned, the connector block 218 is substantially identical to the connector blocks 190 and 214. More specifically, and with reference to FIGS. 24-27, the connector block 218 includes a housing 192 having a front housing cover 194 and rear housing cover 196. A cable 198 having four wires (not shown) is connection in any suitable manner to the connector block 218. The four wires (not shown) extend into and are connected to individual ones of a set of female terminals 200. The female terminals 200 are received within individual ones of connectors 202 forming a female end connector set 204. As also identical to the connector block 190 and the connector block 214, the connector block 218 includes a pair of resilient connector tabs 208, comprising a first connector tab 210 and a second connector tab 212. The connector tabs 208 are utilized to releasably secure the connector block 214 to an appropriate receptacle junction block or other electrical element of the modular electrical system.

Figure 28:
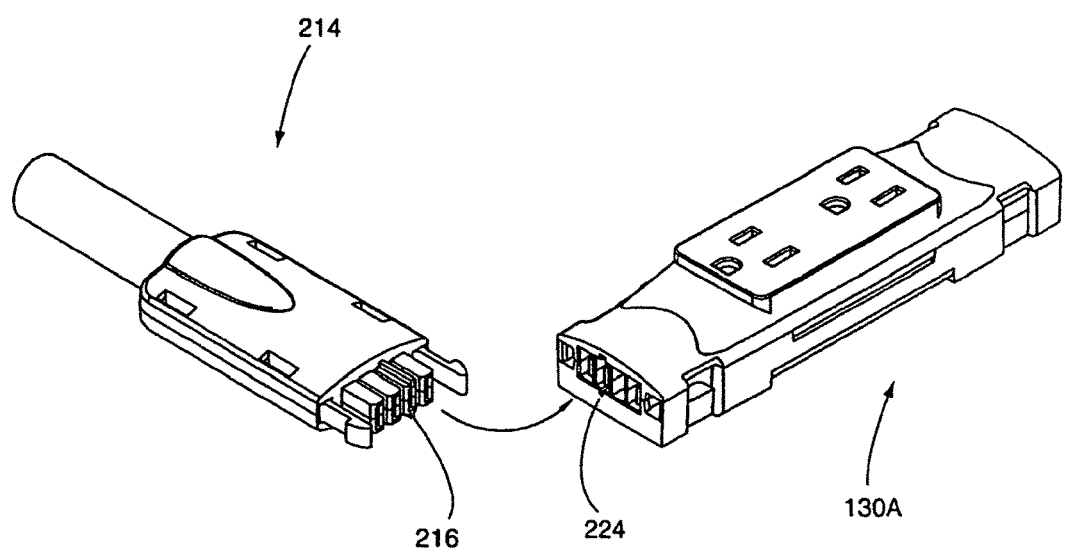
FIG. 28 is a partially exploded and perspective view similar to FIG. 14, and showing the relative positioning of the four-wire male blade connector block and the four-wire female receptacle junction block as the two elements are connected together.
Figure 29:
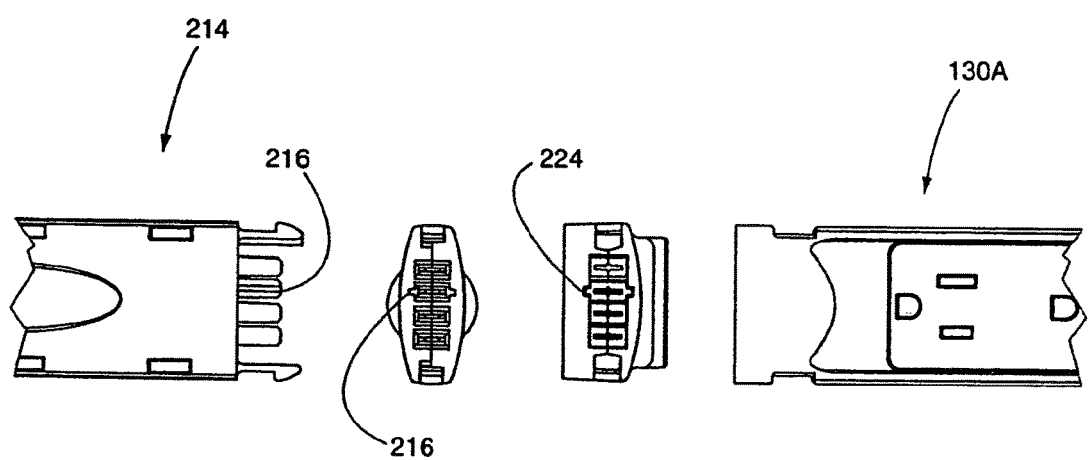
FIG. 29 is a combination illustration, showing elevation and end views of the four-wire male blade connector block shown in FIG. 28, and end and elevation views of the four-wire female receptacle junction block, also shown in FIG. 28, and further showing how the keying arrangements for the two elements match together.
Figure 31:
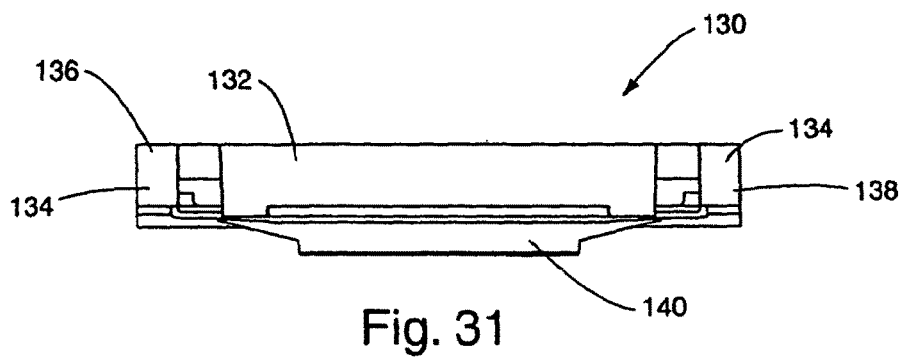
FIG. 31 is an upside-down view of receptacle junction block assembly in accordance with the invention.
Figure 33:
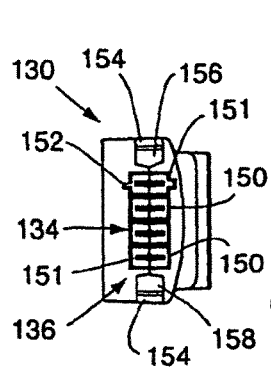
FIG. 33 is a left-side elevation view of the receptacle junction block assembly shown on FIG. 31.
Figure 32:
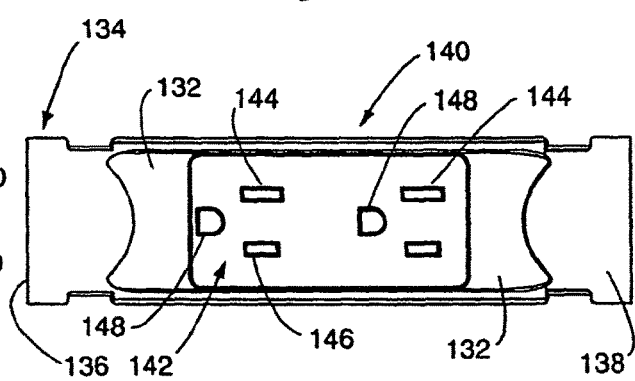
FIG. 32 is a front, elevation view of the receptacle junction block assembly illustrated in FIG. 31.

FIG. 28 illustrates an initial position for connection of the assembly connector block 214 to a receptacle junction block 130A. The illustration of FIG. 28 is substantially identically to the illustration of FIG. 14. However, instead of using the connector block 190 and receptacle junction block 130, FIG. 28 illustrates an initial position for connecting connector block 214 and receptacle block 130A. The receptacle junction block 130A is substantially identical to the previously described receptacle junction block 130, with one exception. Instead of including a keyed connector 152 as shown in FIG. 14, the receptacle junction block 130A includes a keyed connector 224 which is positioned differently from the keyed connector 152 and is further positioned so as to appropriately mate with the keyed connector 216 of the connector block 214. In a similar manner, FIG. 29 consists of a drawing substantially identical to FIG. 14. That is, FIG. 29 is a combination illustration showing end and front elevation views of the connector block 214 and the receptacle junction block 130A shown in FIG. 28. In this particular instance, FIG. 29 clearly shows the relative positioning of the keyed connector 216 of the connector block 214 and the keyed connector 224 of the receptacle junction block 130A.

In the prior description, certain electrical components which may be associated with the modular electrical system 110 illustrated in FIG. 1 have been described. These components have included four-wire receptacle junction blocks, including receptacle junction blocks 130, 160 and 170. In addition, two-way, four-wire female jumper cable assembly connector blocks have also been described, including connector blocks 190, 214 and 218. The following paragraphs will describe certain of the receptacle junction blocks and connector blocks in greater detail, and will also describe other electrical components of modular electrical systems in accordance with the invention. All of the components described herein may be utilized in the modular electrical system 110 previously shown with the rearrangeable wall system 106 in FIG. 1. As an example embodiment of a set of electrical components which may be utilized to form a modular electrical system in accordance with the invention, FIGS. 30A-30D illustrate, in combination, various electrical elements which are described as forming a modular electrical system component set 230. For purposes of brevity in description, the connector set 230 will be described herein as either the "connector set 230" or the "modular electrical system 230." In any event, the modular electrical system 230 will be described herein primarily with respect to use as a four-wire electrical system, providing for two separate circuits with a common neutral and a common ground. Also, for purposes of describing a specific embodiment in detail, the individual components of the modular electrical system 230 will be described as having specific connector blocks or end connectors which utilize either male blade terminals or female terminals. However, it should be emphasized that other male/female terminal arrangements may be utilized, without departing from the principal of the invention. Also, a number of the principal concepts of the invention may be utilized with systems other than four-wire systems, or other than with systems comprising two separate electrical circuits.

The modular electrical system in accordance with the invention provides for several advantages. First, as will be apparent from subsequent description herein, the electrical components of the component set 230 are of relatively smaller size, particularly with respect to width. Accordingly, the components of the modular electrical system 230 will fit in relatively narrower panels and desk systems having relatively smaller raceways. Also, as will be apparent from subsequent description herein, the modular electrical system 230 can be employed in a "back-to-back configuration," whereby electrical elements such as duplex receptacles may be made to face an either of two opposing directions. Still further, the electrical components described herein as receptacle junction blocks essentially comprise an integral combination of a junction block and a duplex receptacle. Junction blocks and receptacles in most known systems are formed as separate pieces. Accordingly, installation is facilitated in view of the relatively fewer parts required for panel and desk assemblies. In addition to the foregoing, although the particular module or electrical system 230 only includes four wires, the four wires still provide the capability of having two circuits. In addition, as will be apparent from description herein, assembly and installation is facilitated in view of having positive and releasable latching mechanisms. Also, as is apparent from previous description herein, connectors having male and female terminals can be keyed for correct polarization and circuitry. Also, if desired, the keying can be modified so as represent particular electrical elements which are "set up" for specific circuit configurations.

Turning to FIGS. 30A-30D, the modular electrical system 230 is shown as having a number of electrical components. The electrical components include four-wire male receptacle junction blocks 130, which are described in substantial part previously herein with respect to FIGS. 2-5. In addition, the modular electrical system 230 includes a component characterized as a two-way, four-wire female connector 232. The two-way connector 232 will be described in greater detail in subsequent paragraphs herein. However, it can be stated at this time that the connector includes female terminals which are adapted to mate with male blade terminals of receptacle junction blocks, so as to provide for a direct connection between a pair of male receptacle junction blocks, if desired. Such a configuration is shown in FIG. 30A.

In addition to the foregoing, the modular electrical system 230 includes a two-way, four-wire female jumper cable assembly 234 (FIG. 30B). The particular cable assembly 234 illustrated in FIG. 30 includes, at its ends, a pair of two-way, four-wire female jumper cable assembly connector blocks 190. One of the connector blocks 190 was previously described herein in substantial detail with respect to FIGS. 16-19. Still further, the modular electrical system 230 includes an additional electrical component characterized as a four-way, four-wire male connector 236 (FIG. 30C). As will described in greater detail herein, the four-way connector male connector 236 includes four connector sets with male blade terminals extending therethrough. Accordingly, and as shown in FIG. 30C, the four-way male connector 236 is adapted to electrically mate with, for example, female terminals of a connector block 190 associate with a two-way female jumper cable assembly 234.

In addition to the foregoing, the modular electrical system 230 further includes what can be characterized as a three-way, four-wire jumper cable assembly 238 (FIG. 30D). As will be described in subsequent paragraphs herein, the jumper cable assembly 238 includes a pair of female end connector sets, along with a single male end connector set. The connector blocks and associated connector sets incorporated within the three-way jumper cable assembly 238 will be described in subsequent paragraphs herein. As illustrated in FIG. 30D, one of the female cable assembly connector blocks associated with the three-way jumper cable assembly 238 can be electrically connected to a male end connector set of a receptacle junction block 130.

The electrical components of the modular electrical system 230 in accordance with the invention as shown in FIGS. 30A-30D represent only one embodiment of a component set 230 in accordance with the invention. However, as will be apparent from subsequent description herein, a substantial number of electrical configurations can be provided by the relatively small number of electrical components associated with the component set 230. It is this capability of having a reduction in the number of separate electrical components which forms a basis for certain concepts of the invention. In this regard, receptacle junction blocks and two-way, four-wire female jumper cable assembly connector blocks have been described in substantial detail in previous paragraphs herein. The following paragraphs in this disclosure will describe additional detail with regard to the internal structure and components of the receptacle junction blocks and the two-way jumper cable assembly connector blocks. Also, the following paragraphs will describe in greater detail the following components: the two-way, four-wire female connector 232; the two-way, four-wire female jumper cable assembly 234; the four-way, four-wire male connector 236; and the three-way, four-wire jumper cable assembly 238.

Figure 39:
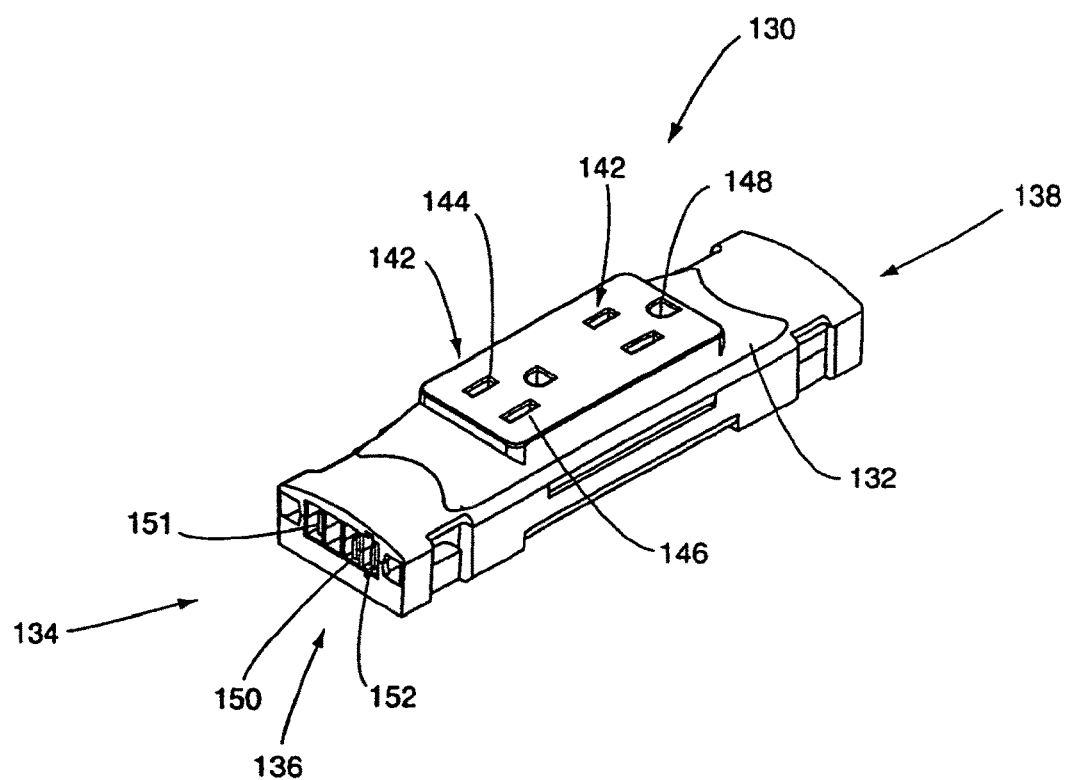
FIG. 39 is a perspective view of the receptacle junction block assembly shown in FIG. 31.

For purposes of describing the interior and internal components of receptacle junction blocks in accordance with the invention, the previously described four-wire male receptacle junction block 130 will be utilized. The exterior elements of the receptacle junction block 130 are illustrated in FIGS. 31-36. Certain of these illustrations are duplicates of previous illustrations and will not be described in any substantial detail at this time. For example, FIG. 31 substantially corresponds to FIG. 3, while FIG. 32 substantially corresponds to FIG. 5. FIG. 4 substantially corresponds to FIG. 33. Further, FIG. 39, illustrating a perspective view of a fully-assembled receptacle junction block 130 substantially corresponds to FIG. 2, but is shown rotated 180°. Accordingly, the male end connector set 134 which is visible in FIG. 39 corresponds to the second opposing male end connector set 138 which is not readily visible in FIG. 2. In addition, the first male end connector set 136 which is visible in FIG. 2, is not visible in FIG. 39.

Figure 34:
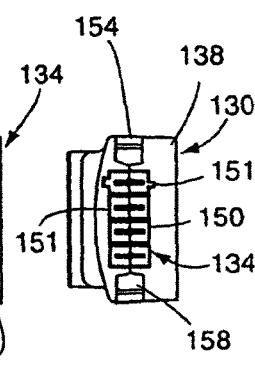
FIG. 34 is a right-side elevation view of the receptacle junction block assembly shown in FIG. 31.
Figure 35:
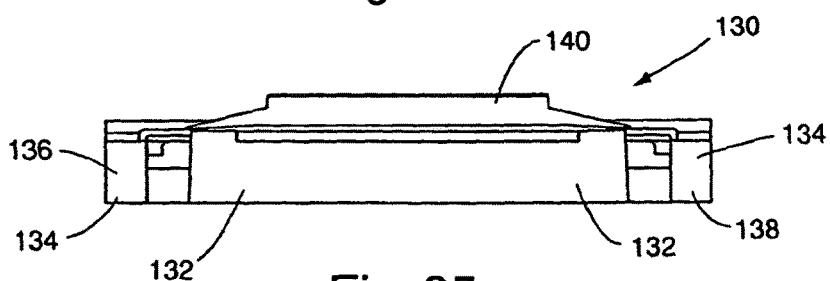
FIG. 35 is a side, upright view of the receptacle junction block assembly shown in FIG. 31.
Figure 36:
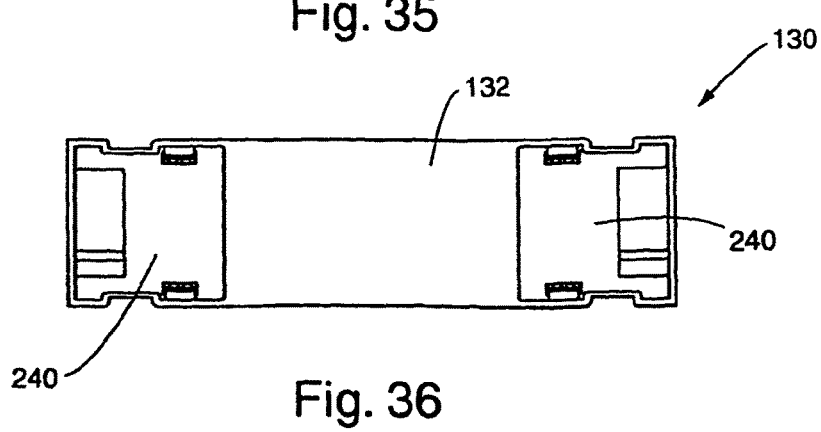
FIG. 36 is an elevation view of the receptacle junction block assembly shown in FIG. 31, with FIG. 36 showing the side of the junction block assembly opposing the side shown in FIG. 32.

The drawing set of FIGS. 31-36 also include a view illustrated as FIG. 34, which corresponds to a right-end, elevation view of the receptacle junction block 130. In this view, the details of the second opposing male end connector set 138 are clearly visible. In addition, FIG. 36 is a rear, elevation view of the receptacle junction block 130. As shown in FIG. 36, the receptacle junction block 130 includes connection sections 240 which may be utilized to the receptacle junction block 130 to structural elements of a raceway, or to other elements of a modular electrical system in accordance with the invention, so as to provide for a "back-to-back" configuration. As with the description and illustrations of the receptacle junction block 130 in prior drawings, FIGS. 31-36 and 39 show identical elements. For example, these illustrations show the receptacle junction block 130 as having a central housing 132 with male end connector sets 134 comprising a first male end connector set 136 and second opposing male end connector set 138. A duplex receptacle set 140 is provided, with a pair of electrical outlet receptacles 142. Each outlet receptacle 142 includes a hot terminal outlet 144, neutral terminal outlet 146 and ground terminal outlet 148. Each of the male end connector sets 134 includes a set of four connectors 151, with a key connector 152. Male blade terminals 150, comprising four in number, extend into the individual connectors 151 of the connector sets 134. The receptacle junction block 130 also includes tab slots 154 comprising a first tab slot 156 and second tab slot 158.

Figure 37:
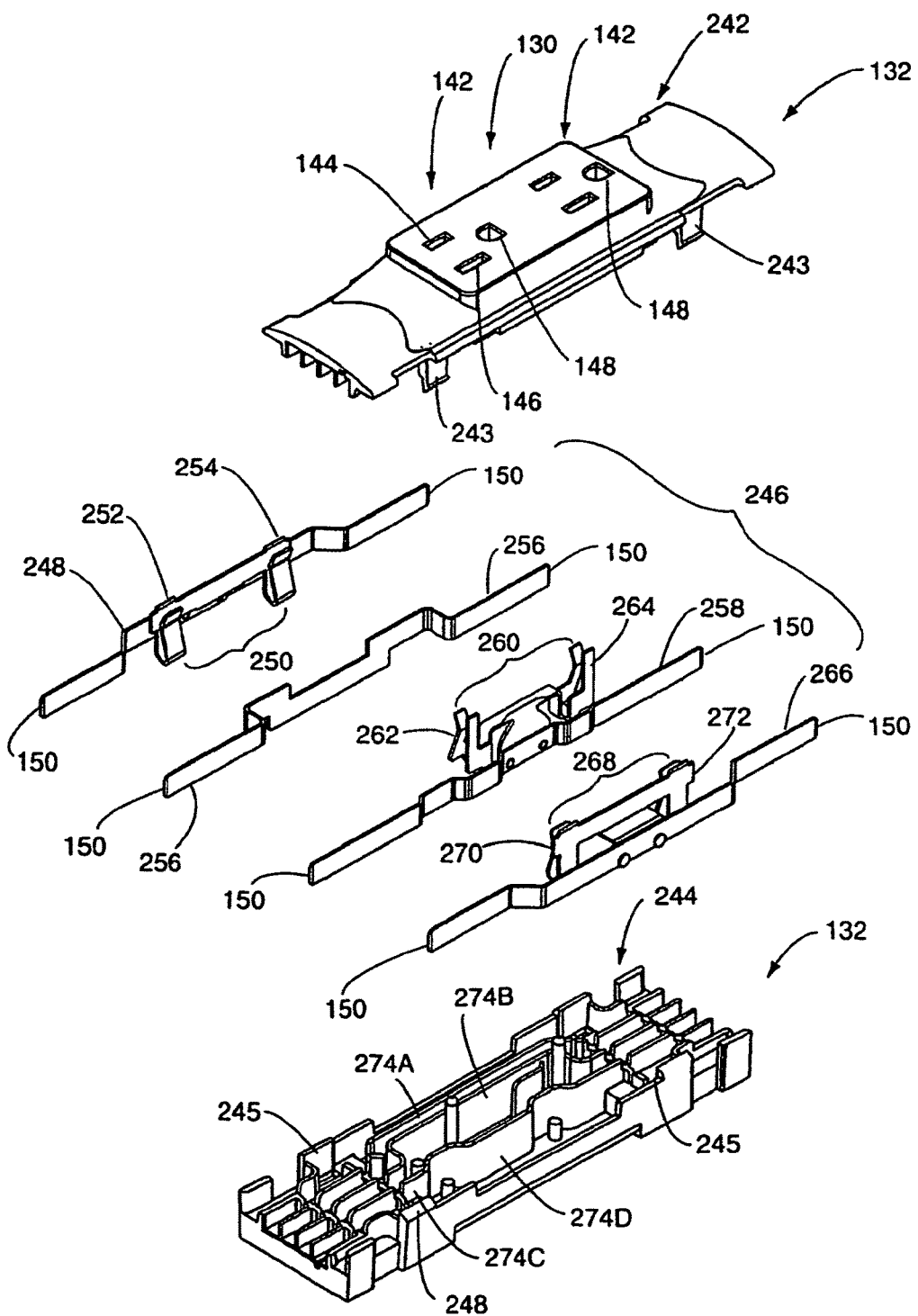
FIG. 37 is an exploded view of the receptacle junction block assembly shown in FIG. 31, and illustrated in four separate buss bars.
Figure 38:
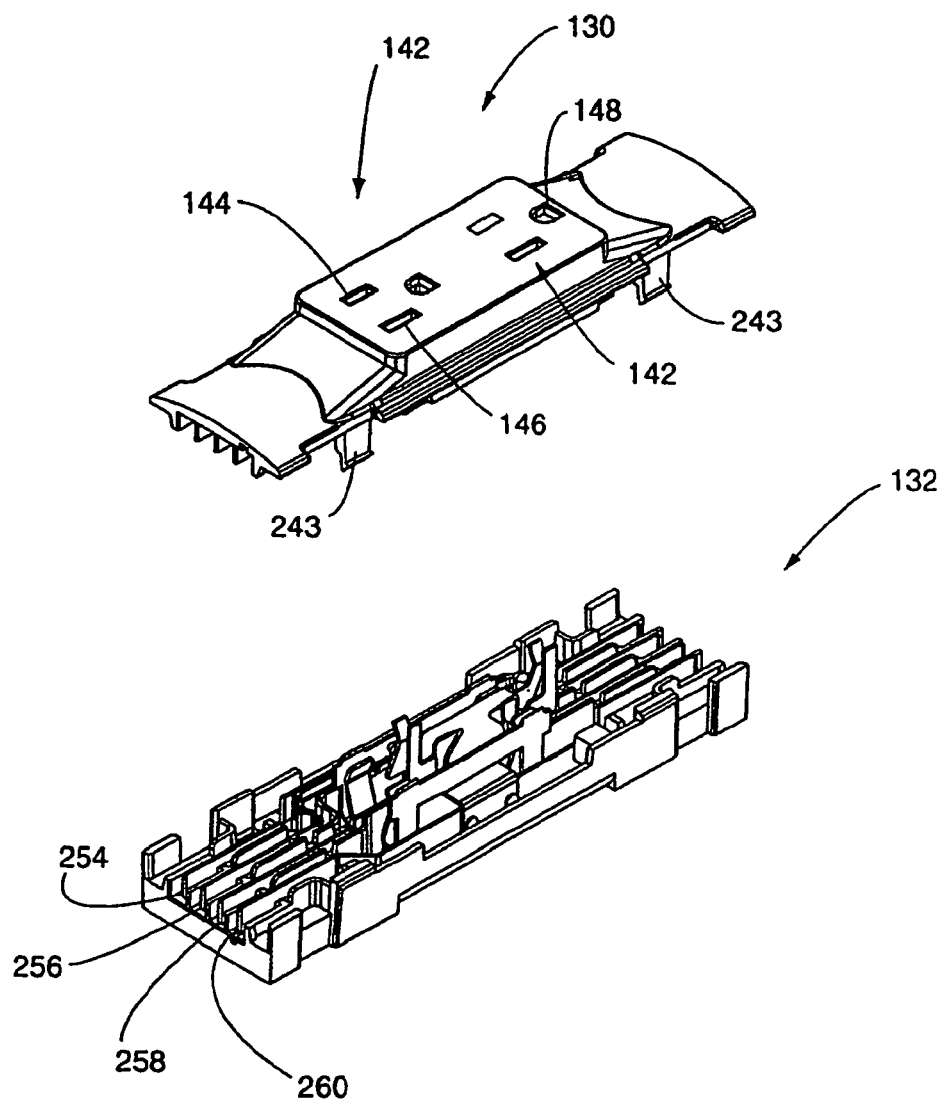
FIG. 38 is a partially exploded view of the receptacle junction block assembly shown in FIG. 31, showing the buss bars inserted into the junction block housing.

As previously described herein, the receptacle junction block 130 can provide for a four-wire configuration, so as to provide two separate circuits with a common ground and a common neutral. The interior configuration of the receptacle junction block 130 for serving these purposes will now be described with respect to FIGS. 37-41. With reference first to FIG. 37, the receptacle junction block 130 is shown in an exploded view. Details regarding the exterior portions of the receptacle junction block 130 will not be described at this time, since such components have been described in previous paragraphs herein. The receptacle junction block 130 includes a central housing 132 which is shown in FIG. 37 as comprising a front central housing 242 and a back central housing 244. The central housings 242, 244 can be connected by any suitable means, such as through the use of the tabs 243 on the back central housing 244 and the tab slots 245 on the front central housing 242. The tabs 243 are adapted to releasably engage the tab slots 245.

The receptacle junction block 130 includes a series of four buss bars 246. As will described in greater detail herein, the specific physical configuration of the buss bars 246 will differ, depending upon whether the receptacle junction block 130 is configured for use with the first circuit or, alternatively, the second circuit. For purposes of description, the specific buss bar configuration illustrated in FIG. 37 will be characterized as the buss bar configuration which provides for power to be supplied to the electrical outlet receptacles 142 through the first circuit. The buss bars 246 are shown as including an elongated hot buss bar 248. Each of the buss bars 246 is metallic in nature and a pair of hot female terminals 250 comprising a first hot female terminal 252 and second hot female terminal 254. These female terminals 250 aligned with the hot terminal outlets 144 of the electrical outlet receptacles 142.

Figure 41:
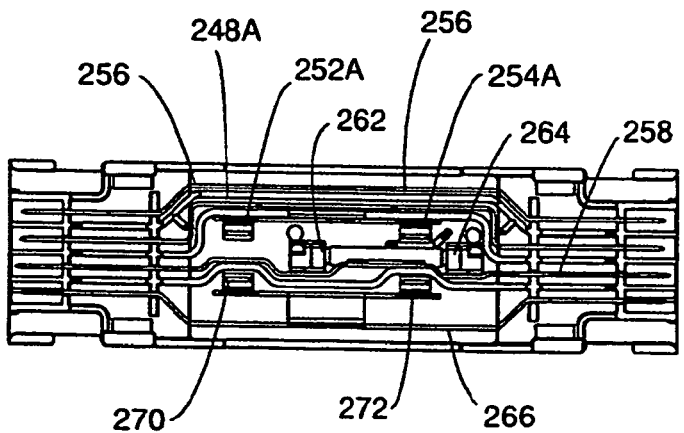
FIG. 41 is a view similar to FIG. 40, but shows the buss bar configuration for use with the second one of the two available circuits.
Figure 41A:
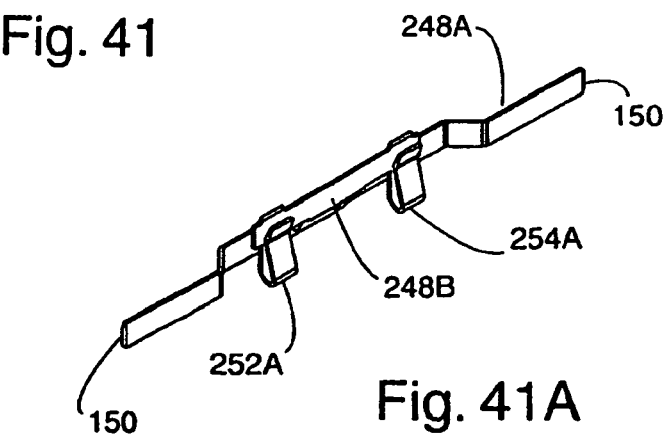

With further reference to FIG. 37, the buss bars 246 also include a pass-through buss bar 256. When the receptacle junction block 130 is set up to utilize the first circuit of the two circuits of the four-wire configuration, the pass-through buss bar 256 will be connected to the wires and terminals associated with the hot wire for the second circuit. Accordingly, the second circuit will not be made available through the electrical outlet receptacles 142 and, instead, will merely be passed through the receptacle junction block 130 so that, if desired, the second circuit can be utilized with other electrical components. In accordance with certain aspects of the invention, when it is desired to use the second circuit instead of the first circuit, the pass-through buss bar 256 will merely be repositioned into the buss bar slots (described subsequently herein) within the back central housing 244 which originally contained the hot buss bar 248. In the buss bar carrier slots vacated by the pass-through buss bar 256, a second circuit hot buss bar 248 will be positioned. This second circuit hot buss bar 248A is illustrated in FIG. 41 and FIG. 41A. As illustrated in these drawings, the hot buss bar 248A includes a bracket 248B which will extend the hot female terminals 252A and 254A into a position so that they are aligned with the hot terminal outlets 144 of the electrical outlet receptacles 142. In view of the foregoing, and therefore in accordance with certain aspects of the invention, the receptacle junction block 130 can be switched from providing power to the electrical outlet receptacles 142 from a first circuit of the four-wire configuration to a second circuit of the four-wire configuration merely by repositioning the pass-through buss bar 256 and substituting the hot buss bar 248 for the hot buss bar 248A. In the preferred embodiment, this procedure is actually performed during the assembly of the receptacle junction block 130.

In addition to the hot buss bars 248 and 248A, the receptacle junction block 130 may include a ground buss bar 248. The ground buss bar 258 includes ground terminals 260 comprising a first ground terminal 262 and a second ground terminal 264. The ground terminals 260 are positioned on the ground buss bar 258 so that they are in alignment with the ground terminal outlets 148 of the electrical outlet receptacles 142.

Figure 40:
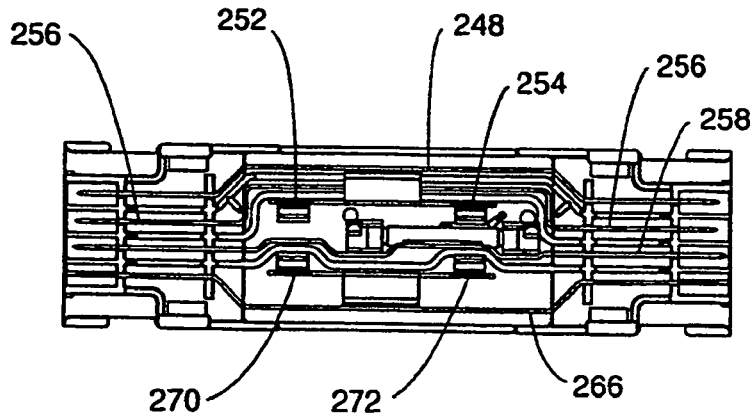
FIG. 40 illustrates the buss bar configuration for the receptacle junction block assembly illustrated in FIG. 31, for use of a first one of the two available circuits.

Still further, the receptacle junction block 130 also includes a neutral or common buss bar 266, as shown in FIGS. 37, 40 and 41. The neutral or common buss bar 266 is secured to a set of neutral female terminals 268, comprising a first neutral female terminal 270 and a second neutral female terminal 272. When the neutral buss bar 266 is appropriately positioned within the carrier slots of the back central housing 244, the neutral female 268 will be aligned with the neutral terminal outlets 146 of the electrical outlet receptacles 142.

While FIG. 37 shows the buss bars 246 in an exploded view relative to other components of the receptacle junction block 130, FIG. 40 shows the back central housing 244 with its attendant buss bar slots 274. The buss bar slots 274 comprise buss bar slots 247A, 274B, 274C and 274D. Each of the buss bars 246 is positioned and releasably secured within a corresponding one of the buss bar slots 274. The front central housing 242 will also have appropriate elements so as to mate with the slots 274 and appropriately secure the buss bars 246 therewithin.

As earlier described, the receptacle junction block 130 can have its buss bars 46 configured so as to provide for power from the first circuit to be supplied to the electrical outlet receptacles 142 or, alternatively, power from the second circuit to be supplied to the outlet receptacles 142. FIG. 40 illustrates the use of the buss bars 246 so as to provide for power to the electrical outlet receptacles 142 from the first circuit. Specifically, the configuration shown in FIG. 40 includes hot buss bar 248 and pass-through buss bar 256 and the particular configuration shown therein. In contrast, FIG. 41 illustrates the configuration of buss bars 246 when it is desired to provide power to the electrical outlet receptacles 142 from the second circuit. Specifically, FIG. 41 illustrates the use of the hot buss bar 248A, having a first hot female terminal 252, and a second hot female terminal 254A positioned as shown. Also, FIG. 41 illustrates the pass-through buss bar 256 as being in a different buss bar slot 274 than where it is positioned in FIG. 40. FIG. 41A is a perspective view of the configuration of the hot buss bar 248A.

Figure 42:
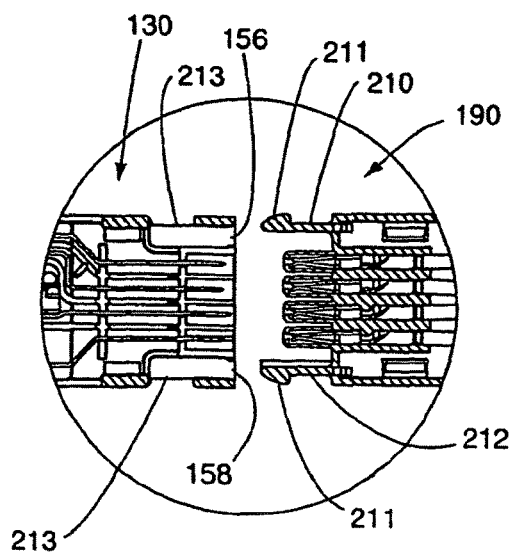
FIG. 42 illustrates an initial position of one end of the receptacle junction block assembly illustrated in FIG. 31, relative to the position of a female connector block for purposes of interconnection of the elements.
Figure 43:
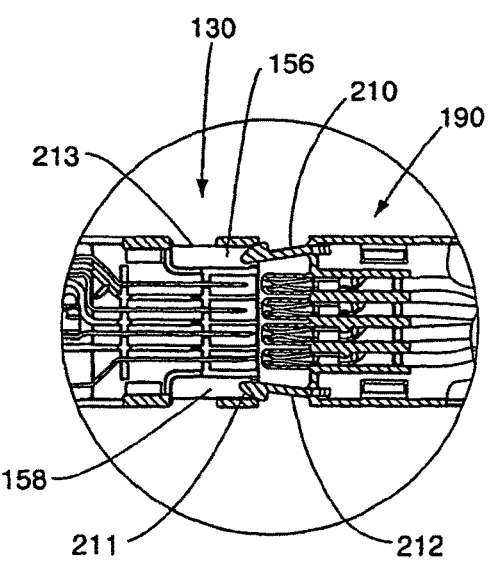
FIG. 43 illustrates somewhat of an initial position as the receptacle junction block assembly begins to electrically and mechanically interconnect to the female connector block.
Figure 44:
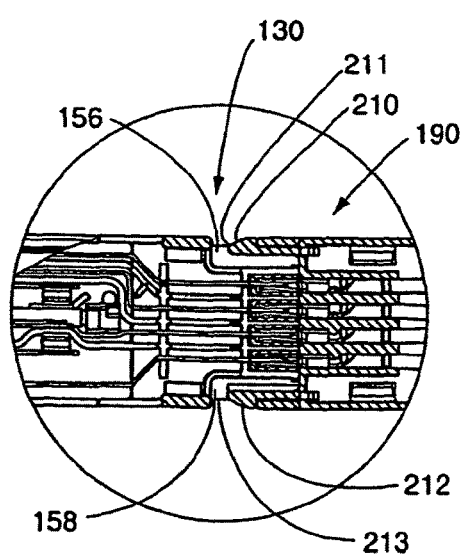
FIG. 44 is similar to FIGS. 42 and 43, but illustrates the final connection position between the receptacle junction block assembly and the female connector block.
Figure 51:
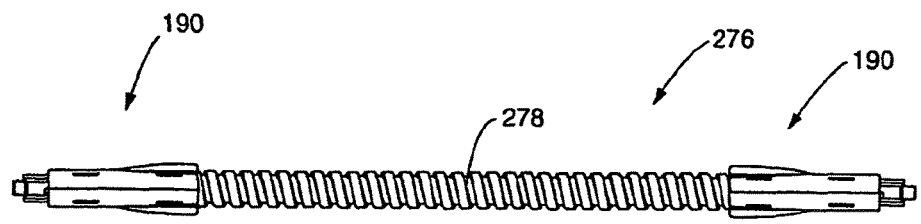
FIG. 51 is a planned view of an alternative embodiment of a two-way jumper assembly in accordance with the invention, showing the use of expandable conduit interconnecting the pair of female end connector blocks.
Figures 52, 52A, 52B:
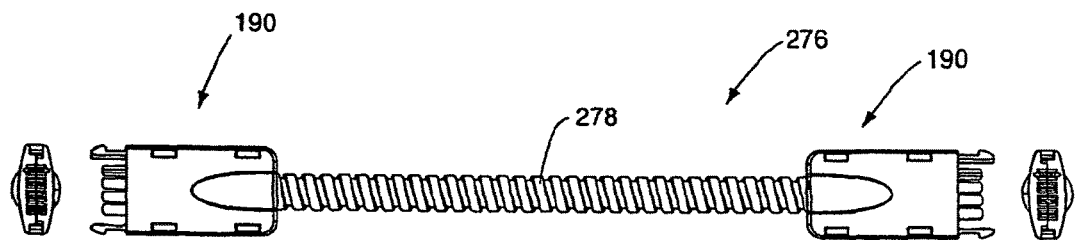
FIG. 52 is a front, elevation view of the jumper assembly shown in FIG. 51.
FIG. 52A is a left-end elevation view of the jumper assembly shown in FIG. 51.
FIG. 52B is a right-end elevation view of the jumper assembly shown on FIG. 51.
Figure 53:
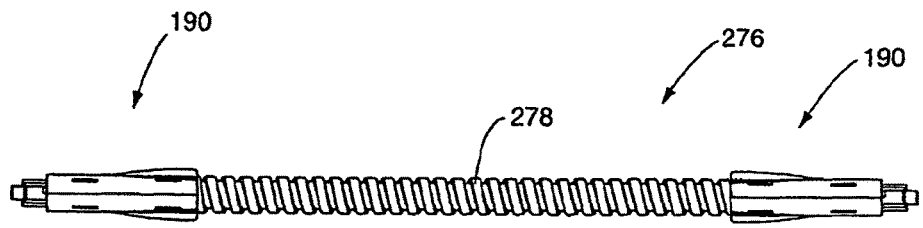
FIG. 53 is an underside view of the jumper assembly shown on FIG. 51.
Figure 54:
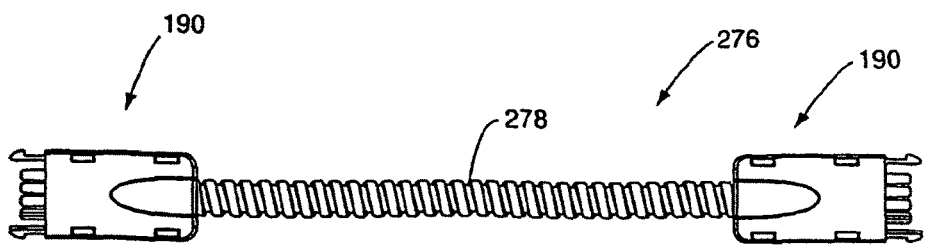
FIG. 54 is a rear, elevation view of the jumper assembly shown on FIG. 51.
Figure 55:
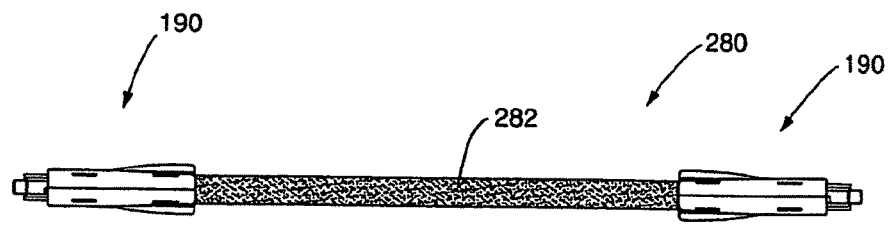
FIG. 55 is a planned view of a further embodiment of a two-way jumper assembly in accordance with the invention, showing the use of wire mesh for purposes of interconnecting the pair of opposing female end connector blocks.
Figures 56, 57, 58:
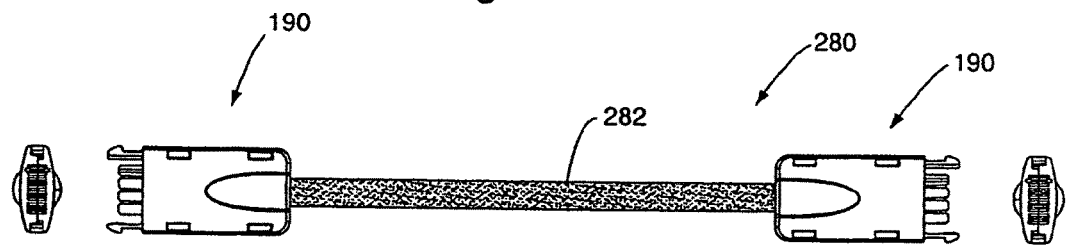
FIG. 56 is a front, elevation view of the jumper assembly shown in FIG. 55.
FIG. 57 is a left-end, elevation view of the jumper assembly shown in FIG. 55.
FIG. 58 is a right-end, elevation view of the jumper assembly shown in FIG. 55.
Figure 59:
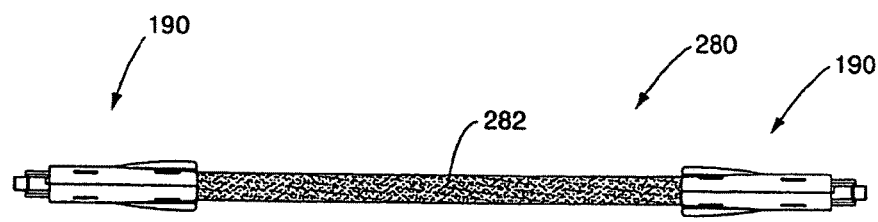
FIG. 59 is an underside view of the jumper assembly shown in FIG. 55.
Figure 60:
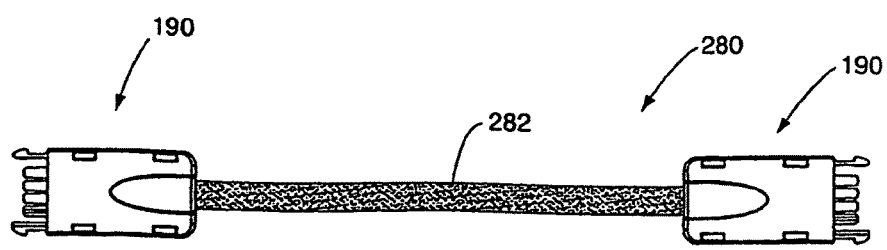
FIG. 60 is a rear, elevation view of the jumper assembly shown in FIG. 55.

As previously described herein, particularly with respect to FIGS. 14 and 15, the receptacle junction block 130 cannot be releasably secured to a female jumper cable assembly connector block 190. While the connection arrangement is somewhat shown in FIGS. 14 and 15, a more detailed set of illustrations is shown in FIGS. 42, 43 and 44. Therein, sectional views are shown of the part of the receptacle junction block 130 which can be releasably interconnected with part of the assembly connector block 190. Specifically, and as previously described herein, the receptacle junction block 130 includes tab slots 154 comprising a first tab slot 156 and second tab slot 158. Correspondingly, the connector block 190 includes a first connector tab 210 and a second connector tab 212, each tab being resilient. Each of the tabs 210 and 212 include a slanted front surface 211 which, because of the resilient nature of the tabs 208, have the capability of flexing. FIG. 42 shows an initial position of the receptacle junction block 130 and the female cable assembly connector block 190. As the components 130 and 190 are moved closer together, the slanted surfaces 211 of the tabs 210, 212 abut edges of the tab slots 154, and are bent inwardly relative thereto. Connector tabs 210, 212 are moved further into the receptacle junction block 130, the slanted surfaces 211 move forwardly a sufficient distance so that they can flex outwardly through apertures 213 formed within the sides of the tab slots 156, 158. This configuration is shown in FIG. 44, while the flex configuration is shown in FIG. 43. With the connector tabs 210, 212 positioned as shown in FIG. 44, the receptacle junction block 130 is releasably secured with the connector block 190. That is, the two electrical elements cannot really be "pulled apart." Instead, to disconnect the junction block 130 and connector block 190, inward pressure must be exerted on both of the slanted surfaces 211 (that is, inwardly toward the center of the electrical components), so that surfaces 211 are removed from within the apertures 213. This configuration is again shown in FIG. 43. In this configuration, outwardly directed forces can then release the connector block 190 from the junction block 134. In accordance with the foregoing, the electrical components 130, 190 comprise means for releasably securing the components together, with the capability of securing the components together and releasing the components from each other without the need of tools or the like.

Additional details will now be described with respect to various embodiments of two-way, four-wire female jumper cable assemblies in accordance with the invention. FIGS. 45-50 illustrate the two-way, four-wire female jumper cable assembly 234 previously shown in FIG. 30. As illustrated in FIGS. 45-50, the two-way jumper cable assembly 234 includes a pair of two-way, four-wire female jumper cable assembly connector blocks 190 as previously described with respect to FIGS. 16-19. In view of the prior description, the connector blocks 190 will not be described in particular detail herein. Suffice it to say that the jumper cable assembly 234 includes a connector block 190 at each of its opposing ends. As previously described, each connector block 190 includes a housing 192, comprising a front housing cover 194 and rear housing cover 196. A cable 198 which incorporates the four wires (not shown) for the four-wire configuration extends between the connector blocks 190 and is suitably connected by any conventional manner to each of the connector blocks 190. Each connector block 190 includes a female end connector set 204 comprising a set of four connectors 202. Female terminals 200 extend into each of the connectors 202 and are connected to the wires (not shown) which extend through the cable 198. The connectors 202 include a keyed connector 206. Each connector block 190 also includes a pair of resilient connector tabs 208, comprising a first connector tab 210 and a second connector tab 212. The structure and use of these connector tabs were previously described herein. In the particular embodiment of the female jumper cable assembly 234 illustrated in FIGS. 45-50, the cable 198 is shown as being constructed of a plastic or similar material, such as PVC material.

A second, alternative embodiment of a two-way, four-wire female jumper cable assembly is illustrated in FIGS. 51-54 as jumper cable assembly 276. As with the jumper cable assembly 234, the jumper cable assembly 276 includes an opposing pair of connector blocks 190. In view of the substantial similarities with the cable assembly 234, like components in the jumper cable assembly 276 will not be described in any detail herein. Instead, it will be noted that the distinction between the female jumper cable assembly 234 and the female jumper cable assembly 276 resides with respect to the cabling. Specifically, the jumper cable assembly 234 includes a cable 198 which was previously described herein as comprising PVC or some other type of similar material. The jumper cable assembly 276 illustrated in FIGS. 51-54 includes a cable 278 which is shown as being constructed of a metallic conduit. With this type of configuration, it may be possible to actually provide for expansion of the jumper cable assembly 276.

A third embodiment of a two-way, four-wire female jumper cable assembly is illustrated as cable assembly 280 in FIGS. 55-60. As with the cable assembly 276, the cable assembly 280 is substantially identical to the previously described female jumper cable assembly 234. That is, the cable assembly 280 includes a pair of connector blocks 190, corresponding to the connector blocks 190 associated with cable assembly 234. However, instead of utilizing a cable 198, the cable assembly 280 utilizes a cable 282 which is shown in FIGS. 55-60 as comprising wire mesh.

FIGS. 61-66 illustrate a still further embodiment of a two-way jumper cable assembly in accordance with the invention. The jumper cable assembly is shown as assembly 284. As with the jumper cable assembly 234, the jumper cable assembly 284 includes a female jumper cable assembly connector block 190 connected to one end of a cable 198. However, unlike the other embodiments of jumper cable assemblies previously described herein, the jumper cable assembly 284 includes, at its opposing end, a male jumper cable assembly connector block 286. The male jumper cable assembly connector block 286 includes male blade connectors so that the connector block 286 can be electrically connected to a female connector block, such as the female connector block 190. The male jumper cable assembly connector block 286 has some substantial similarities to the end connector sections of the receptacle junction blocks previously described herein, including receptacle junction block 130. That is, the male jumper cable assembly connector block 286 includes a housing 288, comprising a front housing cover 290 and a rear housing cover 292. Male blade terminals 294 which are connected to wires (not shown) within the cable 198 extend outwardly into connectors 296 of a male end connector set 298. The connectors 296 may include a keyed connector 300, as primarily shown in FIG. 64. It should be noted that the jumper cable assembly 284 is not shown in the individual electrical components illustrated in FIG. 30 for the particular modular electrical system being described herein. However, jumper cable connector assembly 284 makes apparent that various types of configurations of male and female connector blocks may be utilized with electrical components in accordance with the invention, without departing from the spirit and scope of a number of the novel concepts of the invention.

Figure 67:
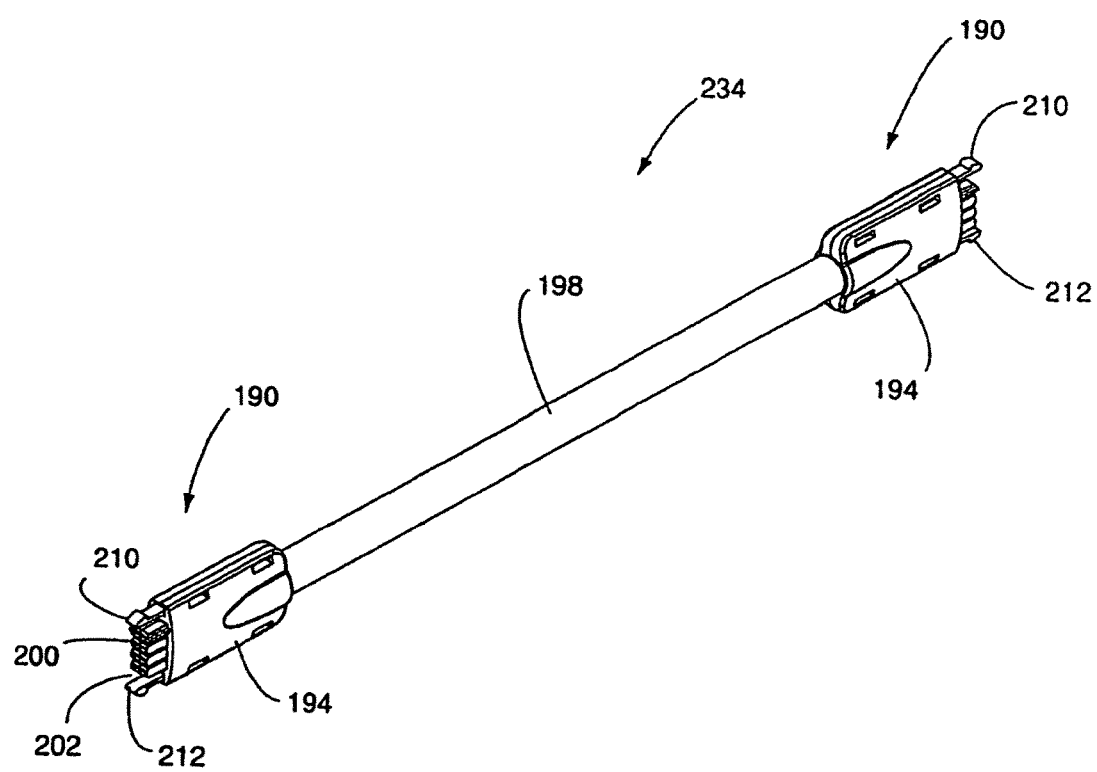
FIG. 67 is a perspective view of the jumper assembly shown on FIG. 45.
Figure 68:
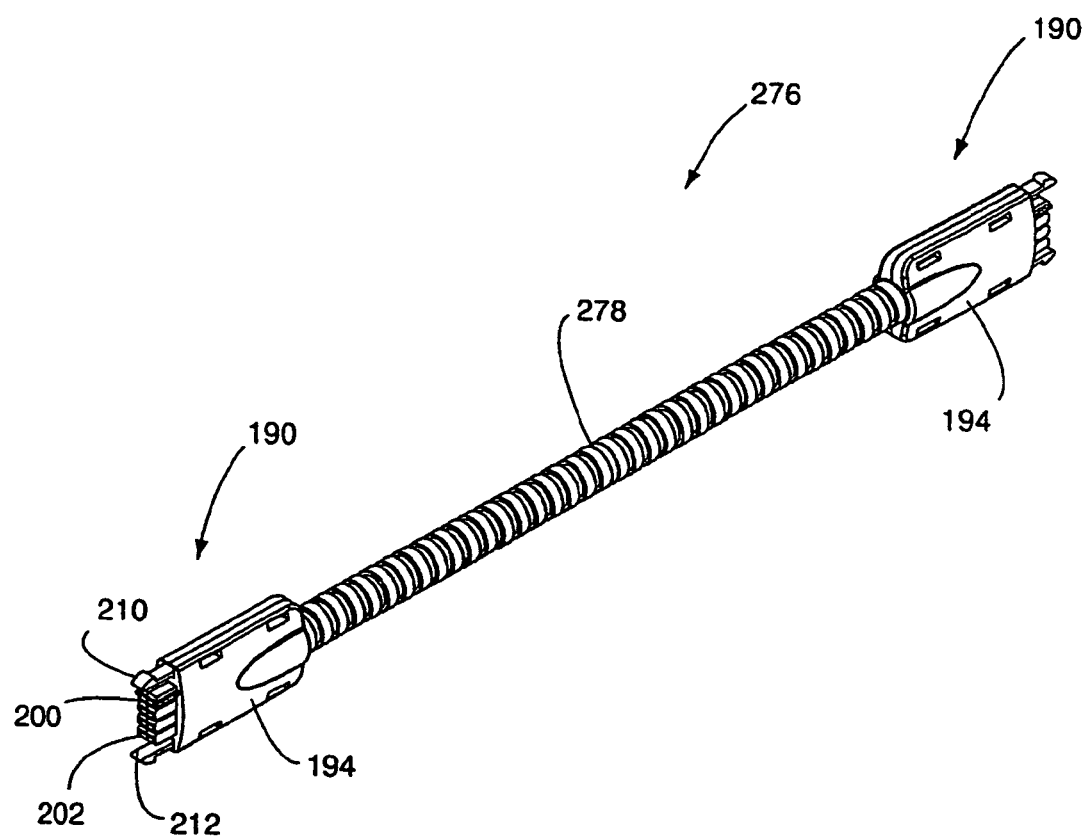
FIG. 68 is a perspective view of the jumper assembly shown on FIG. 51.
Figure 69:
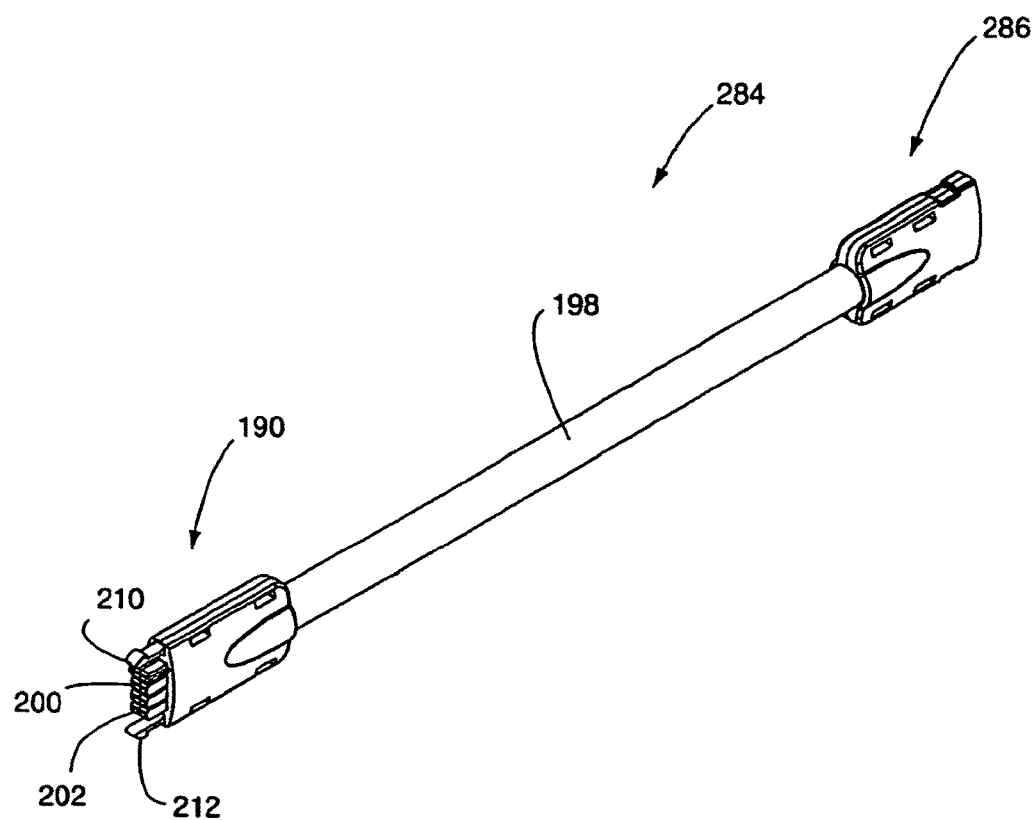
FIG. 69 is a perspective view of the jumper assembly shown on FIG. 61.

FIG. 67 is a perspective view of the female jumper cable assembly 234 previously illustrated in FIGS. 45-50. Correspondingly, FIG. 68 illustrates the embodiment of the female jumper cable assembly 276 previously described with respect to FIGS. 51-54. FIG. 69 illustrates the embodiment of a two-way jumper cable assembly 284 previously described with respect to FIGS. 61-66.

Figure 70:
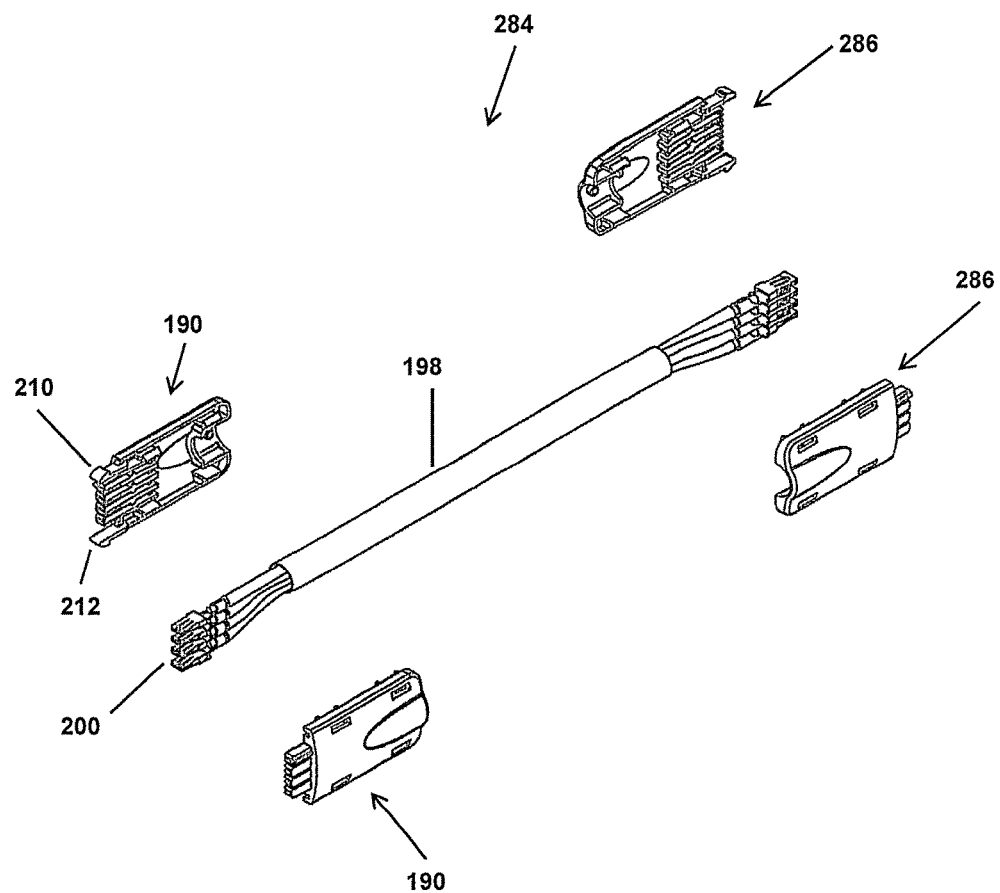
FIG. 70 is an exploded view of the jumper assembly shown on FIG. 45.

FIG. 70 is a partially exploded view of the two-way, four-wire female jumper cable assembly 234 previously described herein. FIG. 70 includes the cable 198, along with each of the connector blocks 190. As shown in FIG. 70, extending through the cable 198 is an internal cable 302. The internal cable 302 holds the sheathed set of four wires 304. As further shown in FIG. 70, each of the sheathed wires 304 is connected to an individual female terminal 200. Other components of the cable assembly 234 illustrated in FIG. 70 have been previously described herein.

Figure 71:
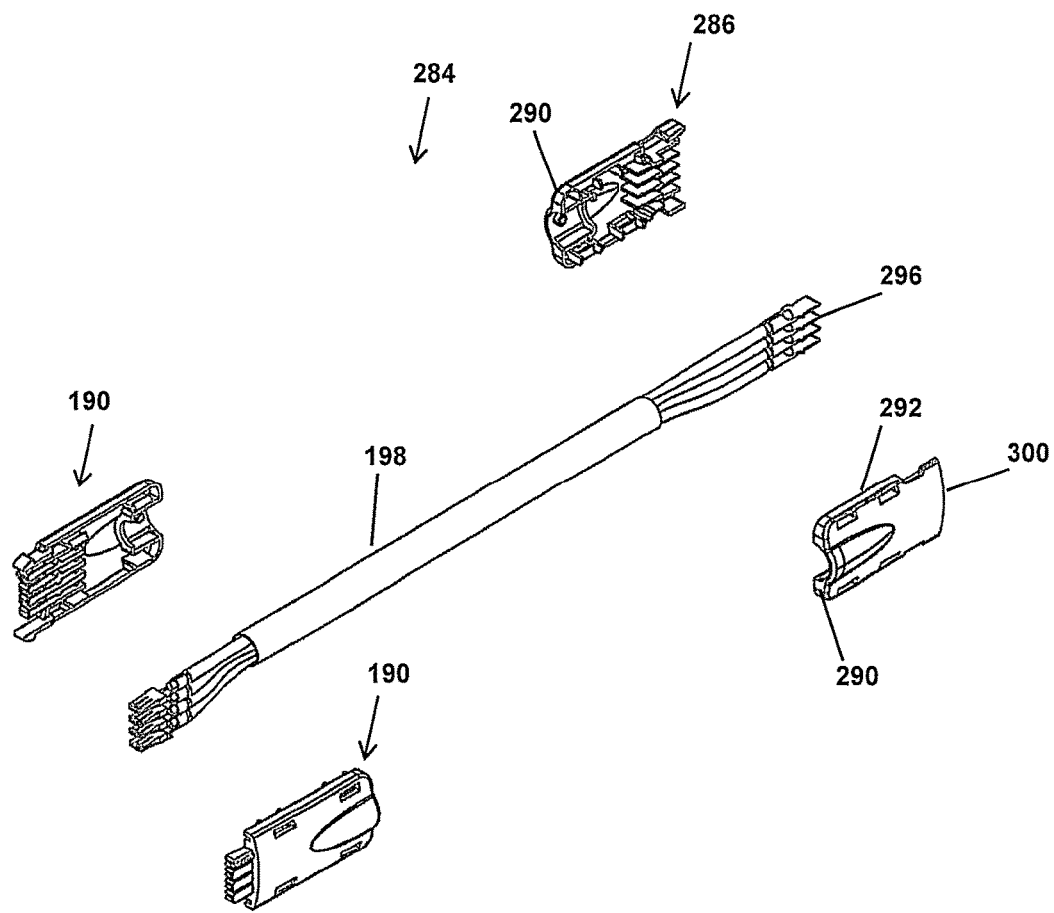
FIG. 71 is a perspective view of the jumper assembly shown on FIG. 61.
Figure 72:
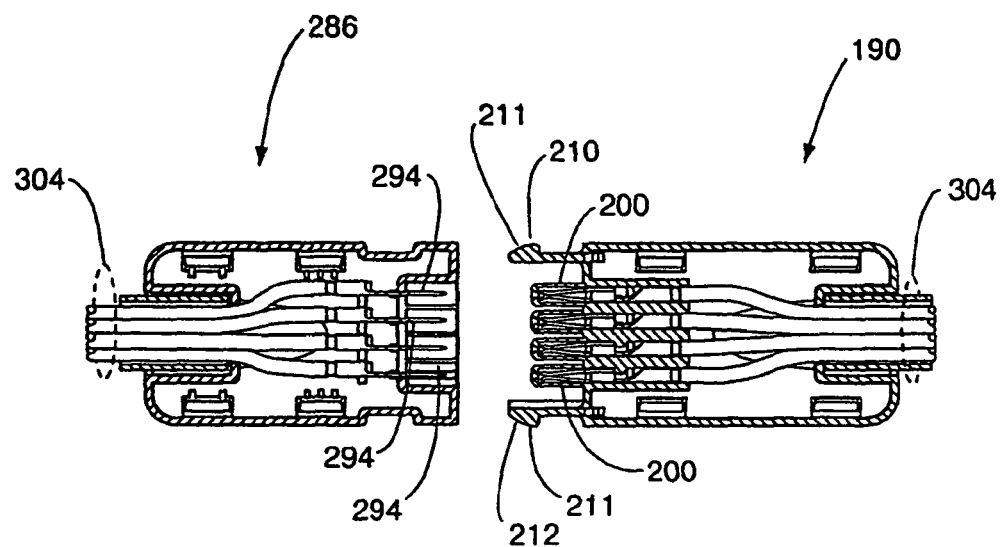
FIG. 72 is a sectional view showing an initial position for connection female and connector block of the jumper assembly shown on FIG. 45 to a male blade connector block assembly.
Figure 73:
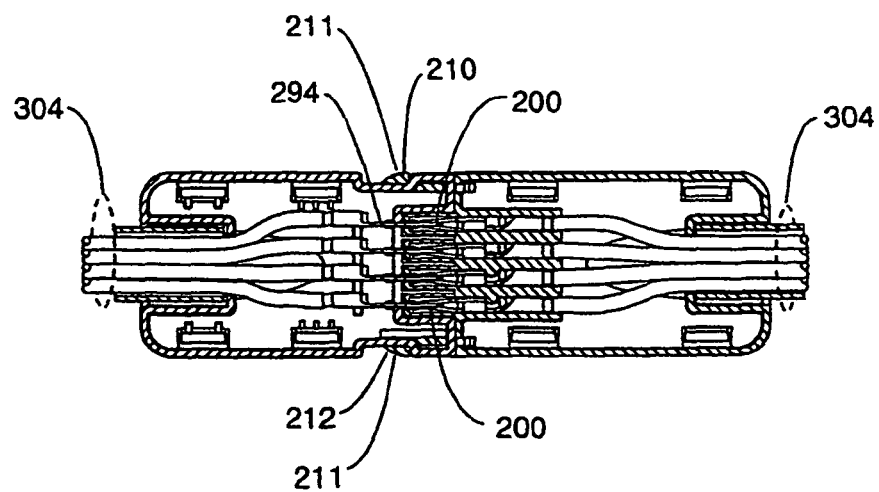
FIG. 73 is similar to FIG. 72, but shows the final position of the element shown in FIG. 72 when they are electrically and mechanically connected together.
Figure 74:
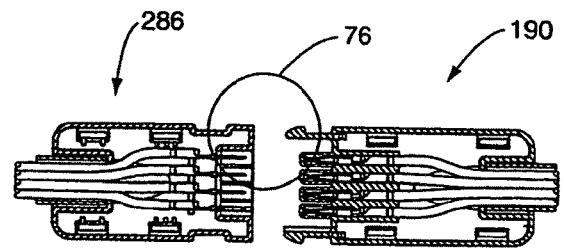
FIG. 74 is a sectional view similar to FIG. 72 and showing the portion of the elements which will be illustrated in FIG. 76.
Figure 75:
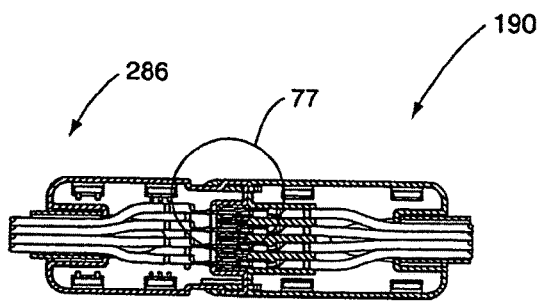
FIG. 75 is a sectional view similar to FIG. 73 and showing the location of the enlarged view of FIG. 77.

FIG. 71 is an exploded view of the previously described two-way jumper cable assembly 284. The jumper cable assembly 284 was previously described with respect to FIGS. 61-66. As referenced with respect to those drawings, the jumper cable assembly 284 includes a female jumper cable assembly connector block 190, as well as a male jumper cable assembly connector block 286. The connector block 190 and the connector block 286 each have components previously described herein. FIG. 71 illustrates, in a manner similar to FIG. 70, that the jumper cable assembly 284 includes an internal cable 302 running through the cable 198. The internal cable 302 carries a set of sheathed wires 304, comprising the four-wire configuration. In the connector block 190, the sheathed wires 304 are connected to a set of female terminals 200. In contrast, the sheathed wires 304 within the connector block 286 are electrically connected to a set of male blade terminals 294. FIGS. 72 and 73 show the manner in which the male jumper cable assembly connector block 286 may be electrically interconnected and releasably secured to a female connector block, such as a female jumper cable assembly connector block 190. As shown in FIGS. 72 and 73, if desired, the male jumper cable assembly connector block 286 of the jumper cable assembly 284 could be connected to the connector block 190 of, for example, the female jumper cable assembly 234. In this way, two two-way jumper cable assemblies may be connected directly together. As shown in FIG. 72, the connector tabs 210, 212 are preferably brought into alignment with connector tab slots (not shown) on the connector block 286. FIG. 73 shows a final position of the connector tabs 210, 212 with the connector block 286 secured to the connector block 190. FIGS. 72 and 73 also show the electrical mating of the male blade terminals 294 of the connector block 286 with the female terminals 200 of the connector block 190.

Figure 76:
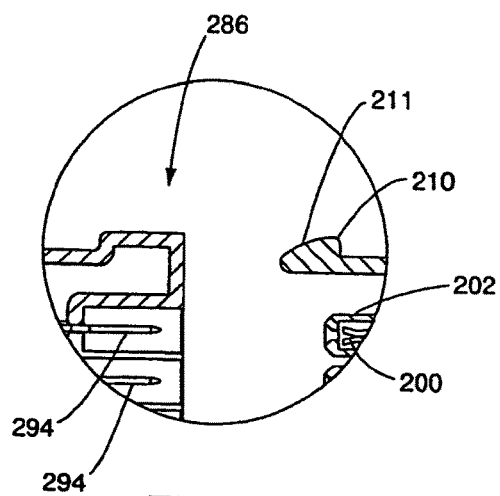
FIG. 76 is an enlarged view of a portion of the element shown in FIG. 72, as the elements are moved into position for electrical connection.
Figure 77:
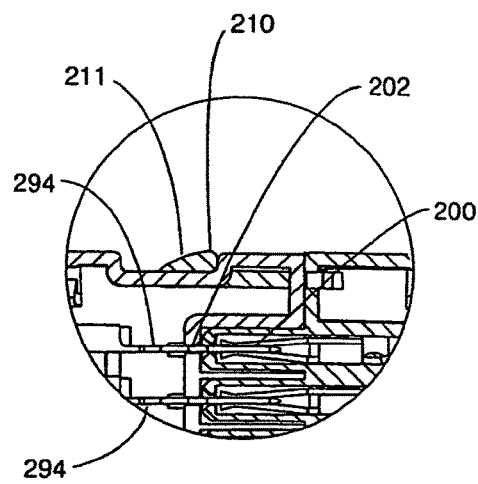
FIG. 77 is a view corresponding to the circled portion of FIG. 75, showing the final positioning of the elements shown in FIG. 75 and an electrical and mechanical connection.

FIGS. 74-77 show the physical and releasable securing of the male connector block 286 to the female connector block 190 in greater detail, as well as showing greater detail with respect to the electrical interconnections. Specifically, FIG. 74 corresponds to a smaller version of FIG. 72, while FIG. 75 corresponds to a smaller version of FIG. 73. FIG. 76 is an enlarged view of a portion of connector blocks 286 and 190, showing the relative positioning of the first connector tab 210 to the connector block 286 when the connector blocks 286, 190 are to be physically secured together. FIG. 76 also shows the relative positioning of certain of the male blade terminals 294 with the female terminals 200 and female connectors 202. FIG. 77 illustrates a final, secured position with the connector block 286 mated to the connector block 190. In this position, the male blade terminals 294 are electrically interconnected to the female terminals 200, within the connectors 202.

Figure 78:
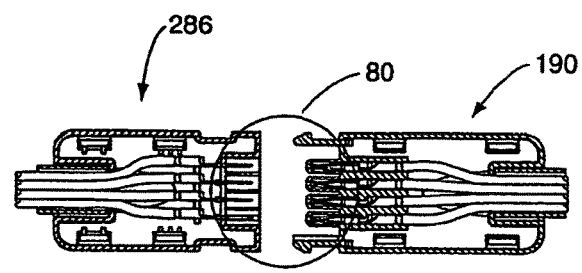
FIG. 78 is a view similar to FIG. 74, but showing the relative position of FIG. 80.
Figure 79:
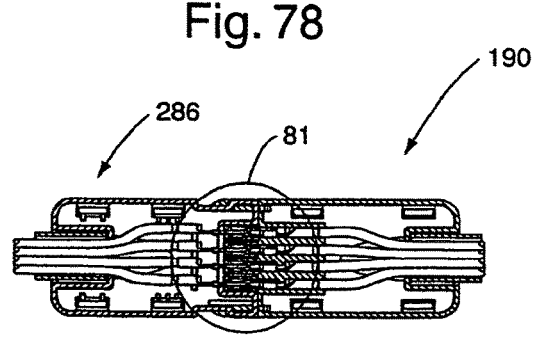
FIG. 79 is a sectional view similar to FIG. 75, but showing the relative position of FIG. 81.
Figure 80:
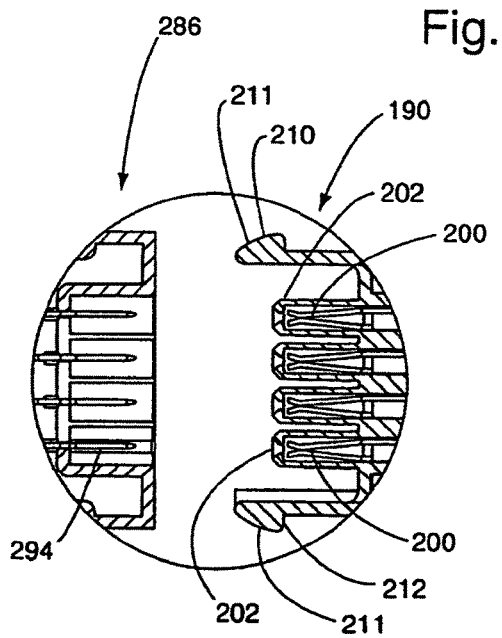
FIG. 80 is an enlarged, sectional view similar to FIG. 76, but showing additional components of the elements being connected together.
Figure 81:
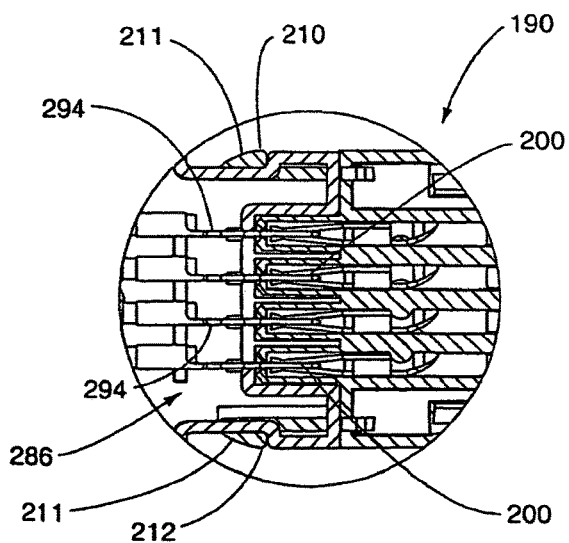
FIG. 81 is a sectional, enlarged view similar to FIG. 77, but showing the final positioning of the connection of elements shown in FIG. 80.
Figure 82:
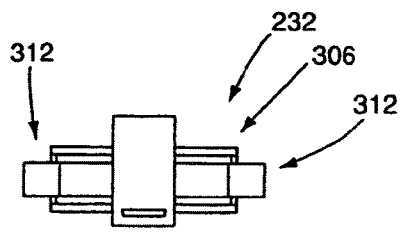
FIG. 82 is a plan view of a two way male connector in accordance with the invention.
Figure 84:
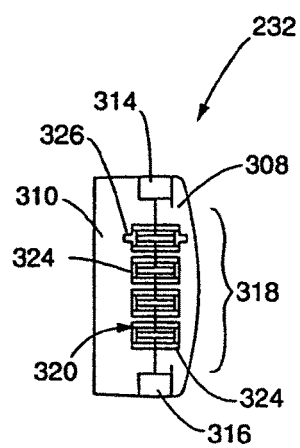
FIG. 84 is a left-side end view of the two way connector shown in FIG. 82.
Figure 83:
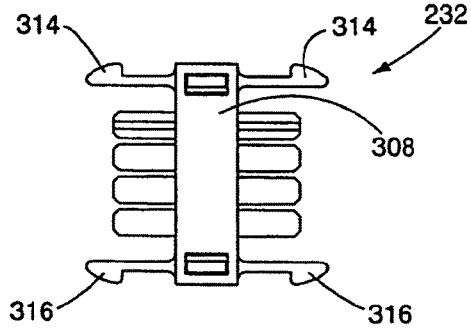
FIG. 83 is a front, elevation view of the two way connector shown in FIG. 82.
Figure 85:
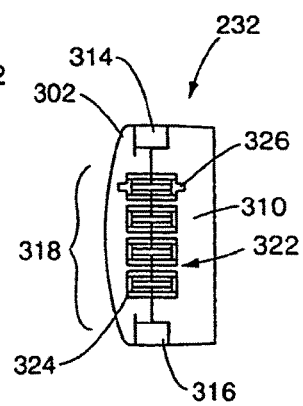
FIG. 85 is a right-end, elevation view of the two way connector shown in FIG. 82.
Figure 86:
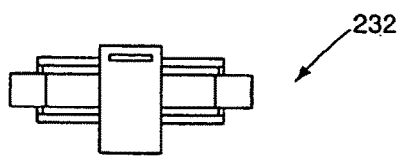
FIG. 86 is an underside view of the two way male connector shown in FIG. 82.
Figure 87:
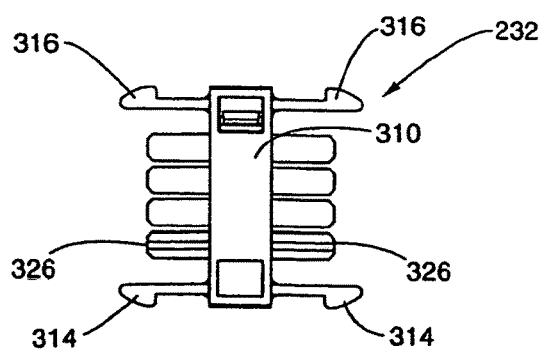
FIG. 87 is a rear, elevation view of the two way male connector shown in FIG. 82.
Figure 88:
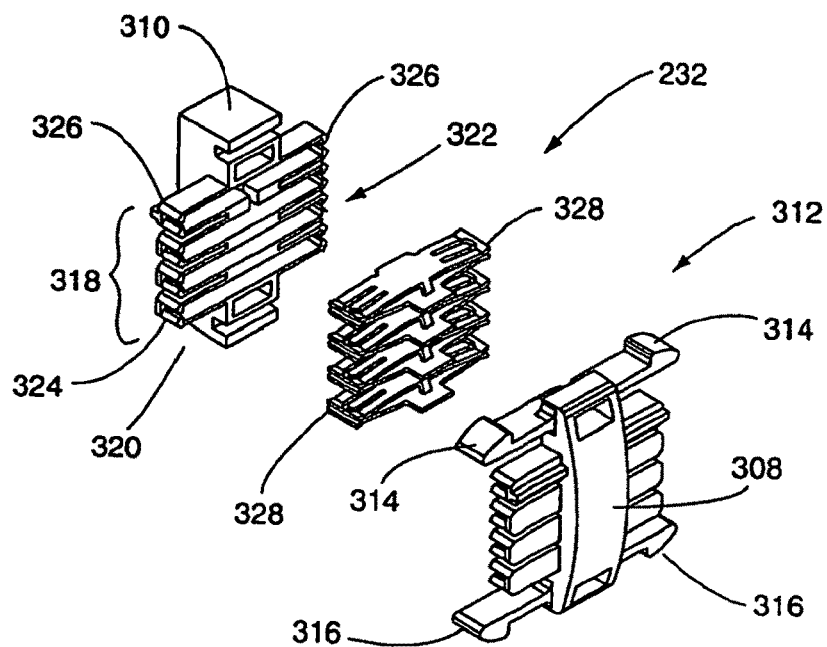
FIG. 88 is a perspective and exploded view of the two way male connector shown in FIG. 82.
Figure 89:
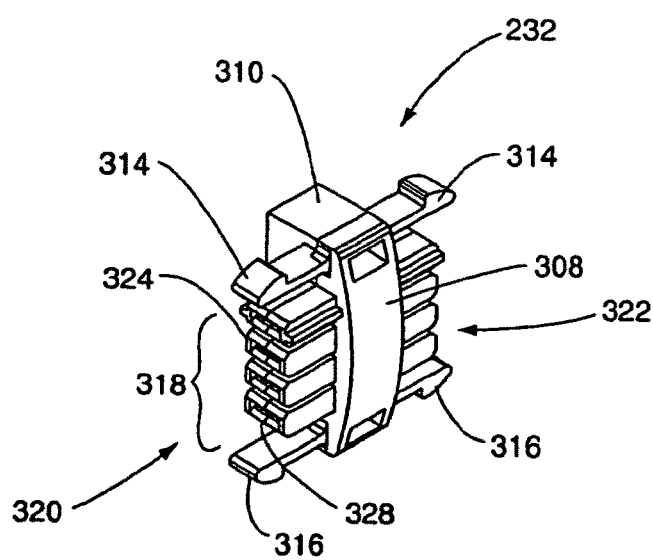
FIG. 89 is a perspective view of the two way male connector shown in FIG. 82, in a fully assembled state.
Figure 90:
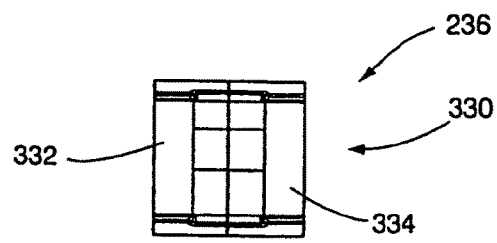
FIG. 90 is a plan view of a four way male connector in accordance with the invention.
Figure 92:
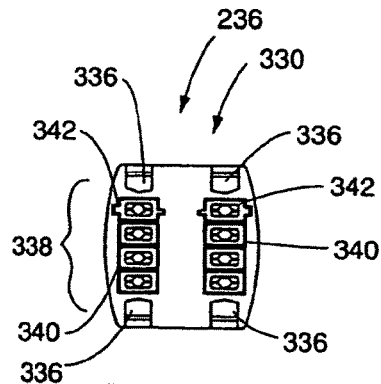
FIG. 92 is a left-end, elevation view of the four way male connector shown in FIG. 90.
Figure 91:
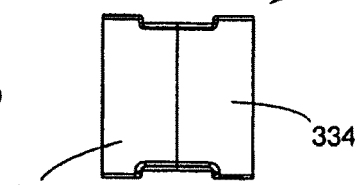
FIG. 91 is a front, elevation view of the four way male connector shown in FIG. 90.
Figure 93:
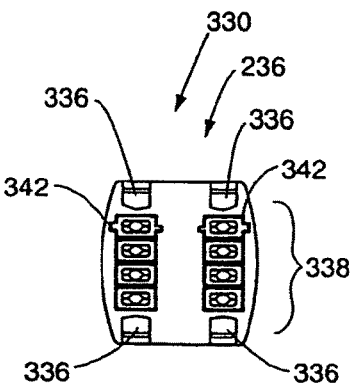
FIG. 93 is a right-end, elevation view of the four way male connector shown in FIG. 90.
Figure 94:
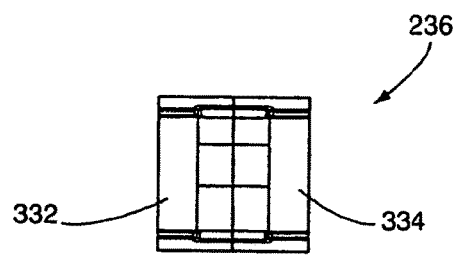
FIG. 94 is an underside view of the four way male connector shown in FIG. 90.
Figure 95:
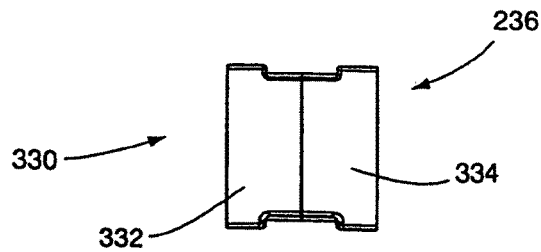
FIG. 95 is a rear, elevation view of the four way male connector shown in FIG. 90.
Figure 97:
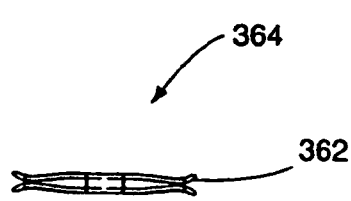
FIG. 97 is a front, elevation view of the terminal set shown in FIG. 96.
Figure 96:
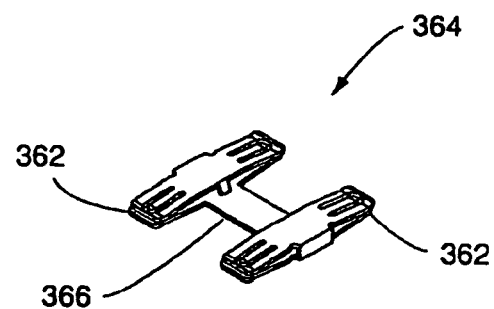
FIG. 96 is a perspective view of an H-shaped terminal set which may be utilized with the four way male connector shown in FIG. 90.
Figure 98:
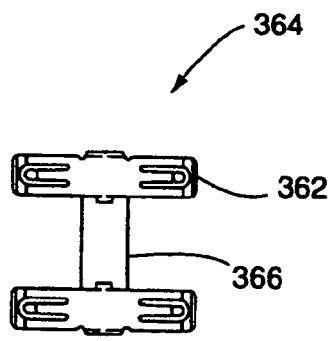
FIG. 98 is a plan view of the terminal set shown in FIG. 96.
Figure 99:
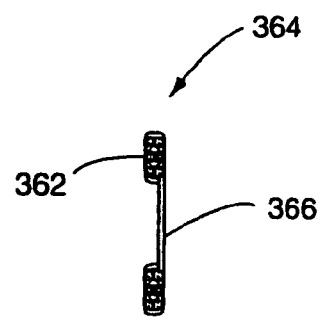
FIG. 99 is a right-end view of the terminal set shown in FIG. 96.

FIGS. 78-81 are similar to FIGS. 74-77, but show somewhat greater detail with respect to the electrical and physical interconnections of the connector blocks 286 and 190. Specifically, FIG. 78 is substantially identical to FIG. 74, while FIG. 79 is substantially identical to FIG. 75. However, FIG. 80, unlike FIG. 76, is an enlarged view showing the entirety of the four male blade terminals 294 as they are aligned in position with the four female terminals 200 of the connector block 190. Correspondingly, the first connector tab 210 and the second connector tab 212 of the connector block 190 are appropriately aligned with connector tab slots (not shown) on the connector block 186. FIG. 81 illustrates a final secured position of the connector block 286 with the connector block 190. In this position, the tabs 210 and 212 are releasably secured to the connector block 286, while the male blade terminals 294 are electrically interconnected with the female terminals 200.

As earlier described with respect to FIG. 30, the modular electrical system component set 230 includes a two-way, four-wire female connector 232. The connector 232 is adapted to connect in line to other electrical components having end connectors utilizing male terminals. The two-way connector 232 is illustrated in FIGS. 82-89. With respect thereto, the two-way female connector 232 includes a housing 306, comprising a front housing cover 308 and rear housing cover 310. Connector tabs 312 extend outwardly from opposing sides of the connector 232. The connector tabs 312 include a pair of first tabs 314 and a pair of lower second tabs 316. The connector tabs 314, 316 function in exactly the same manner as the connector tabs 210, 212 previously described with respect to other components of the component set 230.

As further shown in FIGS. 82-89, the two-way connector 232 also includes a pair of opposing female end connector sets 318. Each female end connector set 318 comprises four connectors 324. The pair of connector sets 318 comprise a first female end connector set 320 and a second female end connector set 322. In accordance with the invention, and if desired, the end connector sets 318 may include keyed connectors, such as the keyed connectors 326 primarily illustrated in FIGS. 84 and 85. Extending through and received within the connectors 324 are sets of female terminals 328, as primarily shown in FIG. 88. The female terminals 328 are constructed in the same manner as other female terminals previously described herein with respect to other electrical components of the component set 230. With this two-way, four-wire female connector, numerous variations in electrical system configurations may be achieved, through interconnection of male end connectors with the two-way connector 232.

As also previously described herein, the component set 230 includes a four-way, four-wire male connector 236, also previously illustrated in FIG. 30. The details of the four-way connector 236 will now be described primarily with respect to FIGS. 90-95. As shown therein, the four-way connector 236 includes a housing 330. The housing 330 can be characterized as having a left-side housing 332 and right-side housing 334 (the designations of left and right are arbitrary and do not have any specific meaning). In addition, the four-way connector includes a set of four connector tab slots 336 located on the left-side housing 332 and four corresponding connector tab slots 336 located on the right-side housing 334. The connector tab slots 336 function so as to releasably receive connector tabs, such as the connector tabs 210, 212 previously described herein with respect to other electrical components of the component set 230. These connector tab slots can be substantially similar in structure and function to the tab slots 154 previously described herein.

As further shown in FIGS. 90-95, the four-way connector 236 includes four male connector sets 338, two of which are located on each of the two opposing sides of the connector 236. The male connector sets 338 each include four male connectors 340. If desired, one or more of the male connectors 340 can be keyed, such as the keyed connectors 342 illustrated primarily in FIGS. 92 and 93. Male blade terminals 344 can be extended into and received through the male connector sets 338. In this manner, the four-way connector 236 provides a means for connecting (physically and electrically) with up to four female connector sets. Also, it is apparent from the structure of the four-way connector 236 that it may be used for purposes of connecting various elements of the component set 230 in a "back-to-back" relationship.

Figure 100:
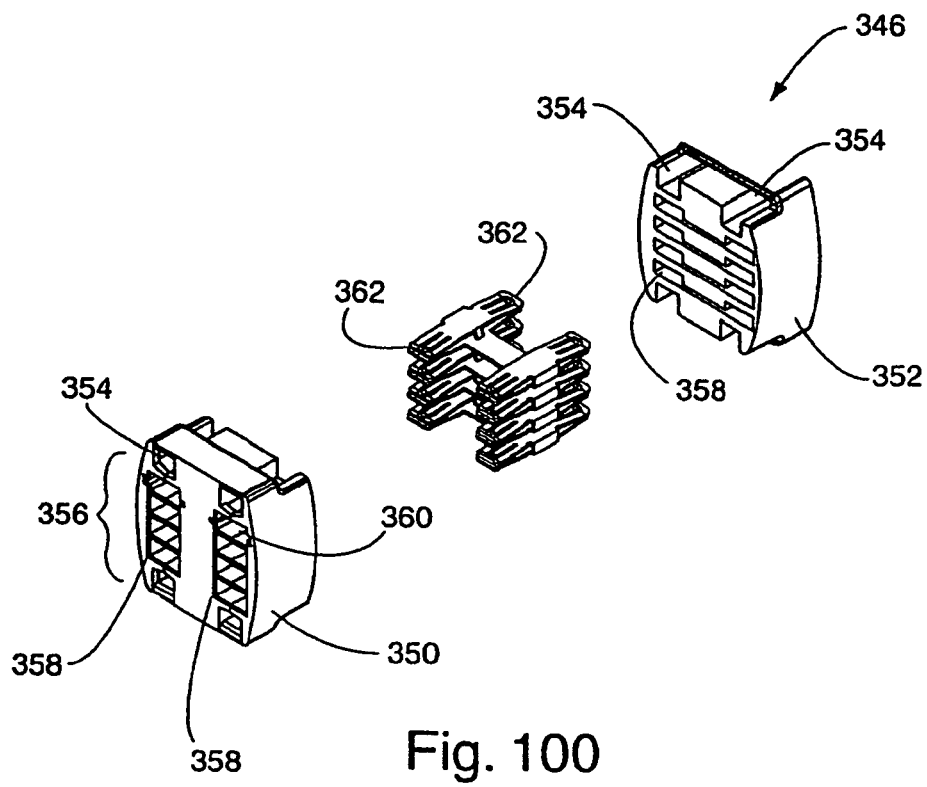
FIG. 100 is a perspective and exploded view of the four way male connector shown in FIG. 90.
Figure 101:
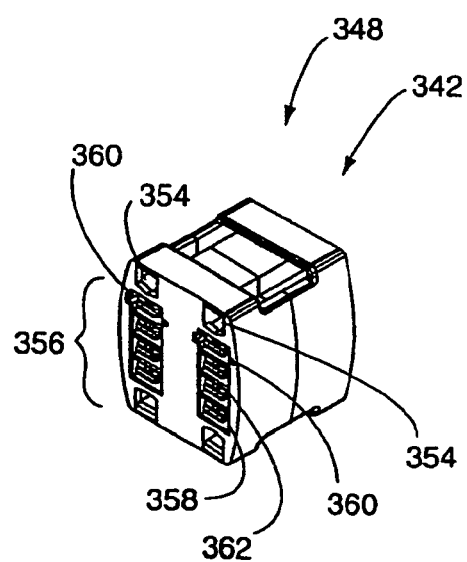
FIG. 101 is a perspective view of the four way male connector shown in FIG. 90, in a fully assembled state.

Although not shown in FIG. 30, it is also possible to utilize other types of four-way connectors in accordance with the invention. For example, FIGS. 100 and 101 illustrate what can be characterized as a four-way, four-wire female connector 346. Unlike the four-way connector 236, which included male terminals, the four-way connector 346 includes female terminals. More specifically, and with reference to FIGS. 100 and 101, the four-way female connector 346 includes a housing 348 comprising a left-side housing cover 350 and a right-side housing cover 352. Connector tab slots 354 are located in each of the four corners on each housing cover 350, 352. The connector 346 also includes four female connector sets 356, with each connector set 356 having four female connectors 358. If desired, one or more of the female connectors 358 can be keyed, such as the keyed connectors 360 illustrated in the drawings. Extending into and received by the female connectors 358 are a set of female terminals 362. In a preferred embodiment, the female connectors 362 may be provided by the use of H-terminal assemblies 364, as primarily shown in FIGS. 96-100. The H-terminal assemblies 364 would comprise four in number for a four-wire system. As primarily shown in FIGS. 96-99, each H-terminal assembly 364 includes a cross bar connector 366. The cross bar connector 366 connects opposing ones of pairs of female terminals 362. The structure and general configuration of the H-terminal assemblies 364 are particularly conducive to use with electrical components, such as the four-way connector 346.

As also previously described with respect to FIG. 30, the modular electrical system components set 230 includes a three-way, four-wire male/female jumper cable assembly 238. The jumper cable assembly will now be described with respect primarily to FIGS. 102-105. A number of the components of the three-way jumper cable assembly 238 are similar to other components previously described herein. Such components will, when possible, be like numbered and will not be described in substantial detail. More specifically, the jumper cable assembly 238 is adapted to provide for two female end connectors and one male end connector. With reference to FIGS. 102-105, the jumper cable assembly 238 includes a plastic or a similar cable 198 through which a set of four wires (not shown) extend. Connected in any suitable manner to one end of the jumper cable 198 is a female jumper cable assembly connector block 190. The connector block 190 has been previously described herein with respect to other electrical components of the component set 230. At the opposing end of the jumper cable 198, and connected in any suitable manner thereto, is a three-way, four-wire male/female jumper cable assembly connector block 368. The jumper cable assembly connector block 368 includes means for providing both female terminal connections and male terminal connections. With reference to the drawings, the male/female jumper cable assembly connector block 368 includes a female end connector portion 370 and a male end connector portion 372. The female end connector portion 370 is similar in structure and function to the female jumper cable assembly connector block 190. Correspondingly, the male end connector portion 372 is similar in structure and function to the male end connection configurations of the receptacle junction blocks 130.

More specifically, the male/female junction cable assemble connector block 368 includes a housing 374. The housing 374 comprises a front housing cover 376 and rear housing cover 378. With reference to the female end connector portion 370, the portion 370 includes a female end connector set 380 having a series of four female connectors 382. One or more of the connectors 382 may be a keyed connector 384, having structure and function as previously described herein. Extending into each of the female connectors 382 and connected internal within the female end connection portion 370 to the wires (not shown) extending through the jumper cable 198 are a set of four female terminals 386, each female terminal 386 being received within one of the connectors 382. Each female terminal 386 is connected to one of the four wires (not shown) of the four-wire configuration passing through the jumper cable 198.

Turning to the male end connector portion 372, the male end connector portion 372 is primarily shown in FIGS. 103, 103C and 105. With reference thereto, the male end connector portion 372 includes a male end connector set 388. The male end connector set 388 includes a set of four male connectors 390, substantially identical to male connectors previously described herein with respect to other components of the component set 230. One or more of the male connectors 390 may be a keyed connector, such as the keyed connector 392 illustrated in FIG. 103C. Male blade terminals 394, electrically connected to the wires (not shown) running through the jumper cable 198 extend into and are received within individual ones of the male connectors 390. In this manner, the connector portion 372 provides a male terminal set for electrically connecting to female terminal sets. In additional to the aforementioned elements, the female end connector portion 370 can include a set of connector tabs 396, corresponding in structure and function to the connector tabs previously described herein with respect to other elements of the component set 230. In addition, the male end connector portion 372 can include a pair of connector tab slots 398 adapted to receive connector tabs associated with female end connectors of other electrical components of the component set 230.

Figure 110:
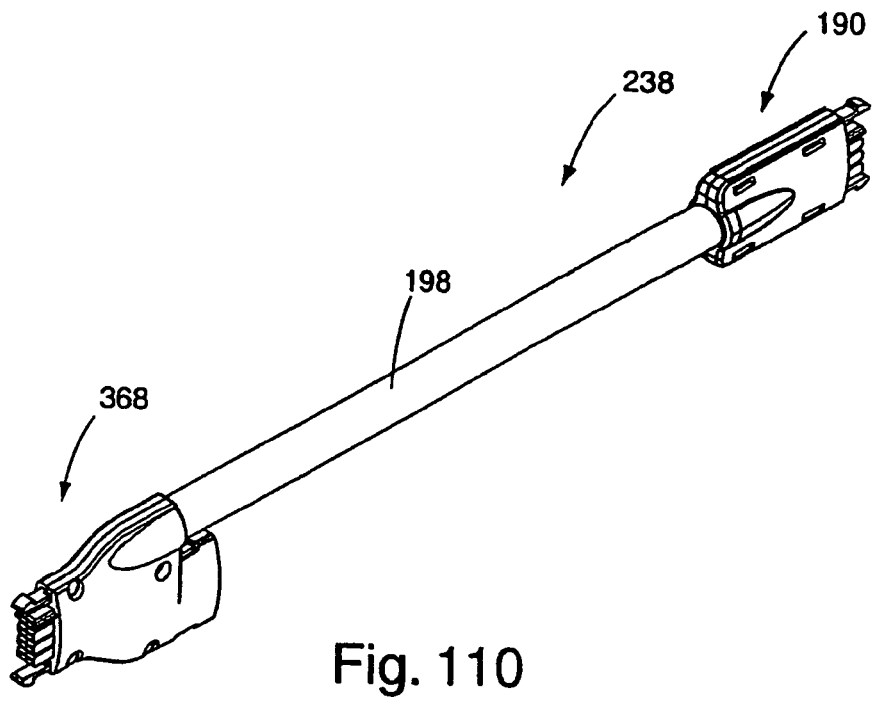
Figure 111:
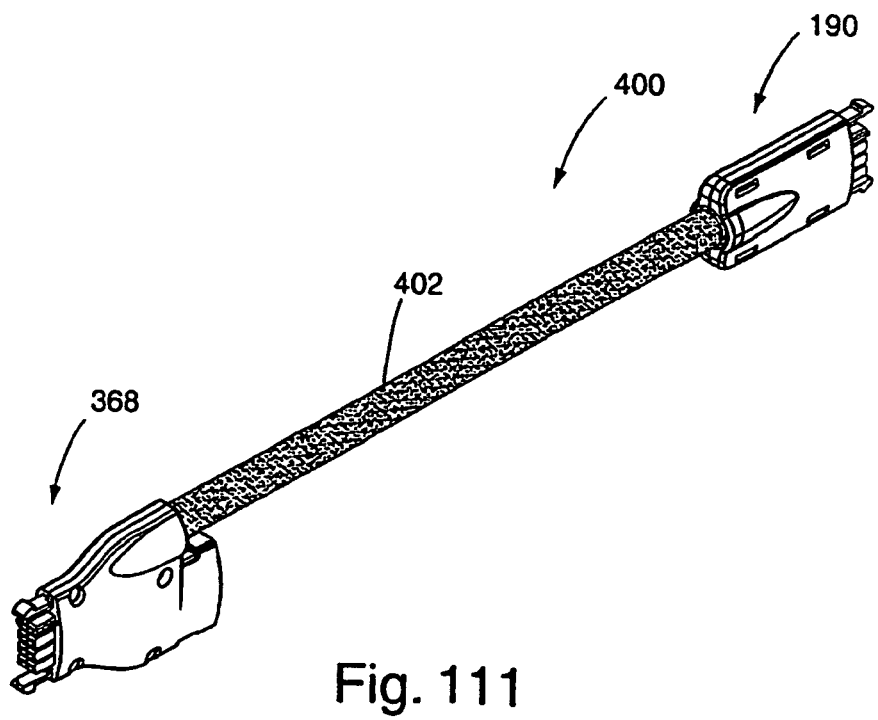
Figure 112:
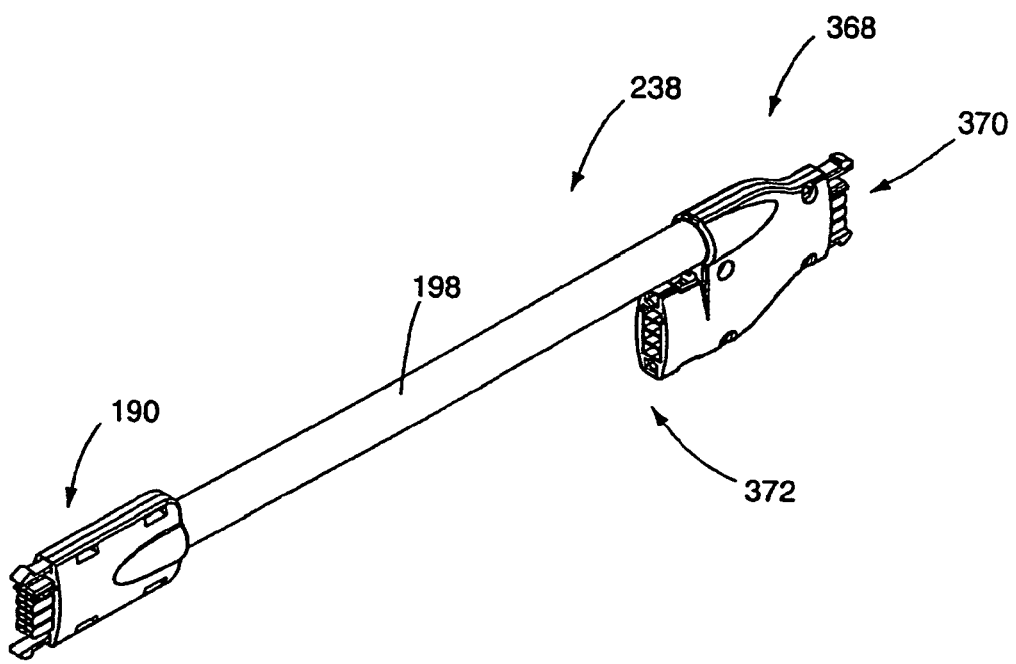

In addition to the three-way, four-wire male/female jumper cable assembly 238 illustrated in FIGS. 102-105, other, slightly modified embodiments of three-way jumper cable assemblies may be utilized. For example, FIGS. 106-109 illustrate a three-way jumper cable assembly 400. The jumper cable assembly 400 is identical to the jumper cable assembly 238, with the exception that the jumper cable assembly 400 utilizes a wire mesh cable 402, instead of a plastic or a similar jumper cable 198. In this regard, FIG. 110 illustrates a perspective view of the jumper cable assembly 238, while FIG. 111 illustrates a perspective view of the three-way jumper cable connector assembly 400. For purposes of the full description, FIG. 112 is another perspective view of the three-way jumper cable connector assembly 238, but rotated 180° relative to the perspective view of FIG. 110.

Figure 113:
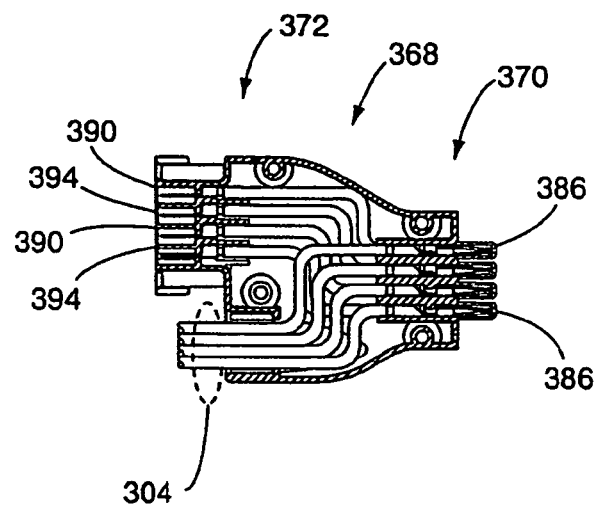
Figure 114:
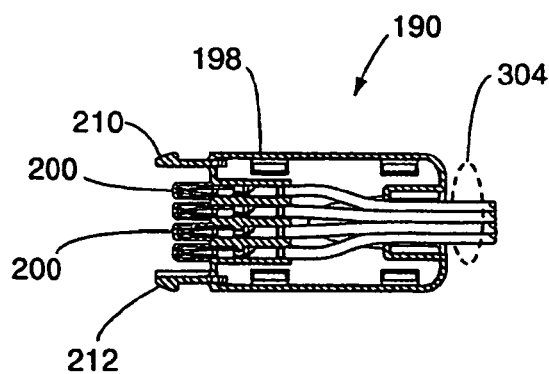

FIGS. 113 and 114 illustrate special views showing the interiors of the connector block 190 and the connector block 368 of the jumper cable assembly 238. As shown in FIG. 113, the connector block 368 includes the connector portion 370 having a set of female terminals 386 connected to the four sheathed wires 304. Correspondingly, the four sheathed wires 304 are also connected to the male blade terminals 394 which extend outwardly through the male connectors 390 of the male end connector portion 372. Correspondingly, FIG. 114 illustrates the interior of the connector block 190, which has previously been described herein with respect to other components of the component set 230. Specifically, FIG. 114 illustrates the set of sheathed wires 304 as being connected to individual ones of the female terminals 200.

Figure 115:
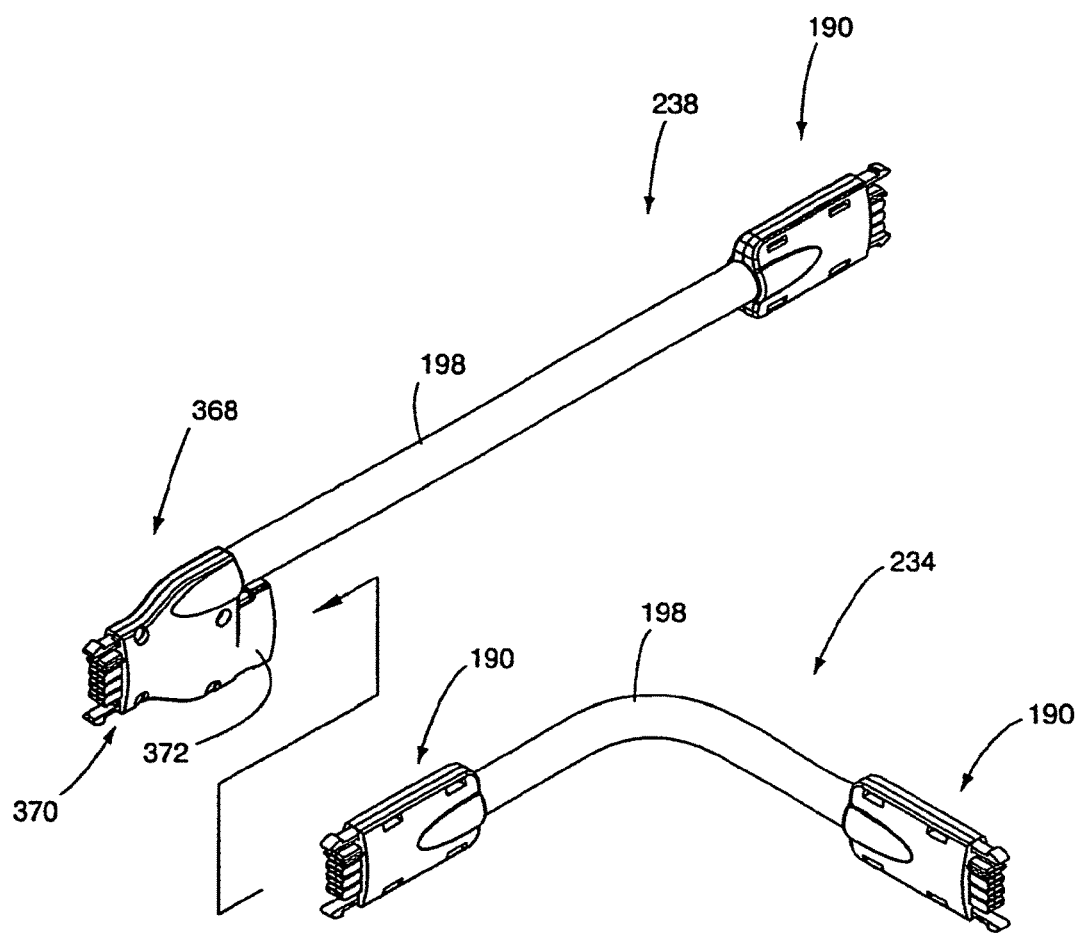
Figure 116:
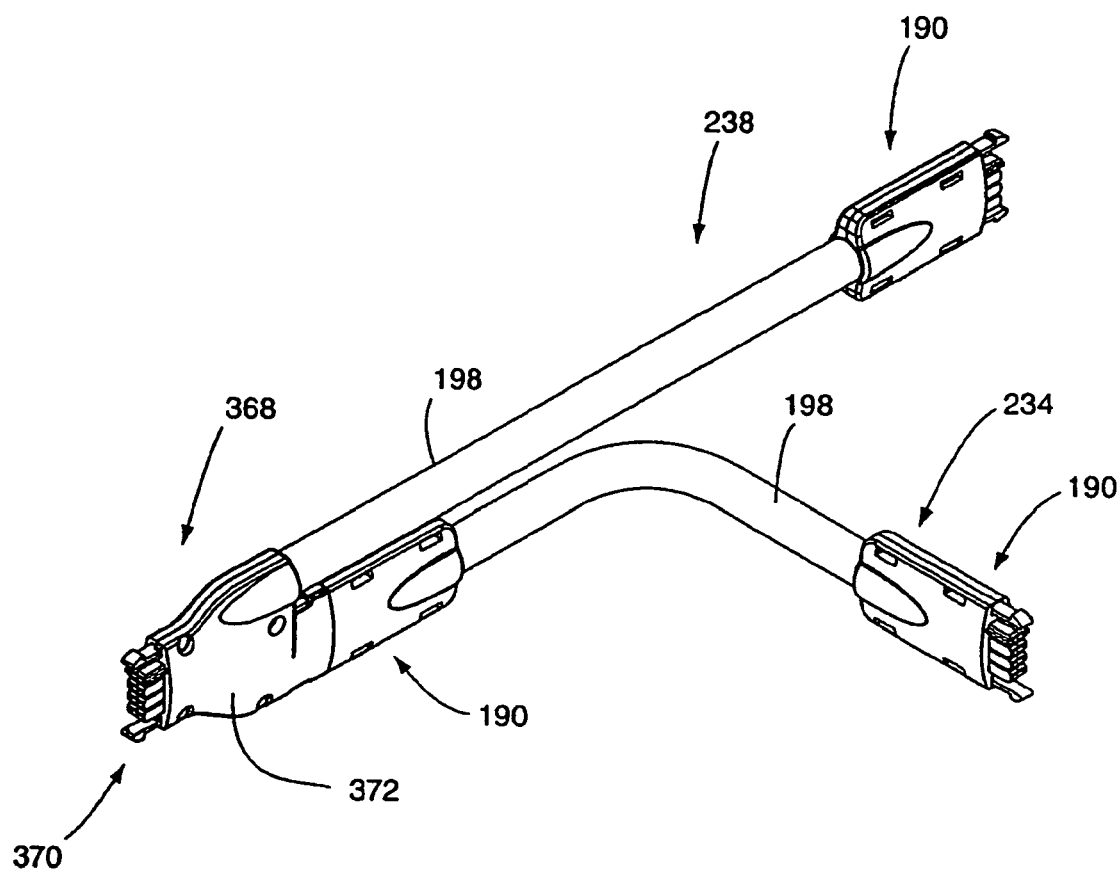
Figure 117:
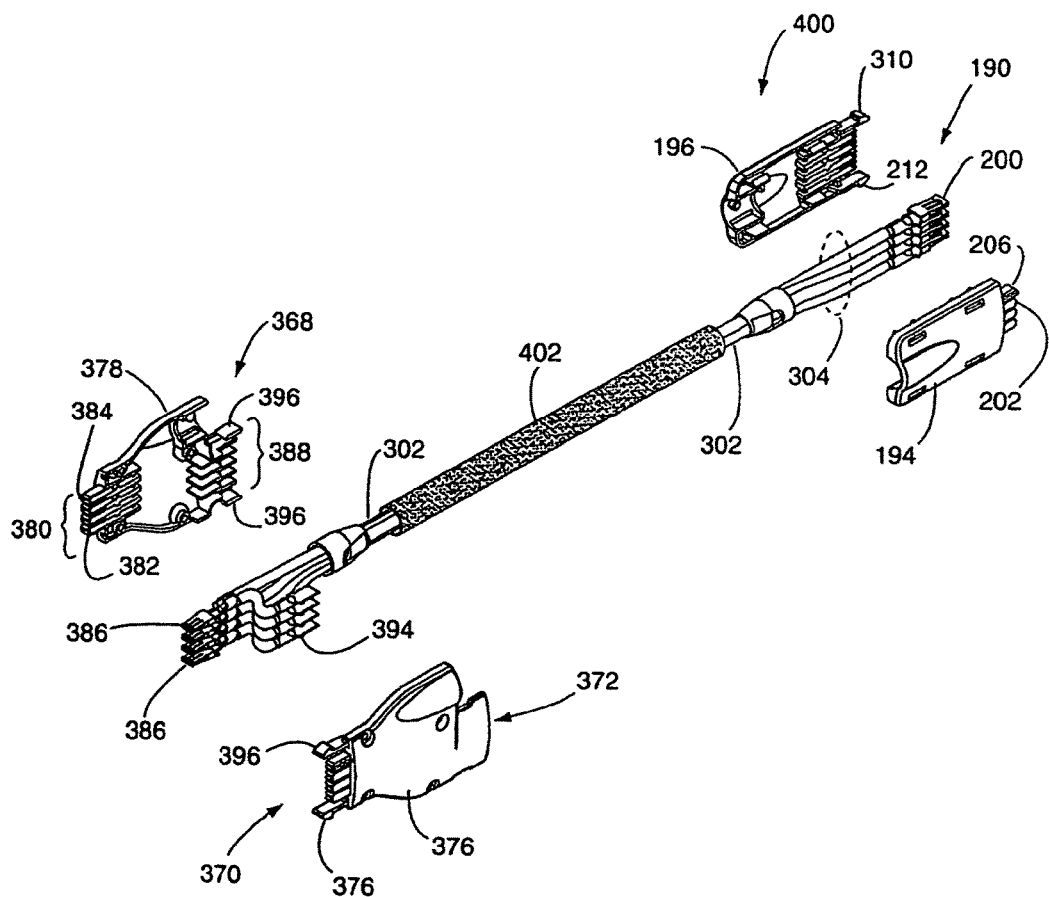

FIG. 115 illustrates an initial position for interconnecting a connector block 190 of a two-way connector 234 to the male end connector portion 372 of the connector block 368 of the three-wire connector 238. FIG. 116 is similar to FIG. 115, but shows the three-way connector 238 fully connected to the two-way connector 234. FIG. 117 is a perspective and partially exploded view of the three-way connector 400, having the wire mesh cable 402. FIG. 117 shows the interiors of the jumper cable assembly connector block 368 and the jumper cable assembly connector block 190. The remaining elements shown in FIG. 117 have been previously described herein.

Although not shown in FIG. 30 as being a principal element of the component set 230, modular electrical systems in accordance with the invention can also include a four-wire power end connector, such as the four-wire power end connector 404 illustrated in FIGS. 118-129. Perspective views of the four-wire power end connector 404 are illustrated in FIGS. 125, 126 and 127. First, with reference to FIGS. 118-123, the four-wire power end connector 404 includes a junction block 406. Extending outwardly from each of the two opposing ends of the junction block 406 are a pair of male end connectors 408. The male end connectors 408 can be similar in structure and function to the male end connectors previously described herein with respect to the receptacle junction blocks 130. Each of the mail end connectors 408 includes a set of four male blade terminals 410. The male blade terminals 410 extending into one of the male end connectors 408 are electrically connected to the male blade terminals 410 extending into the other of the male end connectors 408. In a conventional manner, the male blade terminals 410 are integral with metallic buss bars and form the ends of the buss bars within the junction block 406. Alternatively, the male blade terminals 410 could be connected directly to wires supplying incoming power into the junction block 406. The concept of connecting incoming power wires within a junction block of a power end connector and male terminals associated therewith is known in the art. With reference to all of FIGS. 118-129, the power end connector 404 further includes a base 412 which can be secured in any suitable manner to the top of the junction block 406. Secured to the base 412 is a clevis 414, comprising a pair of clevis brackets 416. Extending outwardly from each of the clevis brackets 416 is one of a pair of bosses 418.

As shown in a number of the drawings of FIGS. 118-129, the power end connector 404 also includes a cable 420 through which a set of four sheathed wires 422 extend. The sheathed wires 422 carry incoming power in a four-wire configuration to the end connector 404. However, it should be emphasized that other numbers of wire configurations could be utilized without departing from a number of the novel concepts of the invention.

Secured to the cable 420 in any suitable manner is a connection bracket 424 through which the sheathed wires 422 may extend. The connection bracket 424 includes a base 426 and a pair of opposing snaps 428. The snaps 428 are sized and configured so that the bosses 418 can be "snap fitted" into the apertures associates with the snaps 428. The snap fit configuration should be sized and configured so that it is possible to rotate the cable 420 and base 426 relative to the junction block 406, while maintaining a secure relationship absent the application of external forces so as to release the bosses 418 from the snaps 428. As shown in FIGS. 124, 128 and 129, the four-wire power end connector 404 can be extended into a slot 430 of a wall panel 100 having a raceway 108, as previously described with respect to FIG. 1. As shown particularly in FIG. 129, the power end connector 404 can also include a cover 432 which can be secured in any suitable manner to the power end connector 404 or to the sides of the slot 430, so as to maintain the angular configuration of the cable 420 in a particular desired configuration relative to the junction block 406. In accordance with certain aspects of the invention, the power end connector 404 provides the capability of utilizing differing angular configurations of the cable 420 relative to the junction block 406. For example, FIG. 125 could be characterized as showing the cable 420 in a 0° configuration relative to the junction block 406. FIG. 126 could be characterized as showing the cable 420 in a 90° configuration relative to the junction block 406. That is, the elongation of the cable 420 essentially extends perpendicular to the lengthwise dimension of the junction block 406. Correspondingly, FIG. 127 may be characterized as showing the cable 420 in a 180° orientation relative to the junction block 406. The 90° orientation is also shown in FIG. 128, while the 180° orientation (with the cover 432) is also shown in FIG. 129.

The foregoing has described a number of the principal components which may be utilized with a component set in accordance with the invention. However, it should be emphasized that numerous other types of configurations may be utilized, without departing from a number of the novel concepts of the invention. Also, it should be apparent from descriptions and illustrations associated with the four-way connector 236 and other components of the component set 230 that a number of the components of the component set 230 can be utilized in a "back-to-back" configuration, if the width of raceways supporting structures are of sufficient width. Correspondingly, and in accordance with certain aspects of the invention, the relatively narrow structure of the four-wire components of the component set 230 in accordance with the invention is advantageous in view of the capability of the components fitting within relatively narrow panels and desk systems having small raceways.

The following paragraphs briefly describe various types of connection configurations which may be utilized with the component set 230 and various other elements and structures which may be useful with the component set 230.

FIG. 130 illustrates a system configuration 436 utilizing components in accordance with the invention, with a work surface 438 instead of a wall panel system or similar type of wall structure. As shown in FIG. 130, the system configuration 436 includes, on the right-hand side of the configuration as viewed in FIG. 130, a two-way jumper cable assembly 234, having one connector block 190 coupled to one end of a receptacle junction block 130. The other end of the receptacle junction block 130 is connected to a connector block 190 of another two-way jumper cable assembly 234, which may be of a differing length than the aforedescribed jumper cable assembly 234. The opposing connector block 190 of the second jumper cable assembly 234 is connected to one end of a second receptacle junction block 130. The other end of the receptacle junction block 130 is connected to a further electrical component which may be characterized as an incoming power cable assembly 440. The incoming power cable assembly 440 includes a connector block 190 which may be directly connected into the adjacent end of the receptacle junction block 130. The power cable assembly 440 includes a cable 442, covering a set of four sheathed wires 444. As shown in FIG. 130, the sheathed wires 444, at the end opposing the connector block 190, are out in the open. This is to signify that the sheathed wires 444 may be connected to an incoming power source or to various other types of electrical components.

FIG. 131 shows a system configuration in accordance with the invention, whereby a pair of two-way jumper cable assemblies 234 are connected to a common end of a four-way connector 236. One of the male terminal sets of the four-way connector 236 on the opposing side thereof is connected to a two-way female connector 232. The two-way female connector 232, in turn, is connected at its opposing end to a receptacle junction block 130.

FIG. 132 illustrates a two-way jumper cable assembly 234 connected to the male terminal set of a three-way jumper cable assembly 238. A female terminal set of the three-way jumper cable assembly 238 is connected to one end of a receptacle junction block 130.

FIG. 133 illustrates a connector block 190 of a two-way jumper cable assembly 234 connected directly to one male end terminal set of a receptacle junction block 130. The opposing male end terminal set of the receptacle junction block 130 is connected to one end of a two-way connector 232. The opposing end of the two-way connector 232 is connected to a second receptacle junction block 130. A further system configuration is shown in FIG. 134. In this configuration, in a manner somewhat similar to the configuration shown in FIG. 131, a pair of two-way jumper cable assemblies 234 are each connected to male terminal sets on one end of a four-way connector 236. One of the male terminal sets on the opposing end of the four-way connector 236 is connected to a connector block 190 of a third two-way jumper cable assembly 234.

FIG. 135 shows a system configuration utilizing the same components as utilized in the system configuration illustrated in FIG. 133. However, FIGS. 136 and 137 show enlarged views of the first male end connector set 136 of the end most receptacle junction block 130, and the female terminals 200 and tabs 210, 212 associated with the connector bracket 190 respectively.

FIG. 138 illustrates a front, elevation view of a receptacle junction block 130, substantially corresponding to the junction blocks 130 previously described herein. FIG. 138A illustrates the concept that the connectors at the ends of the receptacle junction block 130 may include not only one but a pair of keyed connectors 446. FIG. 139 again illustrates a receptacle junction block 130, similar to those previously described herein, and showing that the keyed connectors may only include a single keyed connector 448, as illustrated in FIG. 140. In somewhat of a contrast, FIG. 141 illustrates a receptacle junction block 138A, which can include components substantially corresponding to components previously described herein with respect to the receptacle junction blocks 130. However, as shown in FIG. 142, the male connector set and male blade terminals include a keyed connector 450 and a set of five male blade terminals 452, corresponding to a five-wire configuration. With the five-wire configuration, it is possible to utilize three separate circuits, with a common neutral and a common ground. FIG. 141 and FIG. 142 are shown so as to illustrate that a multiple wire configuration other than four wires may be utilized, without departing from a number of the principal concepts of the invention.

FIG. 143 illustrates the incoming power cable assembly 440 previously described herein, with a connector block 190 in a position so as to be electrically connected to a receptacle junction block 130. FIG. 144 shows the incoming power cable assembly 440 in a fully connected state with the receptacle junction block 130. FIG. 145 illustrates the internal components of the connector block 190 associated with the incoming power cable assembly 440. These components correspond to components previously described herein with respect to other connector blocks 190, and will not be described in any detail herein. Suffice it to say that the connector block 190 includes front housing cover 194, rear housing cover 196, female terminals 200, and female connectors 202. Connector tabs 210, 212 are also provided. The incoming power cable assembly 440 also includes an interior cable 302 which protects the sheathed wires 304. FIG. 146 illustrates the incoming power cable assembly 440 in a fully assembled state.

FIGS. 147, 148 and 149 each illustrate in an enlarged detail the electrical and physical interconnection between the connector block 190 of the incoming power cable assembly 440 and the male connector end of the receptacle junction block 130. These physical and electrical interconnections have been described in previous paragraphs herein with respect to other electrical components, and will not be described in any detail herein.

FIGS. 150-153 illustrate an additional type of connector assembly 454 which may be utilized in accordance with the invention. The connector assembly 454 includes a cable 198, connector block 190 and a digital connector 456 at the opposing end of the connector assembly 454. The digital connector 456 could be any of a number of various types of connectors, with the assumption being that the four-wire configuration carries digital signals other than analog signals. FIGS. 150-153 are meant to show that various other types of connector blocks may be utilized, other than the specific connector blocks described herein, such as the connector blocks 190.

FIGS. 154 and 154A illustrate a connector block 190 attached to a cable 198, and shows the concept of utilizing keyed connectors as a keyed connector pair 458. The keyed connector pair 458 comprises a pair of connectors located at the top of the four connector set. FIGS. 155 and 155A are similar, but illustrate a keyed connector pair 460 as comprising the top and the second from the top connectors as comprising the keyed connectors 460. FIGS. 156 and 156A illustrate a receptacle junction block somewhat different than the junction block 190, and is referred to in the drawings as receptacle junction block 190A. As shown in FIG. 156, the receptacle junction block 190A also includes a keyed connector, such as the keyed connector 462. However, instead of having a four-wire configuration, FIG. 156 illustrates the connector block 190A as having a five-wire circuit configuration. With the five-wire configuration, three separate circuits can be provided, assuming a common ground and common neutral.

Returning to the specific invention associated herewith, the principles of the invention are disclosed, by way of example, within modular electrical systems which specifically provide for an integral junction block assembly, where the junction block comprises integrated receptacle blocks, with the receptacle blocks providing for back-to-back receptacle configurations. These inventive principles will be described specifically with respect to systems illustrated in FIGS. 157-170. A number of the components of the integral junction block correspond to components of junction blocks with one integral receptacle block associated herewith and previously described herein. Accordingly, some of these components will not be described in detail. Turning to the drawings, and particularly with respect initially to FIGS. 157-162, the electrical component in accordance with the invention is characterized as a four wire integral receptacle junction block 530. The integral receptacle junction block 530 is similar in structure to the receptacle junction block 130 previously described with respect to FIGS. 2-5, and also with respect to FIGS. 31-39. The primary distinction between the receptacle junction block 530 and the receptacle junction block 130 is that the receptacle junction block 530 includes receptacle blocks on both sides of the junction block itself Although the receptacle junction block 530 is described as a four-wire junction block, it should be emphasized that without departing from the spirit and scope of certain novel concepts of the invention, the receptacle junction block 530 may utilize other numbers of wires, such as 5, 8, 14 and the like. Also, when describing the receptacle junction block 530 and its potential interconnections to other components of electrical systems in accordance with the invention, it will be assumed that the connector sets (subsequently described herein) at opposing ends of the receptacle junction block 530 will consist of male blade terminals, and may be referred herein as male connector sets or male connector blocks. However, it should again be emphasized that without departing from a number of concepts of the invention, the receptacle junction block 530 could be developed and assembled with female connector sets at opposing ends of the block 530. In fact, with all electrical components in accordance with the invention, it should be emphasized that female connector sets may be substituted for male connector sets, and vice versa. Also, and as earlier stated, a number of concepts of the invention are not limited to the use of four wires and/or to separate circuits. Instead, the connector configurations initially described herein, with respect to the use of four wire configurations, essentially comprise what the inventor believes may be a preferred embodiment for electrical systems in accordance with the invention.

Turning again to FIGS. 157-170, the primary purposes of the four wire receptacle junction block 530 is to provide a means for supplying power to electrical outlet receptacles which are formed as integral components of the receptacle junction block 530 on both sides of the junction block. The receptacle junction block 530 also provides a means for supplying power to the electrical outlet receptacles through one of two selective circuits (assuming four wire circuitry). In addition, the receptacle junction block 530 provides a means for passing incoming power past the integrally coupled electrical outlet receptacles and facilitating distribution of the power to other components of a modular electrical system. FIG. 157 illustrates a plan view of the integral receptacle junction block assembly 530 in accordance with the invention. The receptacle junction block 530 includes opposing male end connectors, with a pair of integrally molded duplex receptacles on opposing sides of the junction block 530. The junction block 530 is adapted to utilize four wires, thereby providing two separate circuits, with a common neutral and a common ground. FIG. 158 illustrates a front elevation view of the integral receptacle junction block 530, while FIG. 159 is a left-side elevation view of the junction block 530. Correspondingly, FIG. 160 is a right-side elevation view of the receptacle junction block 530, while FIG. 161 is an underside view of the integral receptacle junction block assembly 530. Similarly, FIG. 162 is an elevation view of the receptacle junction block assembly 530 shown in FIG. 157, with FIG. 162 showing a side of the junction block assembly 530 opposing the side showing in FIG. 158. In addition to the views shown in FIGS. 157-162, FIG. 163 illustrates a left-side front perspective view of the junction block assembly 530, while FIG. 164 illustrates a right-side rear perspective view of the rear portion of the junction block assembly 530.

With reference first to FIGS. 157-162, the receptacle junction block assembly 530 includes a central housing 532 having somewhat of a box-like configuration. Integrally molded to opposing ends of the central housing 532 are a pair of male connector sets 534. The connector sets 534, as primarily shown in FIGS. 159 and 160, comprise a first male end connector set 536, and a second male end connector set 538. As previously described with respect to the junction block assembly 130, the male end connector sets 536 and 538 each include connector housings for male blade terminals. Extending outwardly from one side of the central housing 532 and integrally molded therewith is a first duplex receptacle set 540. The receptacle set 530 includes a pair of electrical outlet receptacles 542. Each of the outlet receptacles 542 is adapted for use with a grounded circuit, and includes three outlets. Specifically, each outlet receptacle 542 includes a hot terminal outlet 544, neutral terminal outlet 546, and ground terminal outlet 548, the outlets being conventional in nature.

Extending outwardly from an opposing side of the central housing 532 and integrally molded therewith is a second duplex receptacle set 541. The second duplex receptacle set 541 includes a pair of electrical outlet receptacles 543. Each of the outlet receptacles 543 is adapted for use with a grounded circuit, and includes three outlets. Specifically, each outlet receptacle 543 includes a hot terminal outlet 545, neutral terminal outlet 547 and ground terminal outlet 549, the outlets being conventional in nature. It should be noted that the electrical outlet receptacles 542 associated with the first duplex receptacles at 540 may be associated with one circuit coming into the integral receptacle junction block assembly 530, while a second incoming circuit is connected to the second duplex receptacle set 541.

As shown particularly in FIG. 159, the first male end connector set 536 includes a series of four male blade terminals 550 extending into the first male end connector set 536. The same male blade terminals 550 will also appear extending through the second opposing male end connector set 538. As shown particularly in FIG. 159, the first male end connector set 536 includes a keyed connector 552 located at the top of the individual connectors 551. A corresponding keyed connector 552 will also exist within a set of connectors 551 associated with the second opposing male end connector set 538. The key connectors 552, in accordance with the invention, provide for a means for ensuring proper polarization and circuitry connection among individual components which are connected to the integral receptacle junction block assembly 530.

As previously stated, the four male blade terminals 550 extending into the first male end connector set 536 will also appear extending through the second opposing male end connector set 538. As with the first male end connector set 536, a keyed connector 552 can be positioned at the top of individual connectors 551 associated with the second opposing male end connector set 538. With reference to FIG. 159, the first male end connector set 536 includes a pair of tab slots 554 located at the top and bottom portions of the end of the connector set 536. The tab slots 554 comprise a first tab slot 556 and a second tab slot 558. As with other receptacle junction blocks described herein, the tab slots 556, 558 are utilized to mechanically and electrically secure the receptacle junction block 530 to other electrical components of an associated electrical system. Similarly, corresponding tab slots 554 can also be positioned on the second opposing male end connector set 538, and include a first tab slot 556 and a second tab slot 558.

For purposes of showing completeness as to the structure and configuration of the integral junction block assembly 530, FIG. 163 is an upper left-side perspective view of the junction block assembly 530, showing the first duplex receptacle set 540. Correspondingly, FIG. 164 is a view of the opposing side of the integral junction block assembly 530, particularly showing the second duplex receptacle set 541. Correspondingly, FIG. 163 also shows the first male end connector set 536, while the second male end connector set 538 is visible in FIG. 164.

FIG. 165 is an exploded view of the integral receptacle junction block assembly 530, showing the internal circuitry associated with buss bars. Specifically, FIG. 165 illustrates the central housing 532 in an exploded configuration. Specifically, the central housing 532 is shown as comprising a first housing side 560. The central housing 532 also comprises a substantially identical second housing side 562. Although FIG. 165 does not show an actual view of the second housing side 562, the second housing side 562 is shown in FIG. 164. Correspondingly, the first housing side 560 is shown in FIG. 163. As previously described with respect to other illustrations herein, the first housing side 560 is integrally formed with a first receptacle block 564. As shown particularly in FIGS. 163 and 165, the first receptacle block 564 is integral with the first housing side 560 of the central housing 532. Correspondingly, the first receptacle block 564 also carries the outlets of the first duplex receptacle set 540. Similarly, the second housing set 562 is integral with a second receptacle block 566 shown primarily in FIG. 164. Connected to or otherwise integral with the male blade terminals 550 previously described herein are a series of four buss bars 570. The buss bars can differ in central configuration, in part, but certain of the buss bars have a primary identical basic configuration. More specifically, the buss bars 570 can be utilized for different electrical elements, depending upon the subcomponents attached to the buss bars. Further, it should be noted that the specific physical configuration of the buss bars 570 within the junction block housing assembly 530 will dependent upon which of two circuits is being utilized as a "pass through" circuit, and which of the two circuits is being utilized to energize the first and second duplex receptacle sets 540, 541. It should be noted that in accordance with the invention, the buss bars 570 are being used in a four wire configuration to supply electrical power to duplex receptacle sets located on opposing sides of the junction block housing 530. Further, this configuration is achieved with the duplex receptacle sets 540 and 541 being positioned so as to be integral with the components of the junction block housing itself.

The buss bars shown in FIG. 165 include what can be characterized as a hot buss bar 574. The hot buss bar 574 provides a hot connector for a first one of the two electrical circuits applied to the junction block assembly 530. As apparent from FIG. 165, the hot buss bar 574 includes a first straight section 576, with a first angled section 578 integral therewith. At an opposing end of the first angled section 578 is a middle straight section 580. The middle straight section 580 is integral with a second angled section 582. In turn, the second angled section 582 is integral with a second straight section 584. It is apparent from other portions of the illustration of FIG. 165, and other drawings herein, the hot buss bar 574 is formed with other elements so as to provide for a hot buss bar assembly 586. The hot buss bar assembly 586 includes the hot buss bar 574 and a first female connector component 588. The connector clip component 588 is specifically shown in a stand alone configuration in FIG. 168. The female connector clip component 588 includes a connecting bracket 590 which is utilized to connect to the middle straight section 580 of the hot buss bar 574. This connection can be made by rivets or similar connection means. The connector clip component 588 further includes a pair of opposing female connector clips which open in a first direction which corresponds to a downward direction in FIGS. 165 and 168. These connector clips 590 will be positioned adjacent to the hot terminal outlets 545 previously described with respect to FIG. 162.

In addition to the first female connector clip component 588, the hot buss bar assembly 574 further includes a second female connector clip component 592, also shown best in FIG. 168, although the component 592 is also shown in FIG. 165. The second female connector clip component 592 includes a connection bracket 594 which will be utilized with pop rivets or similar connecting means to secure and couple the second female connector clip component 592 to the hot buss bar 574. In addition to the connecting bracket 594, the second female connector clip component 592 further includes a pair of female connector clips 596, again as primarily shown in FIGS. 165 and 168, as well as FIG. 169. The second female connector clips 596 open in a direction opposing the direction to which the first female connector clips 590 open. Further, the second female connector clips 596 are structured and positioned so that they align with the hot terminal outlets 544 shown in FIG. 158 and FIG. 165. Accordingly, the components mounted to the hot buss bar 574 can be utilized to provide for the hot terminals associated with both the first duplex receptacle set 540 and the second duplex receptacle set 541. As apparent from the drawings, FIG. 169 illustrates the hot buss bar 574 with the first female connector clip component 588 secured thereto, and further shows the position of the second female connector clip component 592 as it would be moved forward to connection with the hot buss bar 574. FIG. 170 shows the 40 assembled hot buss assembly 586, which substantially corresponds to the hot buss bar 586 shown in FIG. 165.

Turning back to FIG. 165, there is shown a ground buss bar assembly 598 which is utilized to provide ground terminal connections for incoming power as applied to the ground terminals 548 and 549. The ground buss bar assembly 598 includes a ground buss bar 600. The ground buss bar 600 is substantially elongated in configuration, and includes a first straight section 602, a U-shaped section 604 integral with the straight section 602, and an opposing U-shaped section 606 integral with the section 604. As further shown in FIG. 165, a further U-shaped section 608 is positioned centrally with the ground buss bar assembly 598. The U-shaped section 608 is integral with section 606, and is further integral with an opposing U-shaped section 610. The U-shaped section 610 is integral with a terminating straight section 612. Further, U-shaped sections 614 are coupled to the ground buss bar 600. For connection purposes, the U-shaped sections 606 and 610 would be connected to the ground terminals 548 of the first duplex receptacle set 540. Correspondingly, the U-shaped sections 614 will be coupled to the ground terminals 549 of the second duplex receptacle set 541. FIG. 165 further shows a second hot buss bar 616 positioned in a configuration of FIG. 165. In this particular embodiment, the hot buss bar 616 does not supply power to any of the duplex receptacle sets associated with the junction block assembly 530. Instead, the hot buss bar 616 does not supply power to any of the duplex receptacle sets associated with the junction block assembly 530. Instead, the hot buss bar 616 is utilized as a pass through conductor. The power from one of the two incoming circuits (i.e., the hot read for the power) is applied to the hot buss bar 616 and it is passed through the junction block assembly 530 for use with other components of a power distribution system.

Turning again to FIG. 165, the buss bar assemblies further include a neutral buss bar assembly 620. The neutral buss bar assembly 620 is substantially identical to the hot buss bar assembly 586. As with the hot buss bar assembly 586, the neutral buss bar assembly 620 includes a buss bar 622, characterized as a neutral buss bar and is substantially identical to the hot buss bar 574. Correspondingly, for purposes of connection of neutral terminals to the incoming power, the neutral buss bar assembly 620 includes a first female connector clip component 624. The first female connector clip component 624 is substantially similar to the first female connector clip component 588 previously described herein. Correspondingly, the neutral buss bar assembly 620 includes a second female connector clip component 628. Connector clip component 628 is similar to the second female connector clip component 592, also previously described herein. In addition to the foregoing, the first female connector clip component 624 includes a pair of first female connector clips 626. These connector clips 626 open in a common direction and are adjacent to the neutral terminals 546 previously described with respect to FIG. 158. Similarly, the second female connector clip component 628 includes a pair of second connector clips 630. The connector clips 630 open in an opposing direction relative to the connector clips 626. The second connector clips 630 are positioned adjacent to the neutral terminals 546 shown in FIG. 162.

For purposes of clarity, FIG. 165 also shows a side of the central housing 532 which opposes the side of the central housing 532 which is shown as comprising the first duplex receptacle set 540. FIG. 165 also shows the slots 632 within which the various buss bars can be positioned. Further, it should be emphasized that the particular configuration shown in FIG. 165 is an embodiment directed to the use of a first one of the two circuits applied as incoming power to the buss bar assembly 530. If it is desired to use the other one of the two circuits to supply power to the junction block assembly 530, the buss bars 570 can be repositioned and connectable components reassembled so that the buss bar 616 is utilized to supply power from the second circuit to the duplex receptacle sets 540 and 541. Again, referring to the buss bar slots 632, the size can be characterized as comprising four slots identified as buss bar slots 632A, 632B, 632C and 632D. Each of the buss bars 570 will be positioned and releasably secured within a corresponding one of the buss bar slots 632.

FIG. 168 is a partially exploded view which shows the buss bars 570, with their attendant assemblies, positioned within the buss bar slots 632. FIG. 167 is a partially schematic and partially block diagram showing electrical interconnections when using either the first or second circuits for power to be applied to the junction block assembly 530. With the lines shown associated with circuit 1, the neutral terminal 546 is connected to the neutral buss bar 620. Similarly, the ground terminal 548 is connected to the ground buss bar 598. With circuit 1, the second hot buss bar 616 is not connected to any terminals of the duplex receptacle sets, and instead is just a pass through conductor. The hot buss bar 586 is, in fact, connected to the hot terminal 544 of the duplex receptacle sets. In this manner, the incoming power associated with circuit 1 is applied to the junction block assembly 530. Correspondingly, to provide for circuit 2 to be applied to the junction block assembly 530, the connections to the mutual and ground buss bars remain the same. However, there is no connection between the terminals and the duplex receptacle sets and the first hot buss bar assembly 586. Instead, the hot terminal 544 is connected to the hot buss bar assembly 616.

In accordance with all of the foregoing, the embodiments in accordance with the invention comprise the use of integral duplex receptacle sets positioned on both sides of a junction block assembly. This is achieved without the necessity of having a relatively wide junction block, with more than one set of four terminals for a four wire system. In accordance with other concepts of the invention, the buss bar configuration associated with a junction block assembly in accordance with the invention can provide for supplying power through one of two alternative circuits which are applied to the junction block assembly 530. However, one of the alternative power circuits is passed through the junction block assembly 530, or the others applied to the associated duplex receptacle sets.

It will be apparent to those skilled in the pertinent arts that still other embodiments of electrical assemblies in accordance with the invention can be designed. That is the principles of an electrical assembly in accordance with the invention are not limited to the specific embodiments described herein. Accordingly, it will be apparent to those skilled in the art that modifications and other variations of the above-described illustrative embodiments of the invention may be effected without departing from the spirit and scope of the novel concepts of the invention.

The invention claimed is:

1. An electrical system configured for use in a raceway, said electrical system comprising:
    a source of incoming electrical power comprising a hot conductor, a neutral conductor, and a ground conductor; and
    a receptacle junction block comprising:
        a pair of receptacle blocks configured to form opposing halves of the receptacle junction block, wherein each receptacle block defines a receptacle face arranged on an opposing side of the receptacle junction block, and wherein the receptacle blocks are coupled together to define a buss bar cavity within the receptacle junction block; and an internal buss bar configuration arranged within the buss bar cavity and comprising a hot buss bar coupled to the hot conductor, a neutral buss bar coupled to the neutral conductor, and a ground buss bar coupled to the ground conductor, wherein the pair of receptacle blocks are configured to provide selective engagement with the internal buss bar configuration through the respective receptacle faces.

2. The electrical system of claim 1, wherein the receptacle junction block further comprises a pair of connector blocks arranged on opposing ends of the receptacle junction block, wherein the connector blocks are configured to couple the hot conductor, the neutral conductor, and the ground conductor to the hot buss bar, the neutral buss bar, and the ground buss bar, respectively.

3. The electrical system of claim 2, wherein the pair of receptacle blocks are arranged between the pair of connector blocks.

4. The electrical system of claim 1, wherein the hot conductor comprises first and second hot conductors, and wherein the source of incoming electrical power comprises:
a first electrical circuit comprising the first hot conductor, the neutral conductor, and the ground conductor; and
a second electrical circuit comprising the second hot conductor, the neutral conductor, and the ground conductor.

5. The electrical system of claim 4, wherein the hot buss bar comprises first and second hot buss bars, and wherein the internal buss bar configuration comprises the first hot buss bar coupled to the first hot conductor, and further comprises the second hot buss bar coupled to the second hot conductor.

6. The electrical system of claim 5, wherein the internal buss bar configuration is configured such that the pair of receptacle blocks feed off the first hot buss bar of the internal buss bar configuration while the second hot buss bar of the internal buss bar configuration is configured to pass through the receptacle junction block without electrical engagement by either receptacle block.

7. The electrical system of claim 6, wherein each receptacle block of the pair of receptacle blocks comprises a female connector clip, each female connector clip configured to couple to the first hot buss bar.

8. The electrical system of claim 5, wherein the pair of receptacle blocks comprise a first receptacle block and a second receptacle block, wherein the internal buss bar configuration is configured such that the first receptacle block feeds off the first hot buss bar while the second receptacle block feeds off the second hot buss bar.

9. The electrical system of claim 8, wherein the first receptacle block comprises a first female connector clip configured to couple to the first hot buss bar, and wherein the second receptacle block comprises a second female connector clip configured to couple to the second hot buss bar.

10. The electrical system of claim 1, wherein the receptacle junction block comprises a housing, wherein the housing houses the pair of receptacle blocks such that the pair of receptacle blocks are arranged on opposing faces of the housing of the receptacle junction block.

11. The electrical system of claim 1, wherein the hot conductor comprises first and second hot conductors, and wherein the source of incoming electrical power comprises a four-wire arrangement that comprises the first hot conductor, the second hot conductor, the neutral conductor, and the ground conductor.

12. A modular electrical system configured for use in a work space, said modular electrical system comprising:
a source of incoming electrical power arranged as a four-wire system comprising a first hot conductor, a second hot conductor, a neutral conductor, and a ground conductor; and
a first receptacle junction block comprising:
a housing;
a pair of receptacle blocks configured to form opposing halves of the housing, wherein each receptacle block defines a receptacle face arranged on an opposing side of the first receptacle junction block, and wherein the receptacle blocks are coupled together to define a buss bar cavity within the first receptacle junction block; and
a buss bar configuration arranged within the buss bar cavity and comprising a first hot buss bar coupled to the first hot conductor, a second hot buss bar coupled to the second hot conductor, a neutral buss bar coupled to the neutral conductor, and a ground buss bar coupled to the ground conductor, wherein the pair of receptacle blocks are configured to provide selective engagement with the buss bar configuration through the respective receptacle faces.

13. The modular electrical system of claim 12 further comprising a cable and a second receptacle junction block, wherein the cable is configured to extend the source of incoming electrical power from the first receptacle junction block to the second receptacle junction block.

14. The modular electrical system of claim 13, wherein the cable comprises a 4-wire electrical circuit.

15. The modular electrical system of claim 13, wherein the first receptacle junction block further comprises a pair of connector blocks arranged on opposing ends of housing of the first receptacle junction block, wherein a first connector block of the pair of connector blocks is configured to couple the first hot conductor, the second hot conductor, the neutral conductor, and the ground conductor to the first hot buss bar, the second hot buss bar, the neutral buss bar, and the ground buss bar, respectively.

16. The modular electrical system of claim 15, wherein a second connector block of the pair of connector blocks is configured to couple the cable to the first receptacle junction block.

17. The modular electrical system of claim 16, wherein the cable is configured to extend the source of incoming electrical power to the second receptacle junction block.

18. The modular electrical system of claim 12 further comprising a network of cables and a plurality of additional receptacle junction blocks, wherein the network of cables comprises a first cable configured to couple to the first receptacle junction block and to extend the source of incoming electrical power to the plurality of additional receptacle junction blocks via the network of cables.

* * * * *